US012472268B2

(12) United States Patent
Fuller et al.

(10) Patent No.: US 12,472,268 B2
(45) Date of Patent: Nov. 18, 2025

(54) GENE THERAPY FOR TREATING PROPIONIC ACIDEMIA

(71) Applicant: Ultragenyx Pharmaceutical Inc., Novato, CA (US)

(72) Inventors: Matthew Scott Fuller, Millis, MA (US); Samuel Wadsworth, Shrewsbury, MA (US); Kelly Reed Clark, Westerville, OH (US); Sean Christopher Daugherty, Petaluma, CA (US); Stewart Craig, Cambridge, MA (US)

(73) Assignee: Ultragenyx Pharmaceutical Inc., Novato, CA (US)

( * ) Notice: Subject to any disclaimer, the term of this patent is extended or adjusted under 35 U.S.C. 154(b) by 1276 days.

(21) Appl. No.: 17/278,847

(22) PCT Filed: Oct. 1, 2019

(86) PCT No.: PCT/US2019/054003

§ 371 (c)(1),
(2) Date: Mar. 23, 2021

(87) PCT Pub. No.: WO2020/072451

PCT Pub. Date: Apr. 9, 2020

(65) Prior Publication Data

US 2021/0283272 A1 Sep. 16, 2021

Related U.S. Application Data

(60) Provisional application No. 62/739,471, filed on Oct. 1, 2018.

(51) Int. Cl.
*A61K 48/00* (2006.01)
*C12N 15/86* (2006.01)

(52) U.S. Cl.
CPC ........ *A61K 48/005* (2013.01); *A61K 48/0091* (2013.01); *C12N 15/86* (2013.01); *C12N 2750/14143* (2013.01); *C12N 2830/008* (2013.01); *C12N 2830/50* (2013.01)

(58) Field of Classification Search
None
See application file for complete search history.

(56) References Cited

U.S. PATENT DOCUMENTS 7,282,199 B2 10/2007 Gao et al.
7,790,449 B2 9/2010 Gao et al.
8,734,809 B2 5/2014 Gao et al.
8,927,514 B2 1/2015 Chatterjee et al.
9,506,083 B2 11/2016 Arbetman et al.
9,585,971 B2 3/2017 Deverman et al.
9,587,282 B2 3/2017 Schaffer et al.
9,611,302 B2 4/2017 Srivastava et al.
9,725,485 B2 8/2017 Srivastava et al.
9,856,539 B2 1/2018 Schaffer et al.
9,909,142 B2 3/2018 Yazicioglu et al.
9,920,097 B2 3/2018 Zhong et al.
10,011,640 B2 7/2018 Srivastava et al.
10,081,659 B2 9/2018 Chiorini et al.
10,179,176 B2 1/2019 Kay et al.
10,202,657 B2 2/2019 Schaffer et al.
10,214,566 B2 2/2019 Schaffer et al.
10,214,785 B2 2/2019 Schaffer et al.
10,266,845 B2 4/2019 Cronin et al.
10,294,281 B2 5/2019 Srivastava et al.
10,301,648 B2 5/2019 Vandenberghe et al.
10,385,320 B2 8/2019 Kay et al.
10,392,632 B2 8/2019 Wright et al.
2007/0036760 A1 2/2007 Wilson et al.
2009/0197338 A1 8/2009 Vandenberghe et al.
2015/0139953 A1* 5/2015 Gao ........................ C12N 9/644 435/325
2015/0344911 A1 12/2015 Chatterjee et al.
2017/0119906 A1* 5/2017 Riley ...................... A61K 48/00
2018/0140688 A1 5/2018 Kraus
2019/0076550 A1* 3/2019 Wang ................. A61K 48/0083
2023/0129893 A1 4/2023 Fuller et al.

FOREIGN PATENT DOCUMENTS

EP 1310571 A2 5/2003
WO WO-2003/042397 A2 5/2003
WO WO-2016/049230 A1 3/2016
(Continued)

OTHER PUBLICATIONS

Browner et al., (1989) "Sequence Analysis, Biogenesis, and Mitochondrial Import of the a-subunit of Rat Liver Propionyl-CoA Carboxylase," J Biol Chem 264(21):12680-12685.
Chandler et al. (2011) "Adeno-Associated Virus Serotype 8 Gene Transfer Rescues a Neonatal Lethal Murine Model of Propionic Acidemia," Human Gene Therapy 22(4):477-481.
Colella et al. (2018), "Emerging Issues in AAV-Mediated in Vivo Gene Therapy," Molecular Therapy: Methods & Clinical Development 8:87-104.
Guenzel et al. (2015) "Long-Term Sex-Biased Correction of Circulating Propionic Acidemia Disease Markers by Adeno-Associated Virus Vectors," Human Gene Therapy 26(3):153-160.
Hsia et al. (1973) "Propionic acidemia: Diagnosis by enzyme assay in frozen leukocytes," J Pediatr. 83(4):625-628.
(Continued)

*Primary Examiner* — Michael D Burkhart
(74) *Attorney, Agent, or Firm* — Antheros Legal Advisors LLP

(57) ABSTRACT

This present disclosure provides adeno-associated viral vectors, recombinant adeno-associated virus (rAAV), and methods of their use in gene therapy for treating propionic acidemia (PA). Also provided are pharmaceutical compositions comprising a recombinant adeno-associated virus of the invention and a pharmaceutically acceptable carrier or excipient. These pharmaceutical (compositions may be useful in gene therapy for the treatment of PA caused by mutations in propionyl-CoA carboxylase α-subunit (PCCA) or mutations in propionyl-CoA carboxylase β-subunit (PCCB).

28 Claims, 12 Drawing Sheets

Specification includes a Sequence Listing.

(56) References Cited

FOREIGN PATENT DOCUMENTS

| | | | |
|---|---|---|---|
| WO | WO-2016/186772 | A2 | 11/2016 |
| WO | WO-2017/165859 | A1 | 9/2017 |
| WO | WO-2017/173043 | A1 | 10/2017 |
| WO | WO-2017/180854 | A1 | 10/2017 |
| WO | WO-2017/192761 | A1 | 11/2017 |
| WO | WO-2018/022905 | A2 | 2/2018 |
| WO | WO-2018/126112 | A1 | 7/2018 |
| WO | WO-2018/126116 | A1 | 7/2018 |
| WO | WO-2018/144709 | A2 | 8/2018 |
| WO | WO-2018/156654 | A1 | 8/2018 |
| WO | WO-2018/222503 | A1 | 12/2018 |
| WO | WO-2018/226602 | A1 | 12/2018 |
| WO | WO-2019/168961 | A1 | 9/2019 |

OTHER PUBLICATIONS

Huang et al: (1990) "Intervening sequences increase efficiency of RNA 3' processing and accumulation of cytoplasmic RNA," Nucleic Acids Research 18(4):937-947.

International Search Report and Written Opinion for International Application No. PCT/US2021/024892 mailed Jul. 12, 2021, 15 pages.

Kalousek et al. (1980) "Isolation and Characterization of Propionyl-CoA Carboxylase from Normal Human Liver," J Biol Chem. 255(1):60-65.

Powell et al. (2015), "Viral Expression Cassette Elements to Enhance Transgene Target Specificity and Expression in Gene Therapy," Discov Med. 19(102):49-57.

Ugarte et al. (1999) "Overview of mutations in the PCCA and PCCB genes causing propionic acidemia," Human Mutation 14(4):275-282.

Vaessen et al. (2009) "AAV gene therapy as a means to increase apolipoprotein (Apo) A-I and high-density lipoprotein-cholesterol levels: correction of murine ApoA-I deficiencAAV gene therapy as a means to increase apolipoprotein (Apo) A-I and high-density lipoprotein-cholesterol levels: correction of murine ApoA-I deficiency," J. Gene Med. 11:697-707.

van der Meer et al. (1996) "Clinical outcome and long-term management of 17 patients with propionic acidaemia," Eur J Pediatr. 155(3):205-210.

Yang et al. (2004) "Mutation spectrum of the PCCA and PCCB genes in Japanese patients with propionic acidemia," Molecular Genetics and Metabolism 81(4):335-342.

Gray et al., "Optimizing promoters for recombinant adeno-associated virus-mediated gene expression in the peripheral and central nervous system using self-complementary vectors," Human Gene Therapy, 2011, 22(9): 1143-1153.

Guenzel et al., "Effects of adeno-associated virus serotype and tissue-specific expression on circulating biomarkers of propionic acidemia," Human Gene Therapy, 2014, 25(9): 837-843.

Guenzel et al., "Generation of a hypomorphic model of propionic acidemia amenable to gene therapy testing," The American Society of Gene & Cell Therapy, 2013, 21(7): 1316-1323.

International Search Report and Written Opinion for corresponding International Application No. PCT/US2019/054003, dated Feb. 6, 2020.

* cited by examiner

SEQUENCE LISTING

```
<160> NUMBER OF SEQ ID NOS: 39

<210> SEQ ID NO 1
<211> LENGTH: 2184
<212> TYPE: DNA
<213> ORGANISM: Homo sapiens

<400> SEQUENCE: 1

atggcggggt tctgggtcgg gacagcaccg ctggtcgctg ccggacggcg tgggcggtgg     60

ccgccgcagc agctgatgct gagcgcggcg ctgcggaccc tgaagcatgt tctgtactat    120

tcaagacagt gcttaatggt gtcccgtaat cttggttcag tgggatatga tcctaatgaa    180

aaaacttttg ataaaattct tgttgctaat agaggagaaa ttgcatgtcg ggttattaga    240

acttgcaaga agatgggcat taagacagtt gccatccaca gtgatgttga tgctagttct    300

gttcatgtga aaatggcgga tgaggctgtc tgtgttggcc cagctcccac cagtaaaagc    360

tacctcaaca tggatgccat catggaagcc attaagaaaa ccagggccca agctgtacat    420

ccaggttatg gattcctttc agaaaacaaa gaatttgcca gatgtttggc agcagaagat    480

gtcgttttca ttggacctga cacacatgct attcaagcca tgggcgacaa gattgaaagc    540

aaattattag ctaagaaagc agaggttaat acaatccctg gctttgatgg agtagtcaag    600

gatgcagaag aagctgtcag aattgcaagg gaaattggct accctgtcat gatcaaggcc    660

tcagcaggtg gtggtgggaa aggcatgcgc attgcttggg atgatgaaga gaccagggat    720

ggttttagat tgtcatctca agaagctgct tctagttttg gcgatgatag actactaata    780

gaaaaattta ttgataatcc tcgtcatata gaaatccagg ttctaggtga taaacatggg    840

aatgctttat ggcttaatga aagagagtgc tcaattcaga gaagaaatca gaaggtggtg    900

gaggaagcac caagcatttt tttggatgcg gagactcgaa gagcgatggg agaacaagct    960

gtagctcttg ccagagcagt aaaatattcc tctgctggga ccgtggagtt ccttgtggac   1020

tctaagaaga atttttattt cttggaaatg aatacaagac tccaggttga gcatcctgtc   1080

acagaatgca ttactggcct ggacctagtc caggaaatga tccgtgttgc taagggctac   1140

cctctcaggc acaaacaagc tgatattcgc atcaacggct gggcagttga atgtcgggtt   1200

tatgctgagg acccctacaa gtcttttggt ttaccatcta ttgggagatt gtctcagtac   1260

caagaaccgt tacatctacc tggtgtccga gtggacagtg gcatccaacc aggaagtgat   1320

attagcattt attatgatcc tatgatttca aaactaatca catatggctc tgatagaact   1380

gaggcactga agagaatggc agatgcactg gataactatg ttattcgagg tgttacacat   1440

aatattgcat tacttcgaga ggtgataatc aactcacgct ttgtaaaagg agacatcagc   1500

actaaatttc tctccgatgt gtatcctgat ggcttcaaag gacacatgct aaccaagagt   1560

gagaagaacc agttattggc aatagcatca tcattgtttg tggcattcca gttaagagca   1620

caacattttc aagaaaattc aagaatgcct gttattaaac cagacatagc caactgggag   1680

ctctcagtaa aattgcatga taaagttcat accgtagtag catcaaacaa tgggtcagtg   1740

ttctcggtgg aagttgatgg gtcgaaacta aatgtgacca gcacgtggaa cctggcttcg   1800

cccttattgt ctgtcagcgt tgatggcact cagaggactg tccagtgtct ttctcgagaa   1860

gcaggtggaa acatgagcat tcagtttctt ggtacagtgt acaaggtgaa tatcttaacc   1920
```

```
agacttgccg cagaattgaa caaatttatg ctggaaaaag tgactgagga cacaagcagt   1980

gttctgcgtt ccccgatgcc cggagtggtg gtggccgtct ctgtcaagcc tggagacgcg   2040

gtagcagaag gtcaagaaat ttgtgtgatt gaagccatga aaatgcagaa tagtatgaca   2100

gctgggaaaa ctggcacggt gaaatctgtg cactgtcaag ctggagacac agttggagaa   2160

ggggatctgc tcgtggagct ggaa                                          2184


<210> SEQ ID NO 2
<211> LENGTH: 2184
<212> TYPE: DNA
<213> ORGANISM: Artificial Sequence
<220> FEATURE:
<223> OTHER INFORMATION: Description of Artificial Sequence: PCCA Coding
      Sequence - Codon-Optimized

<400> SEQUENCE: 2

atggctggat tttgggtcgg aacggcccct ctcgtggccg ccggccgccg gggtcggtgg     60

ccgccgcaac agctgatgtt gtcggccgcg ctgcgcaccc ttaagcatgt gctgtactac    120

tcccggcaat gccttatggt gtccagaaac ctgggtagcg tgggctatga cccgaacgag    180

aaaaccttcg acaagattct ggtggccaac cggggggaaa ttgcctgccg ggtcatcagg    240

acttgcaaga agatgggcat caagaccgtc gccattcact ccgacgtgga cgcctcctcc    300

gtgcacgtga agatggcaga tgaagccgtc tgcgtgggcc ccgccccgac ctccaagtcc    360

taccttaaca tggacgcgat catggaagcc atcaaaaaga ccagagccca ggcagtgcac    420

ccgggatacg gctttctctc cgaaaacaag gagttcgcgc ggtgcctggc cgctgaagat    480

gtcgtgttca tcggccctga tacccacgcg atccaggcta tgggagacaa gatcgaatcc    540

aagctgctcg ccaagaaagc cgaagtcaac accatacctg ggtttgacgg cgtggtcaag    600

gacgcagaag aagccgtcag gattgcccgc gagatcggat accccgtgat gatcaaggca    660

tccgccgggg ggggaggaaa gggaatgcgc atcgcctggg atgacgaaga aacccgggac    720

ggcttcagac tctcgtcaca agaggccgcg tcctcattcg gggatgaccg gctcctgatt    780

gagaagttca ttgacaatcc tcggcacatc gagattcagg tcctgggcga taagcatgga    840

aacgccctgt ggctgaacga acgcgaatgc agcatccaga ggcggaacca gaaagtggtg    900

gaagaggccc catccatctt tctcgacgcc gagactcgga gagcgatggg tgaacaggcc    960

gtggccctgg cccgagccgt gaagtactcc agcgcgggga ctgtcgagtt cctggtggac   1020

agcaagaaga atttctactt cctggagatg aatactcggc tccaagtgga acaccccgtg   1080

accgaatgca ttaccggtct ggacctcgtc caagaaatga tccgcgtcgc caagggctac   1140

ccattgagac acaaacaggc cgacattcgg atcaacggat gggccgtcga gtgtcgcgtg   1200

tacgcggaag atccgtataa gtcgttcgga ctgccgtcca ttggtagact ctcgcagtac   1260

caagagccac tgcacctccc cggagtgcgc gtggactcag gcatccagcc cggaagcgac   1320

atctctatct actacgaccc catgatttcc aagttgatca cctacgggtc cgataggacc   1380

gaggcactga agcgcatggc tgacgcactt gacaactacg tgatccgcgg ggtcactcac   1440

aacattgccc tgctccgcga agtgatcatc aactcgcgct tcgtgaaggg cgacatctcc   1500

actaagttcc tgtccgacgt gtaccctgac ggtttcaagg gccatatgct gaccaagtcc   1560

gagaagaacc agctcctggc tatcgcctcc tccctgtttg tggcgttcca gctgagggcg   1620

cagcacttcc aggagaacag ccggatgccc gtgatcaagc ctgacatcgc caattgggag   1680

ctgtccgtga agctgcacga taaggtccat accgtggtgg catccaacaa cggatcggtg   1740
```

```
ttcagcgtgg aagtggacgg gtccaagctg aacgtgacca gcacatggaa cctggcgtcc   1800

cccctgttgt ctgtgtcggt cgatggcacg cagcgcactg tgcagtgcct ctcccgggaa   1860

gctggcggaa acatgagcat ccagttcctg ggtactgtgt acaaggtcaa cattctgact   1920

cggctggccg ccgagctgaa caagttcatg ttggaaaaag tcaccgaaga tacatcgtca   1980

gtcctgcgga gcccaatgcc tggagtcgtg gtggcggtgt cagtgaagcc cggcgatgct   2040

gtggccgaag gccaagagat ctgcgtgatc gaggccatga agatgcagaa ctcgatgacc   2100

gccggaaaga ccggtaccgt gaagtccgtg cattgtcaag cgggcgacac tgtgggagag   2160

ggagatctgc tcgtggagct ggag                                          2184
```

<210> SEQ ID NO 3
<211> LENGTH: 2184
<212> TYPE: DNA
<213> ORGANISM: Artificial Sequence
<220> FEATURE:
<223> OTHER INFORMATION: Description of Artificial Sequence: PCCA Coding Sequence - Codon-Optimized

<400> SEQUENCE: 3

```
atggccggct tctgggtcgg caccgcccct ctggtcgcgg ccggacgacg cggacgctgg     60

ccaccccagc aactgatgct gagcgcggcc ttgaggactc tgaagcacgt gctctactac    120

tcgcggcagt gcctgatggt gtcccggaat ctggggtccg tgggatacga ccctaacgaa    180

aagaccttcg ataagatcct cgtggcaaat cggggagaga tcgcgtgtcg cgtgatccgc    240

acgtgcaaga agatggggat caagactgtg gcaatccata gcgatgtgga tgcatcctcg    300

gtccacgtga agatggccga cgaagctgtg tgcgtgggac cggcgccgac ttcgaaatcg    360

tacctgaaca tggacgctat tatggaggcg atcaagaaaa cgcgcgccca agcggtccat    420

cccggttacg gattcctgag cgagaacaag gaatttgcac ggtgcctcgc tgccgaggac    480

gtggtgttta tcggtcccga cacccacgcc atccaagcta tgggggacaa gattgagtcc    540

aagctcctgg cgaaaaaggc agaggtcaac acaattcctg gtttcgacgg cgtcgtgaag    600

gacgccgaag aagccgtgcg catcgcgagg gaaatcggtt accctgtgat gattaaggcc    660

tccgccggcg gcggtggaaa gggaatgaga attgcctggg acgatgaaga aacccgcgac    720

ggattccgcc tgtcgagcca ggaagccgcc tcttccttcg gcgatgacag actgctgatc    780

gaaaagttca tcgataaccc cagacacatt gagatccaag tgctcgggga taagcacggc    840

aacgcccttt ggctgaacga gagagagtgc tccattcaac gccgcaatca gaaggtcgtg    900

gaggaagccc cgtcgatatt cctggatgcc gaaacccggc gggccatggg agagcaggct    960

gtcgcgttgg cgcgggccgt caagtacagc tcggccggga ccgtggaatt tctggtcgat   1020

tccaagaaga acttctattt cctggagatg aacaccagac tccaggtcga gcacccggtc   1080

actgagtgta tcaccgggct cgatctggtg caagagatga ttcgggtggc gaagggatat   1140

ccccttcggc ataaacaagc cgacatcagg atcaacggtt gggccgtgga atgcagggtc   1200

tacgccgagg acccctacaa gagcttcggc ctgcccagca tcggccgcct gtcacagtat   1260

caggaaccgc tgcatcttcc gggcgtgcgg gtcgacagcg gaattcagcc tggctcagat   1320

atctccatct actacgatcc aatgatctca aagctgatta cttatggatc cgaccggacc   1380

gaagccctta agcgaatggc cgacgccctg gacaactacg tgatccgggg agtgacccac   1440

aacatcgcct tgctgcggga agtgatcatt aacagcagat tcgtgaaggg agacatcagc   1500

accaagttcc tgtcggatgt ctacccggac gggttcaaag ggcacatgct tactaagtcc   1560
```

```
gagaagaatc agctgctcgc cattgcgtca agcttgttcg tggcctttca actccgggcc   1620

cagcacttcc aggaaaactc ccgcatgcca gtcattaagc cggacatcgc caactgggaa   1680

ctcagcgtga agctccatga caaagtgcat accgtggtgg ccagcaacaa cggtagcgtg   1740

ttctcagtcg aggtcgatgg ctcgaagctc aacgtcactt ccacttggaa cttggccagc   1800

ccgctgctgt ccgtgtccgt ggacggaacc cagaggaccg tgcagtgtct gtcgagagaa   1860

gccggcggca acatgtcaat ccagttcctg ggaaccgtgt acaaggtcaa catcctgacc   1920

agactggccg ccgaactgaa caagtttatg ctcgagaaag tgaccgagga cactagctcc   1980

gtgctgcgct cccctatgcc cggagtggtc gtggcagtgt ccgtgaagcc gggcgacgcc   2040

gtggccgagg gacaggaaat ctgtgtgatc gaagcgatga agatgcagaa ttcaatgacc   2100

gcgggaaaga ctgggaccgt gaagtctgtg cactgccagg ctggcgatac cgtgggggag   2160

ggcgaccttc tggtggaact cgag                                          2184
```

```
<210> SEQ ID NO 4
<211> LENGTH: 2184
<212> TYPE: DNA
<213> ORGANISM: Artificial Sequence
<220> FEATURE:
<223> OTHER INFORMATION: Description of Artificial Sequence: PCCA Coding
      Sequence - Codon-Optimized

<400> SEQUENCE: 4

atggctgggt tttgggtggg gacagctcct ctggtggctg ctgggaggag gggggaggtgg     60

cctcctcagc agctgatgct gtctgctgct ctgaggacac tgaagcatgt gctgtattat    120

tctaggcagt gtctgatggt gtctaggaat ctggggtctg tggggtatga tcctaatgag    180

aagacatttg ataagattct ggtggctaat agggggggaga ttgcttgtag ggtgattagg    240

acatgtaaga agatggggat taagacagtg gctattcatt ctgatgtgga tgcttcttct    300

gtgcatgtga agatggctga tgaggctgtg tgtgtggggc ctgctcctac atctaagtct    360

tatctgaata tggatgctat tatggaggct attaagaaga caagggctca ggctgtgcat    420

cctgggtatg ggtttctgtc tgagaataag gagtttgcta ggtgtctggc tgctgaggat    480

gtggtgttta ttgggcctga tacacatgct attcaggcta tggggggataa gattgagtct    540

aagctgctgg ctaagaaggc tgaggtgaat acaattcctg ggtttgatgg ggtggtgaag    600

gatgctgagg aggctgtgag gattgctagg gagattgggt atcctgtgat gattaaggct    660

tctgctgggg gggggggaa ggggatgagg attgcttggg atgatgagga gacaagggat    720

gggtttaggc tgtcttctca ggaggctgct tcttcttttg ggatgatag gctgctgatt    780

gagaagttta ttgataatcc taggcatatt gagattcagg tgctgggggga taagcatggg    840

aatgctctgt ggctgaatga gagggagtgt tctattcaga ggaggaatca gaaggtggtg    900

gaggaggctc cttctatttt tctggatgct gagacaagga gggctatggg ggagcaggct    960

gtggctctgg ctagggctgt gaagtattct tctgctggga cagtggagtt tctggtggat   1020

tctaagaaga atttttattt tctggagatg aatacaaggc tgcaggtgga gcatcctgtg   1080

acagagtgta ttacagggct ggatctggtg caggagatga ttagggtggc taaggggtat   1140

cctctgaggc ataagcaggc tgatattagg attaatgggt gggctgtgga gtgtagggtg   1200

tatgctgagg atccttataa gtcttttggg ctgccttcta ttgggaggct gtctcagtat   1260

caggagcctc tgcatctgcc tggggtgagg gtggattctg ggattcagcc tgggtctgat   1320

atttctattt attatgatcc tatgatttct aagctgatta catatgggtc tgataggaca   1380
```

```
gaggctctga agaggatggc tgatgctctg gataattatg tgattagggg ggtgacacat   1440

aatattgctc tgctgaggga ggtgattatt aattctaggt ttgtgaaggg ggatatttct   1500

acaaagtttc tgtctgatgt gtatcctgat gggtttaagg ggcatatgct gacaaagtct   1560

gagaagaatc agctgctggc tattgcttct tctctgtttg tggcttttca gctgagggct   1620

cagcattttc aggagaattc taggatgcct gtgattaagc ctgatattgc taattgggag   1680

ctgtctgtga agctgcatga taaggtgcat acagtggtgg cttctaataa tgggtctgtg   1740

ttttctgtgg aggtggatgg gtctaagctg aatgtgacat ctacatggaa tctggcttct   1800

cctctgctgt ctgtgtctgt ggatgggaca cagaggacag tgcagtgtct gtctagggag   1860

gctgggggga atatgtctat tcagtttctg gggacagtgt ataaggtgaa tattctgaca   1920

aggctggctg ctgagctgaa taagtttatg ctggagaagg tgacagagga tacatcttct   1980

gtgctgaggt ctcctatgcc tggggtggtg gtggctgtgt ctgtgaagcc tggggatgct   2040

gtggctgagg ggcaggagat ttgtgtgatt gaggctatga agatgcagaa ttctatgaca   2100

gctgggaaga cagggacagt gaagtctgtg cattgtcagg ctggggatac agtgggggag   2160

ggggatctgc tggtggagct ggag                                          2184


<210> SEQ ID NO 5
<211> LENGTH: 2184
<212> TYPE: DNA
<213> ORGANISM: Artificial Sequence
<220> FEATURE:
<223> OTHER INFORMATION: Description of Artificial Sequence: PCCA Coding
      Sequence - Codon-Optimized

<400> SEQUENCE: 5

atggcagggt tttgggtggg gacagcacca ctggtggcag cagggaggag ggggaggtgg     60

ccaccacagc agctgatgct gtcagcagca ctgaggacac tgaagcatgt gctgtattat    120

tcaaggcagt gtctgatggt gtcaaggaat ctggggtcag tggggtatga tccaaatgag    180

aagacatttg ataagattct ggtggcaaat agggggggaga ttgcatgtag ggtgattagg    240

acatgtaaga agatggggat taagacagtg gcaattcatt cagatgtgga tgcatcatca    300

gtgcatgtga agatggcaga tgaggcagtg tgtgtggggc cagcaccaac atcaaagtca    360

tatctgaata tggatgcaat tatggaggca attaagaaga caagggcaca ggcagtgcat    420

ccagggtatg ggtttctgtc agagaataag gagtttgcaa ggtgtctggc agcagaggat    480

gtggtgttta ttgggccaga tacacatgca attcaggcaa tgggggataa gattgagtca    540

aagctgctgg caaagaaggc agaggtgaat acaattccag ggtttgatgg ggtggtgaag    600

gatgcagagg aggcagtgag gattgcaagg gagattgggt atccagtgat gattaaggca    660

tcagcagggg gggggggaa ggggatgagg attgcatggg atgatgagga gacaagggat    720

gggtttaggc tgtcatcaca ggaggcagca tcatcatttg gggatgatag gctgctgatt    780

gagaagttta ttgataatcc aaggcatatt gagattcagg tgctgggggga taagcatggg    840

aatgcactgt ggctgaatga gagggagtgt tcaattcaga ggaggaatca gaaggtggtg    900

gaggaggcac catcaatttt tctggatgca gagacaagga gggcaatggg ggagcaggca    960

gtggcactgg caagggcagt gaagtattca tcagcaggga cagtggagtt tctggtggat   1020

tcaaagaaga atttttattt tctggagatg aatacaaggc tgcaggtgga gcatccagtg   1080

acagagtgta ttacagggct ggatctggtg caggagatga ttagggtggc aaaggggtat   1140

ccactgaggc ataagcaggc agatattagg attaatgggt gggcagtgga gtgtagggtg   1200
```

```
tatgcagagg atccatataa gtcatttggg ctgccatcaa ttgggaggct gtcacagtat   1260

caggagccac tgcatctgcc aggggtgagg gtggattcag ggattcagcc agggtcagat   1320

atttcaattt attatgatcc aatgatttca aagctgatta catatgggtc agataggaca   1380

gaggcactga agaggatggc agatgcactg gataattatg tgattagggg ggtgacacat   1440

aatattgcac tgctgaggga ggtgattatt aattcaaggt ttgtgaaggg ggatatttca   1500

acaaagtttc tgtcagatgt gtatccagat gggtttaagg ggcatatgct gacaaagtca   1560

gagaagaatc agctgctggc aattgcatca tcactgtttg tggcatttca gctgagggca   1620

cagcattttc aggagaattc aaggatgcca gtgattaagc cagatattgc aaattgggag   1680

ctgtcagtga agctgcatga taaggtgcat acagtggtgg catcaaataa tgggtcagtg   1740

ttttcagtgg aggtggatgg gtcaaagctg aatgtgacat caacatggaa tctggcatca   1800

ccactgctgt cagtgtcagt ggatgggaca cagaggacag tgcagtgtct gtcaagggag   1860

gcaggggggga atatgtcaat tcagtttctg ggacagtgt ataaggtgaa tattctgaca   1920

aggctggcag cagagctgaa taagtttatg ctggagaagg tgacagagga tacatcatca   1980

gtgctgaggt caccaatgcc aggggtggtg gtggcagtgt cagtgaagcc aggggatgca   2040

gtggcagagg ggcaggagat ttgtgtgatt gaggcaatga agatgcagaa ttcaatgaca   2100

gcagggaaga cagggacagt gaagtcagtg cattgtcagg caggggatac agtgggggag   2160

ggggatctgc tggtggagct ggag                                          2184
```

```
<210> SEQ ID NO 6
<211> LENGTH: 2184
<212> TYPE: DNA
<213> ORGANISM: Artificial Sequence
<220> FEATURE:
<223> OTHER INFORMATION: Description of Artificial Sequence: PCCA Coding
      Sequence - Codon-Optimized

<400> SEQUENCE: 6

atggctggtt tttgggtagg tacagcacca ctagtagcag caggtaggag gggtaggtgg     60

ccaccacaac aactaatgct atcagcagca ctaaggacac taaagcatgt actatattat    120

tcaaggcaat gtctaatggt atcaaggaat ctggggtctg tggggtatga tcctaatgag    180

aagacatttg ataagattct ggtggctaat aggggggaga ttgcttgtag ggtgattagg    240

acatgtaaga agatggggat taagacagtg gctattcatt ctgatgtgga tgcttcttct    300

gtgcatgtga agatggctga tgaggctgtg tgtgtggggc ctgctcctac atctaagtct    360

tatctgaata tggatgctat tatggaggct attaagaaga caagggctca ggctgtgcat    420

cctgggtatg ggtttctgtc tgagaataag gagtttgcta ggtgtctggc tgctgaggat    480

gtggtgttta ttgggcctga tacacatgct attcaggcta tgggggataa gattgagtct    540

aagctgctgg ctaagaaggc tgaggtgaat acaattcctg ggtttgatgg ggtggtgaag    600

gatgctgagg aggctgtgag gattgctagg gagattgggt atcctgtgat gattaaggct    660

tctgctgggg ggggggggaa ggggatgagg attgcttggg atgatgagga gacaagggat    720

gggtttaggc tgtcttctca ggaggctgct tcttcttttg gggatgatag gctgctgatt    780

gagaagttta ttgataatcc taggcatatt gagattcagg tgctggggga taagcatggg    840

aatgctctgt ggctgaatga gagggagtgt tctattcaga ggaggaatca gaaggtggtg    900

gaggaggctc cttctatttt tctggatgct gagacaagga gggctatggg ggagcaggct    960

gtggctctgg ctagggctgt gaagtattct tctgctggga cagtggagtt tctggtggat   1020
```

```
tctaagaaga atttttattt tctggagatg aatacaaggc tgcaggtgga gcatcctgtg   1080
acagagtgta ttacagggct ggatctggtg caggagatga ttagggtggc taaggggtat   1140
cctctgaggc ataagcaggc tgatattagg attaatgggt gggctgtgga gtgtagggtg   1200
tatgctgagg atccttataa gtcttttggg ctgccttcta ttgggaggct gtctcagtat   1260
caggagcctc tgcatctgcc tggggtgagg gtggattctg ggattcagcc tgggtctgat   1320
atttctattt attatgatcc tatgatttct aagctgatta catatgggtc tgataggaca   1380
gaggctctga agaggatggc tgatgctctg gataattatg tgattagggg ggtgacacat   1440
aatattgctc tgctgaggga ggtgattatt aattctaggt ttgtgaaggg ggatatttct   1500
acaaagtttc tgtctgatgt gtatcctgat gggtttaagg ggcatatgct gacaaagtct   1560
gagaagaatc agctgctggc tattgcttct tctctgtttg tggcttttca gctgagggct   1620
cagcattttc aggagaattc taggatgcct gtgattaagc ctgatattgc taattgggag   1680
ctgtctgtga agctgcatga taaggtgcat acagtggtgg cttctaataa tgggtctgtg   1740
ttttctgtgg aggtggatgg gtctaagctg aatgtgacat ctacatggaa tctggcttct   1800
cctctgctgt ctgtgtctgt ggatgggaca cagaggacag tgcagtgtct gtctagggag   1860
gctgggggga atatgtctat tcagtttctg ggacagtgt ataaggtgaa tattctgaca   1920
aggctggctg ctgagctgaa taagtttatg ctggagaagg tgacagagga tacatcttct   1980
gtgctgaggt ctcctatgcc tggggtggtg gtggctgtgt ctgtgaagcc tggggatgct   2040
gtggctgagg ggcaggagat ttgtgtgatt gaggctatga agatgcagaa ttctatgaca   2100
gctgggaaga cagggacagt gaagtctgtg cattgtcagg ctggggatac agtgggggag   2160
ggggatctgc tggtggagct ggag                                          2184
```

<210> SEQ ID NO 7
<211> LENGTH: 1617
<212> TYPE: DNA
<213> ORGANISM: Homo sapiens

<400> SEQUENCE: 7

```
atggcggcgg cattacgggt ggcggcggtc ggggcaaggc tcagcgttct ggcgagcggt     60
ctccgcgccg cggtccgcag cctttgcagc caggccacct ctgttaacga acgcatcgaa    120
aacaagcgcc ggaccgcgct gctgggaggg ggccaacgcc gtattgacgc gcagcacaag    180
cgaggaaagc taacagccag ggagaggatc agtctcttgc tggaccctgg cagctttgtt    240
gagagcgaca tgtttgtgga acacagatgt gcagattttg gaatggctgc tgataagaat    300
aagtttcctg gagacagcgt ggtcactgga cgaggccgaa tcaatggaag attggtttat    360
gtcttcagtc aggattttac agtttttgga ggcagtctgt caggagcaca tgcccaaaag    420
atctgcaaaa tcatggacca ggccataacg gtgggggctc cagtgattgg gctgaatgac    480
tctgggggag cacggatcca agaaggagtg gagtctttgg ctggctatgc agacatcttt    540
ctgaggaatg ttacggcatc cggagtcatc cctcagattt ctctgatcat gggcccatgt    600
gctggtgggg ccgtctactc cccagcccta acagacttca cgttcatggt aaaggacacc    660
tcctacctgt tcatcactgg ccctgatgtt gtgaagtctg tcaccaatga ggatgttacc    720
caggaggagc tcggtggtgc caagacccac accaccatgt caggtgtggc ccacagagct    780
tttgaaaatg atgttgatgc cttgtgtaat ctccgggatt tcttcaacta cctgcccctg    840
agcagtcagg acccggctcc cgtccgtgag tgccacgatc ccagtgaccg tctggttcct    900
gagcttgaca caattgtccc tttggaatca accaaagcct acaacatggt ggacatcata    960
```

```
cactctgttg ttgatgagcg tgaatttttt gagatcatgc ccaattatgc caagaacatc   1020
attgttggtt ttgcaagaat gaatgggagg actgttggaa ttgttggcaa ccaacctaag   1080
gtggcctcag gatgcttgga tattaattca tctgtgaaag gggctcgttt tgtcagattc   1140
tgtgatgcat tcaatattcc actcatcact tttgttgatg tccctggctt tctacctggc   1200
acagcacagg aatacggggg catcatccgg catggtgcca agcttctcta cgcatttgct   1260
gaggcaactg tacccaaagt cacagtcatc accaggaagg cctatggagg tgcctatgat   1320
gtcatgagct ctaagcacct ttgtggtgat accaactatg cctggcccac cgcagagatt   1380
gcagtcatgg gagcaaaggg cgctgtggag atcatcttca aagggcatga gaatgtggaa   1440
gctgctcagg cagagtacat cgagaagttt gccaaccctt tccctgcagc agtgcgaggg   1500
tttgtggatg acatcatcca accttcttcc acacgtgccc gaatctgctg tgacctggat   1560
gtcttggcca gcaagaaggt acaacgtcct tggagaaaac atgcaaatat tccattg      1617
```

<210> SEQ ID NO 8
<211> LENGTH: 1617
<212> TYPE: DNA
<213> ORGANISM: Artificial Sequence
<220> FEATURE:
<223> OTHER INFORMATION: Description of Artificial Sequence: PCCB Coding Sequence - Codon-Optimized

<400> SEQUENCE: 8

```
atggctgccg ccctgcgcgt ggcggccgtg ggagcaagac tgtccgtgct ggcgtcgggc     60
ttgagagcgg ccgtgcggag cctgtgctca caagcaacct cggtgaacga acgcatcgag    120
aacaagcgca ggactgcgct gctgggcggg ggccagcgca ggatcgacgc acagcataag    180
cgcggaaagc tgaccgcccg cgagcggatt tccctgctcc tggatcctgg aagcttcgtg    240
gagtccgaca tgttcgtgga gcaccgctgc gccgacttcg ggatggctgc cgacaagaac    300
aagttccccg gggactcagt ggtcactggt cgcggaagaa tcaatggccg gctcgtctac    360
gtgttctcac aagactttac tgtgttcggc ggctccctgt cgggagccca cgcgcaaaag    420
atctgcaaga ttatggatca ggccatcact gtgggagcgc ctgtgattgg actcaacgac    480
tccgggggag caagaatcca ggaaggagtg gaaagccttg ccggctacgc tgacatcttc    540
ctccggaacg tgaccgcctc tggagtgatt ccgcaaatct ccctgatcat gggaccatgt    600
gccgggggcg ccgtgtactc cccggcgctg actgacttca ctttcatggt caaggacaca    660
tcctacctgt tcatcaccgg tcccgacgtc gtgaagtccg tgaccaacga ggatgtgacc    720
caggaagaac tgggggggc caagacgcat accaccatgt cgggagtggc ccaccgggcc    780
ttcgagaacg atgtggacgc cttgtgcaac cttcgggact tcttcaatta tctcccgctg    840
agcagccagg atccggcccc agtgcgggaa tgccacgacc cttcggatcg gttggtgcct    900
gagctggata ccatcgtgcc cctcgaatcc accaaggctt acaacatggt cgacatcatt    960
cactccgtgg tggacgagag ggaattcttc gagattatgc cgaactacgc caagaacatc   1020
attgtcggat tcgcccgcat gaacggtcga actgtgggca ttgtcggaaa ccagcctaaa   1080
gtggcctccg gttgcctgga catcaactca agcgtgaagg gtgccagatt tgtgcggttt   1140
tgtgacgcgt tcaatattcc gctgatcacc ttcgtcgacg tcccgggctt cctgcctggg   1200
accgcccagg aatacggcgg catcatcaga cacggcgcga agctcctcta cgcgttcgcg   1260
gaagccaccg tgcccaaggt caccgtgatc actcgcaagg catacggcgg cgcatacgat   1320
gtgatgtcct ccaagcacct gtgtggcgac accaactacg cctggcccac cgccgagatc   1380
```

```
gccgtgatgg gtgccaaggg tgctgtcgag atcatcttca agggacatga aaacgtggaa   1440

gctgcccagg ccgagtacat tgaaaagttc gctaacccct tccctgccgc cgtgcgggga   1500

tttgtggatg acattatcca gccgagctcg accagggcca gaatctgctg cgatcttgat   1560

gtgttggcca gcaaaaaggt ccagcggccc tggcggaaac acgccaacat tccactg      1617
```

<210> SEQ ID NO 9
<211> LENGTH: 1617
<212> TYPE: DNA
<213> ORGANISM: Artificial Sequence
<220> FEATURE:
<223> OTHER INFORMATION: Description of Artificial Sequence: PCCB Coding Sequence - Codon-Optimized

<400> SEQUENCE: 9

```
atggccgcgg cgcttagagt ggccgctgtg ggagccaggc tgagcgtgct ggccagcggt     60

ctgcgcgccg cagtgcgctc gctgtgtagc caggctacct ccgtgaatga gcggatcgaa    120

aacaagcggc gcaccgccct gttgggcggc ggacagcggc gaattgacgc ccaacacaag    180

cggggaaagc tcactgcgag ggaaagaatc tcactgctgc tcgaccccgg gtcgttcgtg    240

gaatcggata tgtttgtcga acatagatgc gcagatttcg gaatggccgc tgacaagaac    300

aagttcccgg gagattccgt cgtgaccgga agggggcgca ttaacgggag acttgtgtac    360

gtgttcagcc aggatttcac ggtgttcggc ggatcactga gcggtgcaca tgcacagaag    420

atctgcaaga tcatggacca ggccattacc gtcggggcac ctgtgatcgg cctgaatgat    480

tcgggcggag cccggattca agagggcgtg gagtcactcg cgggttacgc cgacattttc    540

ctgcggaacg tcaccgcctc cggcgtgatc cctcaaatca gcctcattat gggcccctgc    600

gcgggcggtg ccgtctactc acccgctctg accgatttta ccttcatggt caaggacacc    660

tcctatctgt ttatcactgg accagatgtg gtcaagtccg tgaccaacga ggacgtcact    720

caggaagaac tcggtggagc aaagacccac actactatgt ccggggtcgc gcatagagct    780

ttcgaaaacg acgtcgatgc tctctgtaac ctgagggatt tcttcaacta ccttccactg    840

tcgtcgcaag acccagcccc cgtgcgcgag tgccacgatc cctccgaccg cctggtgccg    900

gaactcgaca ctattgtccc tctggagtca accaaggcct acaacatggt ggacatcatc    960

catagcgtcg tggatgaacg ggagttcttc gaaatcatgc ccaactatgc gaaaaatatc   1020

atcgtgggct ttgcgcggat gaacggccgc accgtgggca tagtgggcaa ccagccgaag   1080

gtcgcgtcgg gatgcctcga tatcaacagc tctgtgaagg gagcgcggtt cgtgcgcttc   1140

tgcgacgcct tcaacatccc cttgatcacc ttcgtggatg tgcctgggtt cttgcctgga   1200

accgcccagg aatacggggg gatcattcgg cacggagcaa aactgctgta cgccttcgcc   1260

gaggccactg tgccgaaagt gacagtgatt acccggaagg cctacggggg tgcctacgac   1320

gtgatgagct ccaagcacct gtgcggagac accaattacg cgtggcctac tgctgaaatt   1380

gctgtcatgg gagccaaggg cgccgtggaa atcattttca agggccacga aaacgtcgag   1440

gccgcccaag ctgagtacat cgagaagttt gccaacccgt ttcctgcggc tgtgcgcggc   1500

ttcgtcgacg atatcattca gccctcgtcc actcgcgccc gcatttgttg tgacctcgac   1560

gtgctggcgt ccaagaaagt gcaaagaccg tggagaaagc atgcaaacat cccgctc      1617
```

<210> SEQ ID NO 10
<211> LENGTH: 1617
<212> TYPE: DNA
<213> ORGANISM: Artificial Sequence

```
<220> FEATURE:
<223> OTHER INFORMATION: Description of Artificial Sequence: PCCB Coding
      Sequence - Codon-Optimized

<400> SEQUENCE: 10

atggctgctg ctctgagggt ggctgctgtg ggggctaggc tgtctgtgct ggcttctggg     60

ctgagggctg ctgtgaggtc tctgtgttct caggctacat ctgtgaatga gaggattgag    120

aataagagga ggacagctct gctggggggg gggcagagga ggattgatgc tcagcataag    180

agggggaagc tgacagctag ggagaggatt tctctgctgc tggatcctgg gtcttttgtg    240

gagtctgata tgtttgtgga gcataggtgt gctgattttg ggatggctgc tgataagaat    300

aagtttcctg ggggattctgt ggtgacaggg agggggagga ttaatgggag gctggtgtat    360

gtgttttctc aggattttac agtgtttggg ggtctctgt ctggggctca tgctcagaag    420

atttgtaaga ttatggatca ggctattaca gtgggggctc ctgtgattgg gctgaatgat    480

tctgggggg ctaggattca ggagggggtg gagtctctgg ctgggtatgc tgatattttt    540

ctgaggaatg tgacagcttc tggggtgatt cctcagattt ctctgattat ggggccttgt    600

gctgggggg ctgtgtattc tcctgctctg acagatttta catttatggt gaaggataca    660

tcttatctgt ttattacagg gcctgatgtg gtgaagtctg tgacaaatga ggatgtgaca    720

caggaggagc tggggggggc taagacacat acaacaatgt ctggggtggc tcatagggct    780

tttgagaatg atgtggatgc tctgtgtaat ctgagggatt tttttaatta tctgcctctg    840

tcttctcagg atcctgctcc tgtgagggag tgtcatgatc cttctgatag gctggtgcct    900

gagctggata caattgtgcc tctggagtct acaaaggctt ataatatggt ggatattatt    960

cattctgtgg tggatgagag ggagtttttt gagattatgc ctaattatgc taagaatatt   1020

attgtggggt ttgctaggat gaatgggagg acagtgggga ttgtggggaa tcagcctaag   1080

gtggcttctg ggtgtctgga tattaattct tctgtgaagg gggctaggtt tgtgaggttt   1140

tgtgatgctt ttaatattcc tctgattaca tttgtggatg tgcctgggtt tctgcctggg   1200

acagctcagg agtatggggg gattattagg catggggcta agctgctgta tgcttttgct   1260

gaggctacag tgcctaaggt gacagtgatt acaaggaagg cttatggggg ggcttatgat   1320

gtgatgtctt ctaagcatct gtgtggggat acaaattatg cttggcctac agctgagatt   1380

gctgtgatgg gggctaaggg ggctgtggag attattttta aggggcatga gaatgtggag   1440

gctgctcagg ctgagtatat tgagaagttt gctaatcctt ttcctgctgc tgtgaggggg   1500

tttgtggatg atattattca gccttcttct acaagggcta ggatttgttg tgatctggat   1560

gtgctggctt ctaagaaggt gcagaggcct tggaggaagc atgctaatat tcctctg      1617


<210> SEQ ID NO 11
<211> LENGTH: 1617
<212> TYPE: DNA
<213> ORGANISM: Artificial Sequence
<220> FEATURE:
<223> OTHER INFORMATION: Description of Artificial Sequence: PCCB Coding
      Sequence - Codon-Optimized

<400> SEQUENCE: 11

atggcagcag cactgagggt ggcagcagtg ggggcaaggc tgtcagtgct ggcatcaggg     60

ctgagggcag cagtgaggtc actgtgttca caggcaacat cagtgaatga gaggattgag    120

aataagagga ggacagcact gctggggggg gggcagagga ggattgatgc acagcataag    180

agggggaagc tgacagcaag ggagaggatt tcactgctgc tggatccagg gtcatttgtg    240
```

```
gagtcagata tgtttgtgga gcataggtgt gcagattttg ggatggcagc agataagaat    300

aagtttccag ggattcagt ggtgacaggg agggggagga ttaatgggag gctggtgtat    360

gtgttttcac aggattttac agtgtttggg gggtcactgt caggggcaca tgcacagaag    420

atttgtaaga ttatggatca ggcaattaca gtgggggcac cagtgattgg gctgaatgat    480

tcaggggggg caaggattca ggagggggtg gagtcactgg cagggtatgc agatattttt    540

ctgaggaatg tgacagcatc aggggtgatt ccacagattt cactgattat ggggccatgt    600

gcaggggggg cagtgtattc accagcactg acagatttta catttatggt gaaggataca    660

tcatatctgt ttattacagg gccagatgtg gtgaagtcag tgacaaatga ggatgtgaca    720

caggaggagc tgggggggc aaagacacat acaacaatgt caggggtggc acatagggca    780

tttgagaatg atgtggatgc actgtgtaat ctgagggatt tttttaatta tctgccactg    840

tcatcacagg atccagcacc agtgagggag tgtcatgatc catcagatag gctggtgcca    900

gagctggata caattgtgcc actggagtca acaaaggcat ataatatggt ggatattatt    960

cattcagtgg tggatgagag ggagtttttt gagattatgc caaattatgc aaagaatatt   1020

attgtggggt ttgcaaggat gaatgggagg acagtgggga ttgtggggaa tcagccaaag   1080

gtggcatcag ggtgtctgga tattaattca tcagtgaagg gggcaaggtt tgtgaggttt   1140

tgtgatgcat ttaatattcc actgattaca tttgtggatg tgccagggtt tctgccaggg   1200

acagcacagg agtatggggg gattattagg catggggcaa agctgctgta tgcatttgca   1260

gaggcaacag tgccaaaggt gacagtgatt acaaggaagg catatggggg ggcatatgat   1320

gtgatgtcat caaagcatct gtgtggggat acaaattatg catggccaac agcagagatt   1380

gcagtgatgg gggcaaaggg ggcagtggag attatttta aggggcatga gaatgtggag    1440

gcagcacagg cagagtatat tgagaagttt gcaaatccat ttccagcagc agtgaggggg   1500

tttgtggatg atattattca gccatcatca acaagggcaa ggatttgttg tgatctggat   1560

gtgctggcat caaagaaggt gcagaggcca tggaggaagc atgcaaatat tccactg      1617
```

<210> SEQ ID NO 12
<211> LENGTH: 1617
<212> TYPE: DNA
<213> ORGANISM: Artificial Sequence
<220> FEATURE:
<223> OTHER INFORMATION: Description of Artificial Sequence: PCCB Coding Sequence - Codon-Optimized

<400> SEQUENCE: 12

```
atggctgcag cactaagggt agcagcagta ggtgcaaggc tatcagtact agcatcaggt     60

ctaagggcag cagtaaggtc actatgttca caagcaacat cagtaaatga aaggatagaa    120

aataagagga ggacagcact actaggtggt gggcagagga ggattgatgc tcagcataag    180

agggggaagc tgacagctag ggagaggatt tctctgctgc tggatcctgg gtcttttgtg    240

gagtctgata tgtttgtgga gcataggtgt gctgattttg ggatggctgc tgataagaat    300

aagtttcctg ggattctgt ggtgacaggg agggggagga ttaatgggag gctggtgtat    360

gtgttttctc aggattttac agtgtttggg gggtctctgt ctggggctca tgctcagaag    420

atttgtaaga ttatggatca ggctattaca gtgggggctc ctgtgattgg gctgaatgat    480

tctggggggg ctaggattca ggagggggtg gagtctctgg ctgggtatgc tgatattttt    540

ctgaggaatg tgacagcttc tggggtgatt cctcagattt ctctgattat ggggccttgt    600

gctggggggg ctgtgtattc tcctgctctg acagatttta catttatggt gaaggataca    660
```

```
tcttatctgt ttattacagg gcctgatgtg gtgaagtctg tgacaaatga ggatgtgaca    720

caggaggagc tgggggggc taagacacat acaacaatgt ctggggtggc tcatagggct    780

tttgagaatg atgtggatgc tctgtgtaat ctgagggatt tttttaatta tctgcctctg    840

tcttctcagg atcctgctcc tgtgagggag tgtcatgatc cttctgatag gctggtgcct    900

gagctggata caattgtgcc tctggagtct acaaaggctt ataatatggt ggatattatt    960

cattctgtgg tggatgagag ggagtttttt gagattatgc ctaattatgc taagaatatt   1020

attgtggggt ttgctaggat gaatgggagg acagtgggga ttgtggggaa tcagcctaag   1080

gtggcttctg ggtgtctgga tattaattct tctgtgaagg gggctaggtt tgtgaggttt   1140

tgtgatgctt ttaatattcc tctgattaca tttgtggatg tgcctgggtt tctgcctggg   1200

acagctcagg agtatggggg gattattagg catggggcta agctgctgta tgcttttgct   1260

gaggctacag tgcctaaggt gacagtgatt acaaggaagg cttatggggg ggcttatgat   1320

gtgatgtctt ctaagcatct gtgtggggat acaaattatg cttggcctac agctgagatt   1380

gctgtgatgg gggctaaggg ggctgtggag attattttta aggggcatga gaatgtggag   1440

gctgctcagg ctgagtatat tgagaagttt gctaatcctt ttcctgctgc tgtgaggggg   1500

tttgtggatg atattattca gccttcttct acaagggcta ggatttgttg tgatctggat   1560

gtgctggctt ctaagaaggt gcagaggcct tggaggaagc atgctaatat tcctctg      1617
```

```
<210> SEQ ID NO 13
<211> LENGTH: 2211
<212> TYPE: DNA
<213> ORGANISM: Artificial Sequence
<220> FEATURE:
<223> OTHER INFORMATION: Description of Artificial Sequence: AAV9
      Nucleic Acid Sequence

<400> SEQUENCE: 13

atggctgccg atggttatct tccagattgg ctcgaggaca accttagtga aggaattcgc     60

gagtggtggg ctttgaaacc tggagcccct caacccaagg caaatcaaca acatcaagac    120

aacgctcgag gtcttgtgct tccgggttac aaataccttg gacccggcaa cggactcgac    180

aagggggagc cggtcaacgc agcagacgcg gcggccctcg agcacgacaa ggcctacgac    240

cagcagctca aggccggaga caacccgtac ctcaagtaca accacgccga cgccgagttc    300

caggagcggc tcaaagaaga tacgtctttt gggggcaacc tcgggcgagc agtcttccag    360

gccaaaaaga ggcttcttga acctcttggt ctggttgagg aagcggctaa gacggctcct    420

ggaaagaaga ggcctgtaga gcagtctcct caggaaccgg actcctccgc gggtattggc    480

aaatcgggtg cacagcccgc taaaaagaga ctcaatttcg gtcagactgg cgacacagag    540

tcagtcccag accctcaacc aatcggagaa cctcccgcag ccccctcagg tgtgggatct    600

cttacaatgg cttcaggtgg tggcgcacca gtggcagaca ataacgaagg tgccgatgga    660

gtgggtagtt cctcgggaaa ttggcattgc gattcccaat ggctggggga cagagtcatc    720

accaccagca cccgaacctg ggccctgccc acctacaaca atcacctcta caagcaaatc    780

tccaacagca catctggagg atcttcaaat gacaacgcct acttcggcta cagcaccccc    840

tgggggtatt ttgacttcaa cagattccac tgccacttct caccacgtga ctggcagcga    900

ctcatcaaca acaactgggg attccggcct aagcgactca acttcaagct cttcaacatt    960

caggtcaaag aggttacgga caacaatgga gtcaagacca tcgccaataa ccttaccagc   1020

acggtccagg tcttcacgga ctcagactat cagctcccgt acgtgctcgg gtcggctcac   1080
```

```
gagggctgcc tcccgccgtt cccagcggac gttttcatga ttcctcagta cgggtatctg   1140

acgcttaatg atggaagcca ggccgtgggt cgttcgtcct tttactgcct ggaatatttc   1200

ccgtcgcaaa tgctaagaac gggtaacaac ttccagttca gctacgagtt tgagaacgta   1260

cctttccata gcagctacgc tcacagccaa agcctggacc gactaatgaa tccactcatc   1320

gaccaatact tgtactatct ctcaaagact attaacggtt ctggacagaa tcaacaaacg   1380

ctaaaattca gtgtggccgg acccagcaac atggctgtcc agggaagaaa ctacatacct   1440

ggacccagct accgacaaca acgtgtctca accactgtga ctcaaaacaa caacagcgaa   1500

tttgcttggc ctggagcttc ttcttgggct ctcaatggac gtaatagctt gatgaatcct   1560

ggacctgcta tggccagcca caaagaagga gaggaccgtt tctttccttt gtctggatct   1620

ttaatttttg gcaaacaagg aactggaaga gacaacgtgg atgcggacaa agtcatgata   1680

accaacgaag aagaaattaa aactactaac ccggtagcaa cggagtccta tggacaagtg   1740

gccacaaacc accagagtgc ccaagcacag gcgcagaccg gctgggttca aaaccaagga   1800

atacttccgg gtatggtttg gcaggacaga gatgtgtacc tgcaaggacc catttgggcc   1860

aaaattcctc acacggacgg caactttcac ccttctccgc tgatgggagg gtttggaatg   1920

aagcacccgc ctcctcagat cctcatcaaa aacacacctg tacctgcgga tcctccaacg   1980

gccttcaaca aggacaagct gaactctttc atcacccagt attctactgg ccaagtcagc   2040

gtggagatcg agtgggagct gcagaaggaa aacagcaagc gctggaaccc ggagatccag   2100

tacacttcca actattacaa gtctaataat gttgaatttg ctgttaatac tgaaggtgta   2160

tatagtgaac cccgccccat tggcaccaga tacctgactc gtaatctgta a            2211
```

```
<210> SEQ ID NO 14
<211> LENGTH: 736
<212> TYPE: PRT
<213> ORGANISM: Artificial Sequence
<220> FEATURE:
<223> OTHER INFORMATION: Description of Artificial Sequence: AAV9 Amino
      Acid Sequence

<400> SEQUENCE: 14

Met Ala Ala Asp Gly Tyr Leu Pro Asp Trp Leu Glu Asp Asn Leu Ser
1               5                   10                  15

Glu Gly Ile Arg Glu Trp Trp Ala Leu Lys Pro Gly Ala Pro Gln Pro
            20                  25                  30

Lys Ala Asn Gln Gln His Gln Asp Asn Ala Arg Gly Leu Val Leu Pro
        35                  40                  45

Gly Tyr Lys Tyr Leu Gly Pro Gly Asn Gly Leu Asp Lys Gly Glu Pro
    50                  55                  60

Val Asn Ala Ala Asp Ala Ala Ala Leu Glu His Asp Lys Ala Tyr Asp
65                  70                  75                  80

Gln Gln Leu Lys Ala Gly Asp Asn Pro Tyr Leu Lys Tyr Asn His Ala
                85                  90                  95

Asp Ala Glu Phe Gln Glu Arg Leu Lys Glu Asp Thr Ser Phe Gly Gly
            100                 105                 110

Asn Leu Gly Arg Ala Val Phe Gln Ala Lys Lys Arg Leu Leu Glu Pro
        115                 120                 125

Leu Gly Leu Val Glu Glu Ala Ala Lys Thr Ala Pro Gly Lys Lys Arg
    130                 135                 140

Pro Val Glu Gln Ser Pro Gln Glu Pro Asp Ser Ser Ala Gly Ile Gly
145                 150                 155                 160
```

-continued

```
Lys Ser Gly Ala Gln Pro Ala Lys Lys Arg Leu Asn Phe Gly Gln Thr
                165                 170                 175

Gly Asp Thr Glu Ser Val Pro Asp Pro Gln Pro Ile Gly Glu Pro Pro
            180                 185                 190

Ala Ala Pro Ser Gly Val Gly Ser Leu Thr Met Ala Ser Gly Gly Gly
        195                 200                 205

Ala Pro Val Ala Asp Asn Asn Glu Gly Ala Asp Gly Val Gly Ser Ser
    210                 215                 220

Ser Gly Asn Trp His Cys Asp Ser Gln Trp Leu Gly Asp Arg Val Ile
225                 230                 235                 240

Thr Thr Ser Thr Arg Thr Trp Ala Leu Pro Thr Tyr Asn Asn His Leu
                245                 250                 255

Tyr Lys Gln Ile Ser Asn Ser Thr Ser Gly Gly Ser Ser Asn Asp Asn
            260                 265                 270

Ala Tyr Phe Gly Tyr Ser Thr Pro Trp Gly Tyr Phe Asp Phe Asn Arg
        275                 280                 285

Phe His Cys His Phe Ser Pro Arg Asp Trp Gln Arg Leu Ile Asn Asn
    290                 295                 300

Asn Trp Gly Phe Arg Pro Lys Arg Leu Asn Phe Lys Leu Phe Asn Ile
305                 310                 315                 320

Gln Val Lys Glu Val Thr Asp Asn Asn Gly Val Lys Thr Ile Ala Asn
                325                 330                 335

Asn Leu Thr Ser Thr Val Gln Val Phe Thr Asp Ser Asp Tyr Gln Leu
            340                 345                 350

Pro Tyr Val Leu Gly Ser Ala His Glu Gly Cys Leu Pro Pro Phe Pro
        355                 360                 365

Ala Asp Val Phe Met Ile Pro Gln Tyr Gly Tyr Leu Thr Leu Asn Asp
    370                 375                 380

Gly Ser Gln Ala Val Gly Arg Ser Ser Phe Tyr Cys Leu Glu Tyr Phe
385                 390                 395                 400

Pro Ser Gln Met Leu Arg Thr Gly Asn Asn Phe Gln Phe Ser Tyr Glu
                405                 410                 415

Phe Glu Asn Val Pro Phe His Ser Ser Tyr Ala His Ser Gln Ser Leu
            420                 425                 430

Asp Arg Leu Met Asn Pro Leu Ile Asp Gln Tyr Leu Tyr Tyr Leu Ser
        435                 440                 445

Lys Thr Ile Asn Gly Ser Gly Gln Asn Gln Gln Thr Leu Lys Phe Ser
    450                 455                 460

Val Ala Gly Pro Ser Asn Met Ala Val Gln Gly Arg Asn Tyr Ile Pro
465                 470                 475                 480

Gly Pro Ser Tyr Arg Gln Gln Arg Val Ser Thr Thr Val Thr Gln Asn
                485                 490                 495

Asn Asn Ser Glu Phe Ala Trp Pro Gly Ala Ser Ser Trp Ala Leu Asn
            500                 505                 510

Gly Arg Asn Ser Leu Met Asn Pro Gly Pro Ala Met Ala Ser His Lys
        515                 520                 525

Glu Gly Glu Asp Arg Phe Phe Pro Leu Ser Gly Ser Leu Ile Phe Gly
    530                 535                 540

Lys Gln Gly Thr Gly Arg Asp Asn Val Asp Ala Asp Lys Val Met Ile
545                 550                 555                 560

Thr Asn Glu Glu Glu Ile Lys Thr Thr Asn Pro Val Ala Thr Glu Ser
                565                 570                 575

Tyr Gly Gln Val Ala Thr Asn His Gln Ser Ala Gln Ala Gln Ala Gln
```

```
            580                 585                 590

Thr Gly Trp Val Gln Asn Gln Gly Ile Leu Pro Gly Met Val Trp Gln
        595                 600                 605

Asp Arg Asp Val Tyr Leu Gln Gly Pro Ile Trp Ala Lys Ile Pro His
    610                 615                 620

Thr Asp Gly Asn Phe His Pro Ser Pro Leu Met Gly Gly Phe Gly Met
625                 630                 635                 640

Lys His Pro Pro Pro Gln Ile Leu Ile Lys Asn Thr Pro Val Pro Ala
                645                 650                 655

Asp Pro Pro Thr Ala Phe Asn Lys Asp Lys Leu Asn Ser Phe Ile Thr
            660                 665                 670

Gln Tyr Ser Thr Gly Gln Val Ser Val Glu Ile Glu Trp Glu Leu Gln
        675                 680                 685

Lys Glu Asn Ser Lys Arg Trp Asn Pro Glu Ile Gln Tyr Thr Ser Asn
    690                 695                 700

Tyr Tyr Lys Ser Asn Asn Val Glu Phe Ala Val Asn Thr Glu Gly Val
705                 710                 715                 720

Tyr Ser Glu Pro Arg Pro Ile Gly Thr Arg Tyr Leu Thr Arg Asn Leu
                725                 730                 735


<210> SEQ ID NO 15
<211> LENGTH: 145
<212> TYPE: DNA
<213> ORGANISM: Artificial Sequence
<220> FEATURE:
<223> OTHER INFORMATION: Description of Artificial Sequence: AAV2 ITR

<400> SEQUENCE: 15

ttggccactc cctctctgcg cgctcgctcg ctcactgagg ccgggcgacc aaaggtcgcc     60

cgacgcccgg gctttgcccg ggcggcctca gtgagcgagc gagcgcgcag agagggagtg    120

gccaactcca tcactagggg ttcct                                          145


<210> SEQ ID NO 16
<211> LENGTH: 728
<212> TYPE: PRT
<213> ORGANISM: Homo sapiens

<400> SEQUENCE: 16

Met Ala Gly Phe Trp Val Gly Thr Ala Pro Leu Val Ala Ala Gly Arg
1               5                   10                  15

Arg Gly Arg Trp Pro Pro Gln Gln Leu Met Leu Ser Ala Ala Leu Arg
            20                  25                  30

Thr Leu Lys His Val Leu Tyr Tyr Ser Arg Gln Cys Leu Met Val Ser
        35                  40                  45

Arg Asn Leu Gly Ser Val Gly Tyr Asp Pro Asn Glu Lys Thr Phe Asp
    50                  55                  60

Lys Ile Leu Val Ala Asn Arg Gly Glu Ile Ala Cys Arg Val Ile Arg
65                  70                  75                  80

Thr Cys Lys Lys Met Gly Ile Lys Thr Val Ala Ile His Ser Asp Val
                85                  90                  95

Asp Ala Ser Ser Val His Val Lys Met Ala Asp Glu Ala Val Cys Val
            100                 105                 110

Gly Pro Ala Pro Thr Ser Lys Ser Tyr Leu Asn Met Asp Ala Ile Met
        115                 120                 125

Glu Ala Ile Lys Lys Thr Arg Ala Gln Ala Val His Pro Gly Tyr Gly
    130                 135                 140
```

-continued

```
Phe Leu Ser Glu Asn Lys Glu Phe Ala Arg Cys Leu Ala Ala Glu Asp
145                 150                 155                 160

Val Val Phe Ile Gly Pro Asp Thr His Ala Ile Gln Ala Met Gly Asp
                165                 170                 175

Lys Ile Glu Ser Lys Leu Leu Ala Lys Lys Ala Glu Val Asn Thr Ile
            180                 185                 190

Pro Gly Phe Asp Gly Val Val Lys Asp Ala Glu Glu Ala Val Arg Ile
        195                 200                 205

Ala Arg Glu Ile Gly Tyr Pro Val Met Ile Lys Ala Ser Ala Gly Gly
    210                 215                 220

Gly Gly Lys Gly Met Arg Ile Ala Trp Asp Asp Glu Glu Thr Arg Asp
225                 230                 235                 240

Gly Phe Arg Leu Ser Ser Gln Glu Ala Ala Ser Ser Phe Gly Asp Asp
                245                 250                 255

Arg Leu Leu Ile Glu Lys Phe Ile Asp Asn Pro Arg His Ile Glu Ile
            260                 265                 270

Gln Val Leu Gly Asp Lys His Gly Asn Ala Leu Trp Leu Asn Glu Arg
        275                 280                 285

Glu Cys Ser Ile Gln Arg Arg Asn Gln Lys Val Val Glu Glu Ala Pro
    290                 295                 300

Ser Ile Phe Leu Asp Ala Glu Thr Arg Arg Ala Met Gly Glu Gln Ala
305                 310                 315                 320

Val Ala Leu Ala Arg Ala Val Lys Tyr Ser Ser Ala Gly Thr Val Glu
                325                 330                 335

Phe Leu Val Asp Ser Lys Lys Asn Phe Tyr Phe Leu Glu Met Asn Thr
            340                 345                 350

Arg Leu Gln Val Glu His Pro Val Thr Glu Cys Ile Thr Gly Leu Asp
        355                 360                 365

Leu Val Gln Glu Met Ile Arg Val Ala Lys Gly Tyr Pro Leu Arg His
    370                 375                 380

Lys Gln Ala Asp Ile Arg Ile Asn Gly Trp Ala Val Glu Cys Arg Val
385                 390                 395                 400

Tyr Ala Glu Asp Pro Tyr Lys Ser Phe Gly Leu Pro Ser Ile Gly Arg
                405                 410                 415

Leu Ser Gln Tyr Gln Glu Pro Leu His Leu Pro Gly Val Arg Val Asp
            420                 425                 430

Ser Gly Ile Gln Pro Gly Ser Asp Ile Ser Ile Tyr Tyr Asp Pro Met
        435                 440                 445

Ile Ser Lys Leu Ile Thr Tyr Gly Ser Asp Arg Thr Glu Ala Leu Lys
    450                 455                 460

Arg Met Ala Asp Ala Leu Asp Asn Tyr Val Ile Arg Gly Val Thr His
465                 470                 475                 480

Asn Ile Ala Leu Leu Arg Glu Val Ile Ile Asn Ser Arg Phe Val Lys
                485                 490                 495

Gly Asp Ile Ser Thr Lys Phe Leu Ser Asp Val Tyr Pro Asp Gly Phe
            500                 505                 510

Lys Gly His Met Leu Thr Lys Ser Glu Lys Asn Gln Leu Leu Ala Ile
        515                 520                 525

Ala Ser Ser Leu Phe Val Ala Phe Gln Leu Arg Ala Gln His Phe Gln
    530                 535                 540

Glu Asn Ser Arg Met Pro Val Ile Lys Pro Asp Ile Ala Asn Trp Glu
545                 550                 555                 560
```

```
Leu Ser Val Lys Leu His Asp Lys Val His Thr Val Val Ala Ser Asn
                565                 570                 575

Asn Gly Ser Val Phe Ser Val Glu Val Asp Gly Ser Lys Leu Asn Val
            580                 585                 590

Thr Ser Thr Trp Asn Leu Ala Ser Pro Leu Leu Ser Val Ser Val Asp
        595                 600                 605

Gly Thr Gln Arg Thr Val Gln Cys Leu Ser Arg Glu Ala Gly Gly Asn
    610                 615                 620

Met Ser Ile Gln Phe Leu Gly Thr Val Tyr Lys Val Asn Ile Leu Thr
625                 630                 635                 640

Arg Leu Ala Ala Glu Leu Asn Lys Phe Met Leu Glu Lys Val Thr Glu
                645                 650                 655

Asp Thr Ser Ser Val Leu Arg Ser Pro Met Pro Gly Val Val Val Ala
            660                 665                 670

Val Ser Val Lys Pro Gly Asp Ala Val Ala Glu Gly Gln Glu Ile Cys
        675                 680                 685

Val Ile Glu Ala Met Lys Met Gln Asn Ser Met Thr Ala Gly Lys Thr
    690                 695                 700

Gly Thr Val Lys Ser Val His Cys Gln Ala Gly Asp Thr Val Gly Glu
705                 710                 715                 720

Gly Asp Leu Leu Val Glu Leu Glu
                725


<210> SEQ ID NO 17
<211> LENGTH: 539
<212> TYPE: PRT
<213> ORGANISM: Homo sapiens

<400> SEQUENCE: 17

Met Ala Ala Ala Leu Arg Val Ala Ala Val Gly Ala Arg Leu Ser Val
1               5                   10                  15

Leu Ala Ser Gly Leu Arg Ala Ala Val Arg Ser Leu Cys Ser Gln Ala
            20                  25                  30

Thr Ser Val Asn Glu Arg Ile Glu Asn Lys Arg Arg Thr Ala Leu Leu
        35                  40                  45

Gly Gly Gly Gln Arg Arg Ile Asp Ala Gln His Lys Arg Gly Lys Leu
    50                  55                  60

Thr Ala Arg Glu Arg Ile Ser Leu Leu Leu Asp Pro Gly Ser Phe Val
65                  70                  75                  80

Glu Ser Asp Met Phe Val Glu His Arg Cys Ala Asp Phe Gly Met Ala
                85                  90                  95

Ala Asp Lys Asn Lys Phe Pro Gly Asp Ser Val Val Thr Gly Arg Gly
            100                 105                 110

Arg Ile Asn Gly Arg Leu Val Tyr Val Phe Ser Gln Asp Phe Thr Val
        115                 120                 125

Phe Gly Gly Ser Leu Ser Gly Ala His Ala Gln Lys Ile Cys Lys Ile
    130                 135                 140

Met Asp Gln Ala Ile Thr Val Gly Ala Pro Val Ile Gly Leu Asn Asp
145                 150                 155                 160

Ser Gly Gly Ala Arg Ile Gln Glu Gly Val Glu Ser Leu Ala Gly Tyr
                165                 170                 175

Ala Asp Ile Phe Leu Arg Asn Val Thr Ala Ser Gly Val Ile Pro Gln
            180                 185                 190

Ile Ser Leu Ile Met Gly Pro Cys Ala Gly Gly Ala Val Tyr Ser Pro
        195                 200                 205
```

```
Ala Leu Thr Asp Phe Thr Phe Met Val Lys Asp Thr Ser Tyr Leu Phe
    210                 215                 220

Ile Thr Gly Pro Asp Val Val Lys Ser Val Thr Asn Glu Asp Val Thr
225                 230                 235                 240

Gln Glu Glu Leu Gly Gly Ala Lys Thr His Thr Thr Met Ser Gly Val
                245                 250                 255

Ala His Arg Ala Phe Glu Asn Asp Val Asp Ala Leu Cys Asn Leu Arg
            260                 265                 270

Asp Phe Phe Asn Tyr Leu Pro Leu Ser Ser Gln Asp Pro Ala Pro Val
        275                 280                 285

Arg Glu Cys His Asp Pro Ser Asp Arg Leu Val Pro Glu Leu Asp Thr
    290                 295                 300

Ile Val Pro Leu Glu Ser Thr Lys Ala Tyr Asn Met Val Asp Ile Ile
305                 310                 315                 320

His Ser Val Val Asp Glu Arg Glu Phe Phe Glu Ile Met Pro Asn Tyr
                325                 330                 335

Ala Lys Asn Ile Ile Val Gly Phe Ala Arg Met Asn Gly Arg Thr Val
            340                 345                 350

Gly Ile Val Gly Asn Gln Pro Lys Val Ala Ser Gly Cys Leu Asp Ile
        355                 360                 365

Asn Ser Ser Val Lys Gly Ala Arg Phe Val Arg Phe Cys Asp Ala Phe
    370                 375                 380

Asn Ile Pro Leu Ile Thr Phe Val Asp Val Pro Gly Phe Leu Pro Gly
385                 390                 395                 400

Thr Ala Gln Glu Tyr Gly Gly Ile Ile Arg His Gly Ala Lys Leu Leu
                405                 410                 415

Tyr Ala Phe Ala Glu Ala Thr Val Pro Lys Val Thr Val Ile Thr Arg
            420                 425                 430

Lys Ala Tyr Gly Gly Ala Tyr Asp Val Met Ser Ser Lys His Leu Cys
        435                 440                 445

Gly Asp Thr Asn Tyr Ala Trp Pro Thr Ala Glu Ile Ala Val Met Gly
    450                 455                 460

Ala Lys Gly Ala Val Glu Ile Ile Phe Lys Gly His Glu Asn Val Glu
465                 470                 475                 480

Ala Ala Gln Ala Glu Tyr Ile Glu Lys Phe Ala Asn Pro Phe Pro Ala
                485                 490                 495

Ala Val Arg Gly Phe Val Asp Asp Ile Ile Gln Pro Ser Ser Thr Arg
            500                 505                 510

Ala Arg Ile Cys Cys Asp Leu Asp Val Leu Ala Ser Lys Lys Val Gln
        515                 520                 525

Arg Pro Trp Arg Lys His Ala Asn Ile Pro Leu
    530                 535
```

<210> SEQ ID NO 18
<211> LENGTH: 278
<212> TYPE: DNA
<213> ORGANISM: Artificial Sequence
<220> FEATURE:
<223> OTHER INFORMATION: Description of Artificial Sequence: CBA Promoter

<400> SEQUENCE: 18

```
tcgaggtgag ccccacgttc tgcttcactc tccccatctc ccccccctcc ccacccccaa     60

ttttgtattt atttattttt taattatttt gtgcagcgat gggggcgggg gggggggggg    120
```

-continued

```
ggcgcgcgcc aggcggggcg gggcggggcg aggggcgggg cggggcgagg cggagaggtg    180

cggcggcagc caatcagagc ggcgcgctcc gaaagtttcc ttttatggcg aggcggcggc    240

ggcggcggcc ctataaaaag cgaagcgcgc ggcgggcg                             278


<210> SEQ ID NO 19
<211> LENGTH: 304
<212> TYPE: DNA
<213> ORGANISM: Artificial Sequence
<220> FEATURE:
<223> OTHER INFORMATION: Description of Artificial Sequence: CMV
      Enhancer

<400> SEQUENCE: 19

cgttacataa cttacggtaa atggcccgcc tggctgaccg cccaacgacc cccgcccatt     60

gacgtcaata atgacgtatg ttcccatagt aacgccaata gggactttcc attgacgtca    120

atgggtggag tatttacggt aaactgccca cttggcagta catcaagtgt atcatatgcc    180

aagtacgccc cctattgacg tcaatgacgg taaatggccc gcctggcatt atgcccagta    240

catgacctta tgggactttc ctacttggca gtacatctac gtattagtca tcgctattac    300

catg                                                                 304


<210> SEQ ID NO 20
<211> LENGTH: 95
<212> TYPE: DNA
<213> ORGANISM: Artificial Sequence
<220> FEATURE:
<223> OTHER INFORMATION: Description of Artificial Sequence: SV40 Small
      T Intron

<400> SEQUENCE: 20

gctctaaggt aaatataaaa tttttaagtg tataatgtgt taaactactg attctaattg     60

tttctctctt ttagattcca acctttggaa ctgat                                95


<210> SEQ ID NO 21
<211> LENGTH: 315
<212> TYPE: DNA
<213> ORGANISM: Artificial Sequence
<220> FEATURE:
<223> OTHER INFORMATION: Description of Artificial Sequence: rHBB Intron

<400> SEQUENCE: 21

gtgagcgggc gggacggccc ttctcctccg ggctgtaatt agcgcttggt ttaatgacgg     60

cttgtttctt ttctgtggct gcgtgaaagc cttgaggggc tccgggaggg ccctttgtgc    120

ggggggagcg gctcggggct gtccgcgggg ggacggctgc cttcgggggg gacggggcag    180

ggcggggttc ggcttctggc gtgtgaccgg cggctcaaga gcctctgcta accatgttca    240

tgccttcttc tttttcctac agctcctggg caacgtgctg gttattgtgc tgtctcatca    300

ttttggcaaa gaatt                                                     315


<210> SEQ ID NO 22
<211> LENGTH: 215
<212> TYPE: DNA
<213> ORGANISM: Artificial Sequence
<220> FEATURE:
<223> OTHER INFORMATION: Description of Artificial Sequence: BGH
      polyadenylation signal sequence

<400> SEQUENCE: 22

gcctcgactg tgccttctag ttgccagcca tctgttgttt gcccctcccc cgtgccttcc     60
```

```
ttgaccctgg aaggtgccac tcccactgtc ctttcctaat aaaatgagga aattgcatcg    120

cattgtctga gtaggtgtca ttctattctg gggggtgggg tggggcagga cagcaagggg    180

gaggattggg aagacaatag caggcatgct gggga                               215


<210> SEQ ID NO 23
<211> LENGTH: 198
<212> TYPE: DNA
<213> ORGANISM: Artificial Sequence
<220> FEATURE:
<223> OTHER INFORMATION: Description of Artificial Sequence: SV40 Late
      polyadenylation signal sequence

<400> SEQUENCE: 23

gatccagaca tgataagata cattgatgag tttggacaaa ccacaactag aatgcagtga     60

aaaaaatgct ttatttgtga aatttgtgat gctattgctt tatttgtaac cattataagc    120

tgcaataaac aagttaacaa caacaattgc attcatttta tgtttcaggt tcagggggag    180

gtgtgggagg ttttttag                                                  198


<210> SEQ ID NO 24

<400> SEQUENCE: 24

000


<210> SEQ ID NO 25
<211> LENGTH: 728
<212> TYPE: PRT
<213> ORGANISM: Homo sapiens

<400> SEQUENCE: 25

Met Ala Gly Phe Trp Val Gly Thr Ala Pro Leu Val Ala Ala Gly Arg
1               5                   10                  15

Arg Gly Arg Trp Pro Pro Gln Gln Leu Met Leu Ser Ala Ala Leu Arg
            20                  25                  30

Thr Leu Lys His Val Leu Tyr Tyr Ser Arg Gln Cys Leu Met Val Ser
        35                  40                  45

Arg Asn Leu Gly Ser Val Gly Tyr Asp Pro Asn Glu Lys Thr Phe Asp
    50                  55                  60

Lys Ile Leu Val Ala Asn Arg Gly Glu Ile Ala Cys Arg Val Ile Arg
65                  70                  75                  80

Thr Cys Lys Lys Met Gly Ile Lys Thr Val Ala Ile His Ser Asp Val
                85                  90                  95

Asp Ala Ser Ser Val His Val Lys Met Ala Asp Glu Ala Val Cys Val
            100                 105                 110

Gly Pro Ala Pro Thr Ser Lys Ser Tyr Leu Asn Met Asp Ala Ile Met
        115                 120                 125

Glu Ala Ile Lys Lys Thr Arg Ala Gln Ala Val His Pro Gly Tyr Gly
    130                 135                 140

Phe Leu Ser Glu Asn Lys Glu Phe Ala Arg Cys Leu Ala Ala Glu Asp
145                 150                 155                 160

Val Val Phe Ile Gly Pro Asp Thr His Ala Ile Gln Ala Met Gly Asp
                165                 170                 175

Lys Ile Glu Ser Lys Leu Leu Ala Lys Lys Ala Glu Val Asn Thr Ile
            180                 185                 190

Pro Gly Phe Asp Gly Val Val Lys Asp Ala Glu Glu Ala Val Arg Ile
        195                 200                 205
```

```
Ala Arg Glu Ile Gly Tyr Pro Val Met Ile Lys Ala Ser Ala Gly Gly
    210                 215                 220

Gly Gly Lys Gly Met Arg Ile Ala Trp Asp Asp Glu Glu Thr Arg Asp
225                 230                 235                 240

Gly Phe Arg Leu Ser Ser Gln Glu Ala Ala Ser Ser Phe Gly Asp Asp
                245                 250                 255

Arg Leu Leu Ile Glu Lys Phe Ile Asp Asn Pro Arg His Ile Glu Ile
            260                 265                 270

Gln Val Leu Gly Asp Lys His Gly Asn Ala Leu Trp Leu Asn Glu Arg
        275                 280                 285

Glu Cys Ser Ile Gln Arg Arg Asn Gln Lys Val Val Glu Glu Ala Pro
    290                 295                 300

Ser Ile Phe Leu Asp Ala Glu Thr Arg Arg Ala Met Gly Glu Gln Ala
305                 310                 315                 320

Val Ala Leu Ala Arg Ala Val Lys Tyr Ser Ser Ala Gly Thr Val Glu
                325                 330                 335

Phe Leu Val Asp Ser Lys Lys Asn Phe Tyr Phe Leu Glu Met Asn Thr
            340                 345                 350

Arg Leu Gln Val Glu His Pro Val Thr Glu Cys Ile Thr Gly Leu Asp
        355                 360                 365

Leu Val Gln Glu Met Ile Arg Val Ala Lys Gly Tyr Pro Leu Arg His
    370                 375                 380

Lys Gln Ala Asp Ile Arg Ile Asn Gly Trp Ala Val Glu Cys Arg Val
385                 390                 395                 400

Tyr Ala Glu Asp Pro Tyr Lys Ser Phe Gly Leu Pro Ser Ile Gly Arg
                405                 410                 415

Leu Ser Gln Tyr Gln Glu Pro Leu His Leu Pro Gly Val Arg Val Asp
            420                 425                 430

Ser Gly Ile Gln Pro Gly Ser Asp Ile Ser Ile Tyr Tyr Asp Pro Met
        435                 440                 445

Ile Ser Lys Leu Ile Thr Tyr Gly Ser Asp Arg Thr Glu Ala Leu Lys
    450                 455                 460

Arg Met Ala Asp Ala Leu Asp Asn Tyr Val Ile Arg Gly Val Thr His
465                 470                 475                 480

Asn Ile Ala Leu Leu Arg Glu Val Ile Ile Asn Ser Arg Phe Val Lys
                485                 490                 495

Gly Asp Ile Ser Thr Lys Phe Leu Ser Asp Val Tyr Pro Asp Gly Phe
            500                 505                 510

Lys Gly His Met Leu Thr Lys Ser Glu Lys Asn Gln Leu Leu Ala Ile
        515                 520                 525

Ala Ser Ser Leu Phe Val Ala Phe Gln Leu Arg Ala Gln His Phe Gln
    530                 535                 540

Glu Asn Ser Arg Met Pro Val Ile Lys Pro Asp Ile Ala Asn Trp Glu
545                 550                 555                 560

Leu Ser Val Lys Leu His Asp Lys Val His Thr Val Val Ala Ser Asn
                565                 570                 575

Asn Gly Ser Val Phe Ser Val Glu Val Asp Gly Ser Lys Leu Asn Val
            580                 585                 590

Thr Ser Thr Trp Asn Leu Ala Ser Pro Leu Leu Ser Val Ser Val Asp
        595                 600                 605

Gly Thr Gln Arg Thr Val Gln Cys Leu Ser Arg Glu Ala Gly Gly Asn
    610                 615                 620

Met Ser Ile Gln Phe Leu Gly Thr Val Tyr Lys Val Asn Ile Leu Thr
```

```
625                 630                 635                 640

Arg Leu Ala Ala Glu Leu Asn Lys Phe Met Leu Glu Lys Val Thr Glu
                645                 650                 655

Asp Thr Ser Ser Val Leu Arg Ser Pro Met Pro Gly Val Val Val Ala
            660                 665                 670

Val Ser Val Lys Pro Gly Asp Ala Val Ala Glu Gly Gln Glu Ile Cys
        675                 680                 685

Val Ile Glu Ala Met Lys Met Gln Asn Ser Met Thr Ala Gly Lys Thr
    690                 695                 700

Gly Thr Val Lys Ser Val His Cys Gln Ala Gly Asp Thr Val Gly Glu
705                 710                 715                 720

Gly Asp Leu Leu Val Glu Leu Glu
                725


<210> SEQ ID NO 26
<211> LENGTH: 702
<212> TYPE: PRT
<213> ORGANISM: Homo sapiens

<400> SEQUENCE: 26

Met Ala Gly Phe Trp Val Gly Thr Ala Pro Leu Val Ala Ala Gly Arg
1               5                   10                  15

Arg Gly Arg Trp Pro Pro Gln Gln Leu Met Leu Ser Ala Ala Leu Arg
            20                  25                  30

Thr Leu Lys Thr Phe Asp Lys Ile Leu Val Ala Asn Arg Gly Glu Ile
        35                  40                  45

Ala Cys Arg Val Ile Arg Thr Cys Lys Lys Met Gly Ile Lys Thr Val
    50                  55                  60

Ala Ile His Ser Asp Val Asp Ala Ser Ser Val His Val Lys Met Ala
65                  70                  75                  80

Asp Glu Ala Val Cys Val Gly Pro Ala Pro Thr Ser Lys Ser Tyr Leu
                85                  90                  95

Asn Met Asp Ala Ile Met Glu Ala Ile Lys Lys Thr Arg Ala Gln Ala
            100                 105                 110

Val His Pro Gly Tyr Gly Phe Leu Ser Glu Asn Lys Glu Phe Ala Arg
        115                 120                 125

Cys Leu Ala Ala Glu Asp Val Val Phe Ile Gly Pro Asp Thr His Ala
    130                 135                 140

Ile Gln Ala Met Gly Asp Lys Ile Glu Ser Lys Leu Leu Ala Lys Lys
145                 150                 155                 160

Ala Glu Val Asn Thr Ile Pro Gly Phe Asp Gly Val Val Lys Asp Ala
                165                 170                 175

Glu Glu Ala Val Arg Ile Ala Arg Glu Ile Gly Tyr Pro Val Met Ile
            180                 185                 190

Lys Ala Ser Ala Gly Gly Gly Gly Lys Gly Met Arg Ile Ala Trp Asp
        195                 200                 205

Asp Glu Glu Thr Arg Asp Gly Phe Arg Leu Ser Ser Gln Glu Ala Ala
    210                 215                 220

Ser Ser Phe Gly Asp Asp Arg Leu Leu Ile Glu Lys Phe Ile Asp Asn
225                 230                 235                 240

Pro Arg His Ile Glu Ile Gln Val Leu Gly Asp Lys His Gly Asn Ala
                245                 250                 255

Leu Trp Leu Asn Glu Arg Glu Cys Ser Ile Gln Arg Arg Asn Gln Lys
            260                 265                 270
```

```
Val Val Glu Glu Ala Pro Ser Ile Phe Leu Asp Ala Glu Thr Arg Arg
        275                 280                 285

Ala Met Gly Glu Gln Ala Val Ala Leu Ala Arg Ala Val Lys Tyr Ser
    290                 295                 300

Ser Ala Gly Thr Val Glu Phe Leu Val Asp Ser Lys Lys Asn Phe Tyr
305                 310                 315                 320

Phe Leu Glu Met Asn Thr Arg Leu Gln Val Glu His Pro Val Thr Glu
                325                 330                 335

Cys Ile Thr Gly Leu Asp Leu Val Gln Glu Met Ile Arg Val Ala Lys
            340                 345                 350

Gly Tyr Pro Leu Arg His Lys Gln Ala Asp Ile Arg Ile Asn Gly Trp
        355                 360                 365

Ala Val Glu Cys Arg Val Tyr Ala Glu Asp Pro Tyr Lys Ser Phe Gly
    370                 375                 380

Leu Pro Ser Ile Gly Arg Leu Ser Gln Tyr Gln Glu Pro Leu His Leu
385                 390                 395                 400

Pro Gly Val Arg Val Asp Ser Gly Ile Gln Pro Gly Ser Asp Ile Ser
                405                 410                 415

Ile Tyr Tyr Asp Pro Met Ile Ser Lys Leu Ile Thr Tyr Gly Ser Asp
            420                 425                 430

Arg Thr Glu Ala Leu Lys Arg Met Ala Asp Ala Leu Asp Asn Tyr Val
        435                 440                 445

Ile Arg Gly Val Thr His Asn Ile Ala Leu Leu Arg Glu Val Ile Ile
    450                 455                 460

Asn Ser Arg Phe Val Lys Gly Asp Ile Ser Thr Lys Phe Leu Ser Asp
465                 470                 475                 480

Val Tyr Pro Asp Gly Phe Lys Gly His Met Leu Thr Lys Ser Glu Lys
                485                 490                 495

Asn Gln Leu Leu Ala Ile Ala Ser Ser Leu Phe Val Ala Phe Gln Leu
            500                 505                 510

Arg Ala Gln His Phe Gln Glu Asn Ser Arg Met Pro Val Ile Lys Pro
        515                 520                 525

Asp Ile Ala Asn Trp Glu Leu Ser Val Lys Leu His Asp Lys Val His
    530                 535                 540

Thr Val Val Ala Ser Asn Asn Gly Ser Val Phe Ser Val Glu Val Asp
545                 550                 555                 560

Gly Ser Lys Leu Asn Val Thr Ser Thr Trp Asn Leu Ala Ser Pro Leu
                565                 570                 575

Leu Ser Val Ser Val Asp Gly Thr Gln Arg Thr Val Gln Cys Leu Ser
            580                 585                 590

Arg Glu Ala Gly Gly Asn Met Ser Ile Gln Phe Leu Gly Thr Val Tyr
        595                 600                 605

Lys Val Asn Ile Leu Thr Arg Leu Ala Ala Glu Leu Asn Lys Phe Met
    610                 615                 620

Leu Glu Lys Val Thr Glu Asp Thr Ser Ser Val Leu Arg Ser Pro Met
625                 630                 635                 640

Pro Gly Val Val Val Ala Val Ser Val Lys Pro Gly Asp Ala Val Ala
                645                 650                 655

Glu Gly Gln Glu Ile Cys Val Ile Glu Ala Met Lys Met Gln Asn Ser
            660                 665                 670

Met Thr Ala Gly Lys Thr Gly Thr Val Lys Ser Val His Cys Gln Ala
        675                 680                 685

Gly Asp Thr Val Gly Glu Gly Asp Leu Leu Val Glu Leu Glu
```

```
    690                 695                 700

<210> SEQ ID NO 27
<211> LENGTH: 681
<212> TYPE: PRT
<213> ORGANISM: Homo sapiens

<400> SEQUENCE: 27

Met Ala Gly Phe Trp Val Gly Thr Ala Pro Leu Val Ala Ala Gly Arg
1               5                   10                  15

Arg Gly Arg Trp Pro Pro Gln Gln Leu Met Leu Ser Ala Ala Leu Arg
            20                  25                  30

Thr Leu Lys His Val Leu Tyr Tyr Ser Arg Gln Cys Leu Met Val Ser
        35                  40                  45

Arg Asn Leu Gly Ser Val Gly Tyr Asp Pro Asn Glu Lys Thr Phe Asp
    50                  55                  60

Lys Ile Leu Val Ala Asn Arg Gly Glu Ile Ala Cys Arg Val Ile Arg
65                  70                  75                  80

Thr Cys Lys Lys Met Gly Ile Lys Thr Val Ala Ile His Ser Asp Val
                85                  90                  95

Asp Ala Ser Ser Val His Val Lys Met Ala Asp Glu Ala Val Cys Val
            100                 105                 110

Gly Pro Ala Pro Thr Ser Lys Ser Tyr Leu Asn Met Asp Ala Ile Met
        115                 120                 125

Glu Ala Ile Lys Lys Thr Arg Ala Gln Ala Val His Pro Gly Tyr Gly
    130                 135                 140

Phe Leu Ser Glu Asn Lys Glu Phe Ala Arg Cys Leu Ala Ala Glu Asp
145                 150                 155                 160

Val Val Phe Ile Gly Pro Asp Thr His Ala Ile Gln Ala Met Gly Asp
                165                 170                 175

Lys Ile Glu Ser Lys Leu Leu Ala Lys Lys Ala Glu Val Asn Thr Ile
            180                 185                 190

Pro Gly Phe Asp Gly Val Val Lys Asp Ala Glu Glu Ala Val Arg Ile
        195                 200                 205

Ala Arg Glu Ile Gly Tyr Pro Val Met Ile Lys Ala Ser Ala Gly Gly
    210                 215                 220

Gly Gly Lys Gly Met Arg Ile Ala Trp Asp Asp Glu Glu Thr Arg Asp
225                 230                 235                 240

Gly Phe Arg Leu Ser Ser Gln Glu Ala Ala Ser Ser Phe Gly Asp Asp
                245                 250                 255

Arg Leu Leu Ile Glu Lys Phe Ile Asp Asn Pro Arg His Ile Glu Ile
            260                 265                 270

Gln Val Leu Gly Asp Lys His Gly Asn Ala Leu Trp Leu Asn Glu Arg
        275                 280                 285

Glu Cys Ser Ile Gln Arg Arg Asn Gln Lys Val Val Glu Glu Ala Pro
    290                 295                 300

Ser Ile Phe Leu Asp Ala Glu Thr Arg Arg Ala Met Gly Glu Gln Ala
305                 310                 315                 320

Val Ala Leu Ala Arg Ala Val Lys Tyr Ser Ser Ala Gly Thr Val Glu
                325                 330                 335

Phe Leu Val Asp Ser Lys Lys Asn Phe Tyr Phe Leu Glu Met Asn Thr
            340                 345                 350

Arg Leu Gln Val Glu His Pro Val Thr Glu Cys Ile Thr Gly Leu Asp
        355                 360                 365
```

```
Leu Val Gln Glu Met Ile Arg Val Ala Lys Gly Tyr Pro Leu Arg His
    370                 375                 380

Lys Gln Ala Asp Ile Arg Ile Asn Gly Trp Ala Val Glu Cys Arg Val
385                 390                 395                 400

Tyr Ala Glu Asp Pro Tyr Lys Ser Phe Gly Leu Pro Ser Ile Gly Arg
                405                 410                 415

Leu Ser Gln Tyr Gln Glu Pro Leu His Leu Pro Gly Val Arg Val Asp
            420                 425                 430

Ser Gly Ile Gln Pro Gly Ser Asp Ile Ser Ile Tyr Tyr Asp Pro Met
        435                 440                 445

Ile Ser Lys Leu Ile Thr Tyr Gly Ser Asp Arg Thr Glu Ala Leu Lys
    450                 455                 460

Arg Met Ala Asp Ala Leu Asp Asn Tyr Val Ile Arg Gly Val Thr His
465                 470                 475                 480

Asn Ile Ala Leu Leu Arg Glu Val Ile Ile Asn Ser Arg Phe Val Lys
                485                 490                 495

Gly Asp Ile Ser Thr Lys Phe Leu Ser Asp Val Tyr Pro Asp Gly Phe
            500                 505                 510

Lys Gly His Met Leu Thr Lys Ser Glu Lys Asn Gln Leu Leu Ala Ile
        515                 520                 525

Ala Ser Ser Leu Phe Val Ala Phe Gln Leu Arg Ala Gln His Phe Gln
    530                 535                 540

Glu Asn Ser Arg Met Pro Val Ile Lys Pro Asp Ile Ala Asn Trp Glu
545                 550                 555                 560

Leu Ser Val Lys Leu His Asp Lys Val His Thr Val Val Ala Ser Asn
                565                 570                 575

Asn Gly Ser Val Phe Ser Val Glu Val Asp Gly Ser Lys Leu Asn Val
            580                 585                 590

Thr Ser Thr Trp Asn Leu Ala Ser Pro Leu Leu Ser Val Ser Val Asp
        595                 600                 605

Gly Thr Gln Arg Thr Val Gln Cys Leu Ser Arg Glu Ala Gly Gly Asn
    610                 615                 620

Met Ser Ile Gln Phe Leu Gly Thr Val Val Ala Glu Gly Gln Glu Ile
625                 630                 635                 640

Cys Val Ile Glu Ala Met Lys Met Gln Asn Ser Met Thr Ala Gly Lys
                645                 650                 655

Thr Gly Thr Val Lys Ser Val His Cys Gln Ala Gly Asp Thr Val Gly
            660                 665                 670

Glu Gly Asp Leu Leu Val Glu Leu Glu
        675                 680
```

<210> SEQ ID NO 28
<211> LENGTH: 539
<212> TYPE: PRT
<213> ORGANISM: Homo sapiens

<400> SEQUENCE: 28

```
Met Ala Ala Ala Leu Arg Val Ala Ala Val Gly Ala Arg Leu Ser Val
1               5                   10                  15

Leu Ala Ser Gly Leu Arg Ala Ala Val Arg Ser Leu Cys Ser Gln Ala
            20                  25                  30

Thr Ser Val Asn Glu Arg Ile Glu Asn Lys Arg Arg Thr Ala Leu Leu
        35                  40                  45

Gly Gly Gly Gln Arg Arg Ile Asp Ala Gln His Lys Arg Gly Lys Leu
    50                  55                  60
```

```
Thr Ala Arg Glu Arg Ile Ser Leu Leu Leu Asp Pro Gly Ser Phe Val
65                  70                  75                  80

Glu Ser Asp Met Phe Val Glu His Arg Cys Ala Asp Phe Gly Met Ala
                85                  90                  95

Ala Asp Lys Asn Lys Phe Pro Gly Asp Ser Val Val Thr Gly Arg Gly
            100                 105                 110

Arg Ile Asn Gly Arg Leu Val Tyr Val Phe Ser Gln Asp Phe Thr Val
        115                 120                 125

Phe Gly Gly Ser Leu Ser Gly Ala His Ala Gln Lys Ile Cys Lys Ile
    130                 135                 140

Met Asp Gln Ala Ile Thr Val Gly Ala Pro Val Ile Gly Leu Asn Asp
145                 150                 155                 160

Ser Gly Gly Ala Arg Ile Gln Glu Gly Val Glu Ser Leu Ala Gly Tyr
                165                 170                 175

Ala Asp Ile Phe Leu Arg Asn Val Thr Ala Ser Gly Val Ile Pro Gln
            180                 185                 190

Ile Ser Leu Ile Met Gly Pro Cys Ala Gly Gly Ala Val Tyr Ser Pro
        195                 200                 205

Ala Leu Thr Asp Phe Thr Phe Met Val Lys Asp Thr Ser Tyr Leu Phe
    210                 215                 220

Ile Thr Gly Pro Asp Val Val Lys Ser Val Thr Asn Glu Asp Val Thr
225                 230                 235                 240

Gln Glu Glu Leu Gly Gly Ala Lys Thr His Thr Thr Met Ser Gly Val
                245                 250                 255

Ala His Arg Ala Phe Glu Asn Asp Val Asp Ala Leu Cys Asn Leu Arg
            260                 265                 270

Asp Phe Phe Asn Tyr Leu Pro Leu Ser Ser Gln Asp Pro Ala Pro Val
        275                 280                 285

Arg Glu Cys His Asp Pro Ser Asp Arg Leu Val Pro Glu Leu Asp Thr
    290                 295                 300

Ile Val Pro Leu Glu Ser Thr Lys Ala Tyr Asn Met Val Asp Ile Ile
305                 310                 315                 320

His Ser Val Val Asp Glu Arg Glu Phe Phe Glu Ile Met Pro Asn Tyr
                325                 330                 335

Ala Lys Asn Ile Ile Val Gly Phe Ala Arg Met Asn Gly Arg Thr Val
            340                 345                 350

Gly Ile Val Gly Asn Gln Pro Lys Val Ala Ser Gly Cys Leu Asp Ile
        355                 360                 365

Asn Ser Ser Val Lys Gly Ala Arg Phe Val Arg Phe Cys Asp Ala Phe
    370                 375                 380

Asn Ile Pro Leu Ile Thr Phe Val Asp Val Pro Gly Phe Leu Pro Gly
385                 390                 395                 400

Thr Ala Gln Glu Tyr Gly Gly Ile Ile Arg His Gly Ala Lys Leu Leu
                405                 410                 415

Tyr Ala Phe Ala Glu Ala Thr Val Pro Lys Val Thr Val Ile Thr Arg
            420                 425                 430

Lys Ala Tyr Gly Gly Ala Tyr Asp Val Met Ser Ser Lys His Leu Cys
        435                 440                 445

Gly Asp Thr Asn Tyr Ala Trp Pro Thr Ala Glu Ile Ala Val Met Gly
    450                 455                 460

Ala Lys Gly Ala Val Glu Ile Ile Phe Lys Gly His Glu Asn Val Glu
465                 470                 475                 480
```

```
Ala Ala Gln Ala Glu Tyr Ile Glu Lys Phe Ala Asn Pro Phe Pro Ala
                485                 490                 495

Ala Val Arg Gly Phe Val Asp Asp Ile Ile Gln Pro Ser Ser Thr Arg
            500                 505                 510

Ala Arg Ile Cys Cys Asp Leu Asp Val Leu Ala Ser Lys Lys Val Gln
        515                 520                 525

Arg Pro Trp Arg Lys His Ala Asn Ile Pro Leu
    530                 535


<210> SEQ ID NO 29
<211> LENGTH: 559
<212> TYPE: PRT
<213> ORGANISM: Homo sapiens

<400> SEQUENCE: 29

Met Ala Ala Ala Leu Arg Val Ala Ala Val Gly Ala Arg Leu Ser Val
1               5                   10                  15

Leu Ala Ser Gly Leu Arg Ala Ala Val Arg Ser Leu Cys Ser Gln Ala
            20                  25                  30

Thr Ser Val Asn Glu Arg Ile Glu Asn Lys Arg Arg Thr Ala Leu Leu
        35                  40                  45

Gly Gly Gly Gln Arg Arg Ile Asp Ala Gln His Lys Arg Gly Lys Leu
    50                  55                  60

Thr Ala Arg Glu Arg Ile Ser Leu Leu Leu Asp Pro Gly Ser Phe Val
65                  70                  75                  80

Glu Ser Asp Met Phe Val Glu His Arg Cys Ala Asp Phe Gly Met Ala
                85                  90                  95

Ala Asp Lys Asn Lys Phe Pro Gly Asp Ser Val Val Thr Gly Arg Gly
            100                 105                 110

Arg Ile Asn Gly Arg Leu Val Tyr Val Phe Ser Gln Gln Ile Ile Gly
        115                 120                 125

Trp Ala Gln Trp Leu Pro Leu Val Ile Ser Ala Leu Trp Glu Ala Glu
    130                 135                 140

Asp Phe Thr Val Phe Gly Gly Ser Leu Ser Gly Ala His Ala Gln Lys
145                 150                 155                 160

Ile Cys Lys Ile Met Asp Gln Ala Ile Thr Val Gly Ala Pro Val Ile
                165                 170                 175

Gly Leu Asn Asp Ser Gly Gly Ala Arg Ile Gln Glu Gly Val Glu Ser
            180                 185                 190

Leu Ala Gly Tyr Ala Asp Ile Phe Leu Arg Asn Val Thr Ala Ser Gly
        195                 200                 205

Val Ile Pro Gln Ile Ser Leu Ile Met Gly Pro Cys Ala Gly Gly Ala
    210                 215                 220

Val Tyr Ser Pro Ala Leu Thr Asp Phe Thr Phe Met Val Lys Asp Thr
225                 230                 235                 240

Ser Tyr Leu Phe Ile Thr Gly Pro Asp Val Val Lys Ser Val Thr Asn
                245                 250                 255

Glu Asp Val Thr Gln Glu Glu Leu Gly Gly Ala Lys Thr His Thr Thr
            260                 265                 270

Met Ser Gly Val Ala His Arg Ala Phe Glu Asn Asp Val Asp Ala Leu
        275                 280                 285

Cys Asn Leu Arg Asp Phe Phe Asn Tyr Leu Pro Leu Ser Ser Gln Asp
    290                 295                 300

Pro Ala Pro Val Arg Glu Cys His Asp Pro Ser Asp Arg Leu Val Pro
305                 310                 315                 320
```

```
Glu Leu Asp Thr Ile Val Pro Leu Glu Ser Thr Lys Ala Tyr Asn Met
                325                 330                 335

Val Asp Ile Ile His Ser Val Val Asp Glu Arg Glu Phe Phe Glu Ile
            340                 345                 350

Met Pro Asn Tyr Ala Lys Asn Ile Ile Val Gly Phe Ala Arg Met Asn
        355                 360                 365

Gly Arg Thr Val Gly Ile Val Gly Asn Gln Pro Lys Val Ala Ser Gly
    370                 375                 380

Cys Leu Asp Ile Asn Ser Ser Val Lys Gly Ala Arg Phe Val Arg Phe
385                 390                 395                 400

Cys Asp Ala Phe Asn Ile Pro Leu Ile Thr Phe Val Asp Val Pro Gly
                405                 410                 415

Phe Leu Pro Gly Thr Ala Gln Glu Tyr Gly Gly Ile Ile Arg His Gly
            420                 425                 430

Ala Lys Leu Leu Tyr Ala Phe Ala Glu Ala Thr Val Pro Lys Val Thr
        435                 440                 445

Val Ile Thr Arg Lys Ala Tyr Gly Gly Ala Tyr Asp Val Met Ser Ser
    450                 455                 460

Lys His Leu Cys Gly Asp Thr Asn Tyr Ala Trp Pro Thr Ala Glu Ile
465                 470                 475                 480

Ala Val Met Gly Ala Lys Gly Ala Val Glu Ile Ile Phe Lys Gly His
                485                 490                 495

Glu Asn Val Glu Ala Ala Gln Ala Glu Tyr Ile Glu Lys Phe Ala Asn
            500                 505                 510

Pro Phe Pro Ala Ala Val Arg Gly Phe Val Asp Asp Ile Ile Gln Pro
        515                 520                 525

Ser Ser Thr Arg Ala Arg Ile Cys Cys Asp Leu Asp Val Leu Ala Ser
    530                 535                 540

Lys Lys Val Gln Arg Pro Trp Arg Lys His Ala Asn Ile Pro Leu
545                 550                 555


<210> SEQ ID NO 30
<211> LENGTH: 1412
<212> TYPE: DNA
<213> ORGANISM: Homo sapiens

<400> SEQUENCE: 30

tctcaaggtg actctgcagg agatgcaaag tagttaagag gagaaccccc aatactgatg     60

tgtttatagg tgaggtggtc tgatgtctta gatttgcttt aaaatattcc tgcacaaaat    120

aaaaagggga atagatgaaa caagattgac aaaatgttga ttcattgacg cggtgtaatg    180

ggtatctggg tgatcatagt acaattttat ctcttttgta tatattttaa aatttccata    240

atatagcaaa acatgagccc agtccctcaa ggcagccaga tttgggttca aaccctagtt    300

tgacctttta ctcgctgagt gactttaccc tgctacagct tcagtttctc caaatggaaa    360

taatatatac tccattaagg ttcttgtaaa ctctcaagta agagggaatc tgaggctcta    420

gcacacggcc cggcccttaa tagttgtact aatttttatt ttatttttcg aaacggagtt    480

tgctctgtca cccaggctgg agtgtagtgg catgatccgg ctcactgcaa cctccacctc    540

cagggttcaa gcaattctcc tgcctcagcc tcctcccgag taactgggat tacaggagtg    600

cgccaccacg cccagctaat ttttgtattt tttagtagag acggggtttc ggcatgttgt    660

ccaggctggt ctccaactcc tgacctcagg ttatcctccc gcctcggcct cccagagtgc    720

tgggattaca ggcgtgagcc actgcgcctg gccagtagtt gtactaacaa gggtttctgc    780
```

```
ttgcgagcaa caaagactga ctctagttgt ggctaatttc tttcacacac acatattaag     840

tgccagaggt aggacttgag ctcggatctc tgatttccag acctagaact ttttatgtgt     900

tattacagtc gttaaaaacc ttacctggat ttgtgctttg caatttacgc tttcgaacat     960

gcaggaatgt agtttgggca tttgtctgga acttcggatt ctcgggactc cagggtggcc    1020

aaggcgcgga ggtgactcaa tgacattgac cggcctggat gcacgtgggt tgctgagccg    1080

atgctgggaa ggtacggggt ttgcccggtg caggccgccg gaactcacgc acgcccctgt    1140

ctctctcact cctggggtcg gctctggccg gtggcctcca gctcagctag cggccggacg    1200

cgcagcccgc cgactagccc tccaggtcct agcgcgactc ccggatcccg gatccggcgg    1260

atctggccga ccactcaccc tcccctttcc gcaagttagg gggcggggca tcgggtttct    1320

ggctcgtgat ttgccggagc tcctgcgctc cccttctcca cccccctccgg ctgtgtgaga    1380

ggtcagcaga ggggcggtct gcggggacaa ca                                  1412
```

<210> SEQ ID NO 31
<211> LENGTH: 275
<212> TYPE: DNA
<213> ORGANISM: Homo sapiens

<400> SEQUENCE: 31

```
aggatttata acctttcagt catcacccaa tttaattagc catttgcatg atgctttcac      60

acacaattga ttcaagcatt atacaggaac acccctgtgc agctacgttt acgtcgtcat     120

ttattccaca gagtcaagac caatattctg ccaaaaaatc accaatggaa attttcattg     180

atataaatac ttgtacatat gatttgtact tctgctgtga gattccctag tgtcaaaatt     240

aaatcaataa aactgagcat ttgtctaaat attag                               275
```

<210> SEQ ID NO 32
<211> LENGTH: 1378
<212> TYPE: DNA
<213> ORGANISM: Homo sapiens

<400> SEQUENCE: 32

```
gctggcccca gccccagagt ttctgattta aaggtctgga gtaagttctg agaattcgag      60

cttgcatttc caactcactc ccaggtgata ctgaagttgc tggattgaca agattccctc     120

cttgatcaaa cattggtcag gctcttctga gctctctctt tgactaggcc tgagtgtggg     180

ctcccatgtc attccttgtg gaattccatt ttagcaagaa acttgccaag tcagtttagc     240

cagaatcctc cattcttgat atctgattac tctccatatc tggttttgac ccataccgcc     300

accatccccc aggtgatgtt cagttaccct gacctgcctt gggcaggaat cctgttaggt     360

caatttagcc agattccccg ccaatgtttc ctcttagtaa ttttccatcc actgacttcc     420

acacactgcc ccttagctat aaattaccac tttgctatat tcagcccaat cgctctgact     480

tatggcaaaa ctctatccct acctctgtca gattgggcct gaataaagtt tgccttacca     540

ttcttaaaca tgaataatta agtgtcatga atagtttttt ctttaatggg atccatactt     600

tgagaactac tgattagagg ttaagggtcc tgtgctcatt atctggcaca tattaatgat     660

aggtctctga gtttgaatcc tggccaacca cattgtcagt cttggctttt tttttttttt     720

ttttttgaga cagggttttg cccaggctgg agtgcagtga tgcaatcacg gctcactgca     780

gcctcgactt cctgggccaa gccatcctgc cgccttagcc tcccgagtag ctggggtcac     840

aggtgcaagc cgccatgccc agctaatttt taattttttt gtagaggtgg ggtcttacta     900
```

tattgctcag gctggtcttg ggctcctggg ctcacctacc tcggcctcag tcttgcctct 960
tgatcaaatc actcatctct ctgtgcttga tttacctcat ctgtgaaatc cagatagtaa 1020
gctagtgcat ggtaagtgca aaaagcaaca cctggcacaa tgcttaataa atgttggtta 1080
aatcttataa tcattttctg taggaagtgg gacgacaaag ttaagggtct aggtggtcag 1140
agaagagcaa ggactatgtc ccttttttgt gcagccaggc aggccctgta ctttttctct 1200
gcgcgaccct cctcgggcag caccgggtct cgaactctca cgccttactc ccaagcaggt 1260
tctgtagtcc agcccccgcg gctccctaca gccagccgat gctgcgcaag cgccgtaccc 1320
acgctttagc acatgcgtac tcaggtgcgc cggtagggga cgcgccggca cagcaaaa 1378

<210> SEQ ID NO 33
<211> LENGTH: 159
<212> TYPE: DNA
<213> ORGANISM: Homo sapiens

<400> SEQUENCE: 33
acaaatcaaa ggaaaagaaa ccaagaactg aattactgtc tgcccattca catcccattc 60
ctgccttttg caatcatgaa acctgggaat ccaaatagtt ggataactta gaataactaa 120
gtttattaaa ttctagaaag atctcttttg tgccttact 159

<210> SEQ ID NO 34
<211> LENGTH: 793
<212> TYPE: DNA
<213> ORGANISM: Homo sapiens

<400> SEQUENCE: 34
tttttgtatt ttttagtaga gacggggttt cggcatgttg tccaggctgg tctccaactc 60
ctgacctcag gttatcctcc cgcctcggcc tcccagagtg ctgggattac aggcgtgagc 120
cactgcgcct ggccagtagt tgtactaaca agggtttctg cttgcgagca acaaagactg 180
actctagttg tggctaattt ctttcacaca cacatattaa gtgccagagg taggacttga 240
gctcggatct ctgatttcca gacctagaac tttttatgtg ttattacagt cgttaaaaac 300
cttacctgga tttgtgcttt gcaatttacg ctttcgaaca tgcaggaatg tagtttgggc 360
atttgtctgg aacttcggat tctcgggact ccagggtggc caaggcgcgg aggtgactca 420
atgacattga ccggcctgga tgcacgtggg ttgctgagcc gatgctggga aggtacgggg 480
tttgcccggt gcaggccgcc ggaactcacg cacgcccctg tctctctcac tcctggggtc 540
ggctctggcc ggtggcctcc agctcagcta gcggccggac gcgcagcccg ccgactagcc 600
ctccaggtcc tagcgcgact cccggatccc ggatccggcg gatctggccg accactcacc 660
ctcccctttc cgcaagttag ggggcggggc atcgggtttc tggctcgtga tttgccggag 720
ctcctgcgct ccccttctcc accccctccg gctgtgtgag aggtcagcag aggggcggtc 780
tgcggggaca aca 793

<210> SEQ ID NO 35
<211> LENGTH: 168
<212> TYPE: DNA
<213> ORGANISM: Homo sapiens

<400> SEQUENCE: 35
aggatttata acctttcagt catcacccaa tttaattagc catttgcatg atgctttcac 60
acacaattga ttcaagcatt atacaggaac acccctgtgc agctacgttt acgtcgtcat 120
ttattccaca gagtcaagac caatattctg ccaaaaaatc accaatgg 168

<210> SEQ ID NO 36
<211> LENGTH: 468
<212> TYPE: DNA
<213> ORGANISM: Homo sapiens

<400> SEQUENCE: 36
gctggtcttg ggctcctggg ctcacctacc tcggcctcag tcttgcctct tgatcaaatc 60
actcatctct ctgtgcttga tttacctcat ctgtgaaatc cagatagtaa gctagtgcat 120
ggtaagtgca aaaagcaaca cctggcacaa tgcttaataa atgttggtta aatcttataa 180
tcattttctg taggaagtgg gacgacaaag ttaagggtct aggtggtcag agaagagcaa 240
ggactatgtc cctttttgt gcagccaggc aggccctgta ctttttctct gcgcgaccct 300
cctcgggcag caccgggtct cgaactctca cgccttactc ccaagcaggt tctgtagtcc 360
agcccccgcg gctccctaca gccagccgat gctgcgcaag cgccgtaccc acgctttagc 420
acatgcgtac tcaggtgcgc cggtagggga cgcgccggca cagcaaaa 468

<210> SEQ ID NO 37
<211> LENGTH: 102
<212> TYPE: DNA
<213> ORGANISM: Homo sapiens

<400> SEQUENCE: 37
acaaatcaaa ggaaaagaaa ccaagaactg aattactgtc tgcccattca catcccattc 60
ctgccttttg caatcatgaa acctgggaat ccaaatagtt gg 102

<210> SEQ ID NO 38
<211> LENGTH: 3360
<212> TYPE: DNA
<213> ORGANISM: Artificial Sequence
<220> FEATURE:
<223> OTHER INFORMATION: Description of Artificial Sequence: rAAV with native PCCA cDNA sequence (DTC346)

<400> SEQUENCE: 38
ttggccactc cctctctgcg cgctcgctcg ctcactgagg ccgggcgacc aaaggtcgcc 60
cgacgcccgg gctttgcccg ggcggcctca gtgagcgagc gagcgcgcag agagggagtg 120
gccaactcca tcactagggg ttcctcgtta cataacttac ggtaaatggc ccgcctggct 180
gaccgcccaa cgacccccgc ccattgacgt caataatgac gtatgttccc atagtaacgc 240
caatagggac tttccattga cgtcaatggg tggactattt acggtaaact gcccacttgg 300
cagtacatca agtgtatcat atgccaagta cgccccctat tgacgtcaat gacggtaaat 360
ggcccgcctg gcattatgcc cagtacatga ccttatggga ctttcctact tggcagtaca 420
tctacgtatt agtcatcgct attaccatgc gtcgaggtga gccccacgtt ctgcttcact 480
ctccccatct cccccccctc cccaccccca attttgtatt tatttatttt ttaattattt 540
tatgcagcga tgggggcggg gggggggggg gcgcgcgcca ggcggggcgg ggcggggcga 600
ggggcggggc ggggcgaggc ggagaggtgc ggcggcagcc aatcagagcg gcgcgctccg 660
aaagtttcct tttatggcga ggcggcggcg gcggcggccc tataaaaagc gaagcgcgcg 720
gcgggcggct ctaaggtaaa tataaaattt ttaagtgtat aatgtgttaa actactgatt 780
ctaattgttt ctctctttta gattccaacc tttggaactg atgccgccac catggcgggg 840
ttctgggtcg ggacagcacc gctggtcgct gccggacggc gtgggcggtg gccgccgcag 900
cagctgatgc tgagcgcggc gctgcggacc ctgaagcatg ttctgtacta ttcaagacag 960

```
tgcttaatgg tgtcccgtaa tcttggttca gtgggatatg atcctaatga aaaaactttt   1020
gataaaattc ttgttgctaa tagaggagaa attgcatgtc gggttattag aacttgcaag   1080
aagatgggca ttaagacagt tgccatccac agtgatgttg atgctagttc tgttcatgtg   1140
aaaatggcgg atgaggctgt ctgtgttggc ccagctccca ccagtaaaag ctacctcaac   1200
atggatgcca tcatggaagc cattaagaaa accagggccc aagctgtaca tccaggttat   1260
ggattccttt cagaaaacaa agaatttgcc agatgtttgg cagcagaaga tgtcgttttc   1320
attggacctg acacacatgc tattcaagcc atgggcgaca agattgaaag caaattatta   1380
gctaagaaag cagaggttaa tacaatccct ggctttgatg gagtagtcaa ggatgcagaa   1440
gaagctgtca gaattgcaag ggaaattggc taccctgtca tgatcaaggc ctcagcaggt   1500
ggtggtggga aaggcatgcg cattgcttgg gatgatgaag agaccaggga tggttttaga   1560
ttgtcatctc aagaagctgc ttctagtttt ggcgatgata gactactaat agaaaaattt   1620
attgataatc ctcgtcatat agaaatccag gttctaggtg ataaacatgg gaatgcttta   1680
tggcttaatg aaagagagtg ctcaattcag agaagaaatc agaaggtggt ggaggaagca   1740
ccaagcattt ttttggatgc ggagactcga agagcgatgg gagaacaagc tgtagctctt   1800
gccagagcag taaaatattc ctctgctggg accgtggagt tccttgtgga ctctaagaag   1860
aatttttatt tcttggaaat gaatacaaga ctccaggttg agcatcctgt cacagaatgc   1920
attactggcc tggacctagt ccaggaaatg atccgtgttg ctaagggcta ccctctcagg   1980
cacaaacaag ctgatattcg catcaacggc tgggcagttg aatgtcgggt ttatgctgag   2040
gacccctaca agtcttttgg tttaccatct attgggagat tgtctcagta ccaagaaccg   2100
ttacatctac ctggtgtccg agtggacagt ggcatccaac caggaagtga tattagcatt   2160
tattatgatc ctatgatttc aaaactaatc acatatggct ctgatagaac tgaggcactg   2220
aagagaatgg cagatgcact ggataactat gttattcgag gtgttacaca taatattgca   2280
ttacttcgag aggtgataat caactcacgc tttgtaaaag gagacatcag cactaaattt   2340
ctctccgatg tgtatcctga tggcttcaaa ggacacatgc taaccaagag tgagaagaac   2400
cagttattgg caatagcatc atcattgttt gtggcattcc agttaagagc acaacatttt   2460
caagaaaatt caagaatgcc tgttattaaa ccagacatag ccaactggga gctctcagta   2520
aaattgcatg ataaagttca taccgtagta gcatcaaaca atgggtcagt gttctcggtg   2580
gaagttgatg ggtcgaaact aaatgtgacc agcacgtgga acctggcttc gcccttattg   2640
tctgtcagcg ttgatggcac tcagaggact gtccagtgtc tttctcgaga agcaggtgga   2700
aacatgagca ttcagtttct tggtacagtg tacaaggtga atatcttaac cagacttgcc   2760
gcagaattga acaaatttat gctggaaaaa gtgactgagg acacaagcag tgttctgcgt   2820
tccccgatgc ccggagtggt ggtggccgtc tctgtcaagc ctggagacgc ggtagcagaa   2880
ggtcaagaaa tttgtgtgat tgaagccatg aaaatgcaga atagtatgac agctgggaaa   2940
actggcacgg tgaaatctgt gcactgtcaa gctggagaca cagttggaga aggggatctg   3000
ctcgtggagc tggaatgaat ccagacatga taagatacat tgatgagttt ggacaaacca   3060
caactagaat gcagtgaaaa aaatgcttta tttgtgaaat ttgtgatgct attgctttat   3120
ttgtaaccat tataagctgc aataaacaag ttaacaacaa caattgcatt cattttatgt   3180
ttcaggttca gggggaggtg tgggaggttt tttagaggaa cccctagtga tggagttggc   3240
cactccctct ctgcgcgctc gctcgctcac tgaggccgcc cgggcaaagc ccgggcgtcg   3300
```

ggcgaccttt ggtcgcccgg cctcagtgag cgagcgagcg cgcagagagg gagtggccaa 3360

<210> SEQ ID NO 39
<211> LENGTH: 2806
<212> TYPE: DNA
<213> ORGANISM: Artificial Sequence
<220> FEATURE:
<223> OTHER INFORMATION: Description of Artificial Sequence: rAAV with native PCCB cDNA sequence

<400> SEQUENCE: 39

```
ttggccactc cctctctgcg cgctcgctcg ctcactgagg ccgggcgacc aaaggtcgcc     60
cgacgcccgg gctttgcccg ggcggcctca gtgagcgagc gagcgcgcag agagggagtg    120
gccaactcca tcactagggg ttcctcgtta cataacttac ggtaaatggc ccgcctggct    180
gaccgcccaa cgacccccgc ccattgacgt caataatgac gtatgttccc atagtaacgc    240
caatagggac tttccattga cgtcaatggg tggagtattt acggtaaact gcccacttgg    300
cagtacatca agtgtatcat atgccaagta cgccccctat tgacgtcaat gacggtaaat    360
ggcccgcctg gcattatgcc cagtacatga ccttatggga ctttcctact tggcagtaca    420
tctacgtatt agtcatcgct attaccatgt cgaggtgagc cccacgttct gcttcactct    480
ccccatctcc cccccctccc cacccccaat tttgtattta tttatttttt aattattttg    540
tgcagcgatg ggggcggggg gggggggggg gcgcgcgcca ggcggggcgg ggcggggcga    600
ggggcggggc ggggcgaggc ggagaggtgc ggcggcagcc aatcagagcg gcgcgctccg    660
aaagtttcct tttatggcga ggcggcggcg gcggcggccc tataaaaagc gaagcgcgcg    720
gcgggcggct ctaaggtaaa tataaaattt ttaagtgtat aatgtgttaa actactgatt    780
ctaattgttt ctctctttta gattccaacc tttggaactg atctcgaggc cgccaccatg    840
gcggcggcat tacgggtggc ggcggtcggg gcaaggctca gcgttctggc gagcggtctc    900
cgcgccgcgg tccgcagcct ttgcagccag gccacctctg ttaacgaacg catcgaaaac    960
aagcgccgga ccgcgctgct gggagggggc caacgccgta ttgacgcgca gcacaagcga   1020
ggaaagctaa cagccaggga gaggatcagt ctcttgctgg accctggcag ctttgttgag   1080
agcgacatgt ttgtggaaca cagatgtgca gattttggaa tggctgctga taagaataag   1140
tttcctggag acagcgtggt cactggacga ggccgaatca atggaagatt ggtttatgtc   1200
ttcagtcagg attttacagt ttttggaggc agtctgtcag gagcacatgc ccaaaagatc   1260
tgcaaaatca tggaccaggc cataacggtg ggggctccag tgattgggct gaatgactct   1320
gggggagcac ggatccaaga aggagtggag tctttggctg gctatgcaga catctttctg   1380
aggaatgtta cggcatccgg agtcatccct cagatttctc tgatcatggg cccatgtgct   1440
ggtggggccg tctactcccc agccctaaca gacttcacgt tcatggtaaa ggacacctcc   1500
tacctgttca tcactggccc tgatgttgtg aagtctgtca ccaatgagga tgttacccag   1560
gaggagctcg gtggtgccaa gacccacacc accatgtcag gtgtggccca cagagctttt   1620
gaaaatgatg ttgatgcctt gtgtaatctc cgggatttct tcaactacct gcccctgagc   1680
agtcaggacc cggctcccgt ccgtgagtgc cacgatccca gtgaccgtct ggttcctgag   1740
cttgacacaa ttgtcccttt ggaatcaacc aaagcctaca acatggtgga catcatacac   1800
tctgttgttg atgagcgtga attttttgag atcatgccca attatgccaa gaacatcatt   1860
gttggttttg caagaatgaa tgggaggact gttggaattg ttggcaacca acctaaggtg   1920
gcctcaggat gcttggatat taattcatct gtgaaagggg ctcgttttgt cagattctgt   1980
```

-continued

```
gatgcattca atattccact catcactttt gttgatgtcc ctggctttct acctggcaca   2040

gcacaggaat acgggggcat catccggcat ggtgccaagc ttctctacgc atttgctgag   2100

gcaactgtac ccaaagtcac agtcatcacc aggaaggcct atggaggtgc ctatgatgtc   2160

atgagctcta agcacctttg tggtgatacc aactatgcct ggcccaccgc agagattgca   2220

gtcatgggag caaagggcgc tgtggagatc atcttcaaag ggcatgagaa tgtggaagct   2280

gctcaggcag agtacatcga gaagtttgcc aacccctttcc ctgcagcagt gcgagggttt   2340

gtggatgaca tcatccaacc ttcttccaca cgtgcccgaa tctgctgtga cctggatgtc   2400

ttggccagca agaaggtaca acgtccttgg agaaaacatg caaatattcc attgtaatct   2460

agagatccag acatgataag atacattgat gagtttggac aaaccacaac tagaatgcag   2520

tgaaaaaaat gctttatttg tgaaatttgt gatgctattg ctttatttgt aaccattata   2580

agctgcaata aacaagttaa caacaacaat tgcattcatt ttatgtttca ggttcagggg   2640

gaggtgtggg aggtttttta gaggaacccc tagtgatgga gttggccact ccctctctgc   2700

gcgctcgctc gctcactgag gccgcccggg caaagcccgg gcgtcgggcg acctttggtc   2760

gcccggcctc agtgagcgag cgagcgcgca gagagggagt ggccaa                  2806
```

GENE THERAPY FOR TREATING PROPIONIC ACIDEMIA

CROSS-REFERENCE TO RELATED APPLICATION

This application is a U.S. national stage application, filed under 35 U.S.C. § 371, of International Application No. PCT/US2019/054003, filed on Oct. 1, 2019, which claims the benefit of and priority to U.S. Provisional Application No. 62/739,471, filed on Oct. 1, 2018, the entire disclosure of which are incorporated by reference herein in their entireties for all purposes.

SEQUENCE LISTING

The instant application contains a Sequence Listing which has been submitted electronically in ASCII format and is hereby incorporated by reference in its entirety. Said ASCII copy, created on Sep. 22, 2019, is named ULP-001WO_SL_ST25.txt and is 98,889 bytes in size.

TECHNICAL FIELD OF THE INVENTION

The present disclosure relates generally to adeno-associated viral vectors, adeno-associated virus, and methods of their use in gene therapy for treating propionic acidemia.

BACKGROUND OF THE INVENTION

Propionic acidemia (PA), also known as propionic aciduria, is an inborn error of organic acid metabolism caused by a deficiency of active propionyl-CoA carboxylase (PCC), an enzyme needed to convert propionyl-CoA to (D)-methylmalonyl-CoA, a key step in the catabolic pathway for odd chain fatty acids and the propiogenic amino acids, particularly isoleucine, threonine, methionine, and valine. The PCC enzyme is composed of two non-identical subunits, α and β, which are encoded by the PCCA and PCCB genes, respectively. A propionyl-CoA carboxylase deficiency can result from mutations in either PCCA or PCCB. In one study, a mutation analysis of 30 patients with PA was performed and found that 15 patients were α-subunit deficient and 15 patients were β-subunit deficient. See Yang et al., 2004, *Mol Genet and Metab.* 81:335-342.

The estimated incidence of PA is 1:105,000 to 1:130,000 in the United States. This rare autosomal recessive metabolic disorder presents in the early neonatal period with poor feeding, vomiting, lethargy, seizures, and lack of muscle tone. Left untreated, death can occur quickly, due to secondary hyperammonemia, infection, cardiomyopathy, or basal ganglial stroke. PA can be diagnosed almost immediately in newborns and the disease is included in newborn screening panels in the United States.

PA is currently managed by dietary restriction of amino acid precursors, supplementation of L-carnitine to address diminished carnitine levels, and administration of antibiotics to reduce propionic acid production by intestinal bacteria. Liver transplantation is gaining a role in the management of PA in situations where the patient cannot be managed by standard treatment. However, despite the aggressive efforts to address the disease through complex combinations of nutritional, cofactor, and antibiotic therapy, the long-term prognosis for patients with PA remains poor. See van der Meer et al., 1996, *Eur. J. Pediatr.* 155:205-210. Accordingly, improved therapeutic approaches are needed that address the underlying cause of the disease, namely the deficiency of PCC.

The present invention addresses this need via the creation of adeno-associated viral vectors that mediate the transfer of functional PCCA or PCCB genes to patients with PA. The present invention also describes the creation of recombinant adeno-associated virus (rAAV) that delivers functional PCCA or PCCB genes to patients with PA.

SUMMARY OF THE INVENTION

This invention provides compositions and methods of their use in gene therapy. More specifically, provided herein are recombinant adeno-associated virus (rAAV) comprising an adeno-associated virus (AAV) capsid, and a vector genome packaged therein useful for the treatment of PA.

In one aspect, the present disclosure provides a recombinant adeno-associated virus (rAAV) comprising an AAV capsid, and a vector genome packaged therein, said vector genome comprising in 5' to 3' order: (a) a 5'-inverted terminal repeat sequence (5'-ITR) sequence; (b) a promoter sequence; (c) a partial or complete coding sequence for PCCA; and (d) a 3'-inverted terminal repeat sequence (3'-ITR) sequence.

In another aspect, the present disclosure provides an rAAV comprising an AAV capsid, and a vector genome packaged therein, said vector genome comprising as operably linked components in 5' to 3' order: (a) a 5'-ITR sequence; (b) an enhancer sequence; (c) a promoter sequence; (d) an intron sequence; (e) a partial or complete coding sequence for PCCA; (f) a polyadenylation signal sequence; and (g) a 3'-ITR sequence.

In certain embodiments, the present disclosure provides an rAAV comprising an AAV capsid, and a vector genome packaged therein that comprises an AAV 5'-ITR sequence, a promoter sequence, a partial or complete coding sequence for PCCA or an isoform thereof, or a functional fragment or functional variant thereof, and an AAV 3'-ITR sequence.

In certain embodiments, the present disclosure provides an rAAV comprising an AAV capsid, and a vector genome packaged therein that comprises an AAV 5'-ITR, a promoter sequence, a truncated or complete nucleotide sequence of human PCCA 5'-untranslated region (5'-UTR), a partial or complete coding sequence for PCCA or an isoform thereof, or a functional fragment or functional variant thereof, a truncated or complete human PCCA 3'-untranslated region (3'-UTR) nucleotide sequence, and an AAV 3'-ITR.

In certain embodiments, the present disclosure provides an rAAV comprising an AAV capsid, and a vector genome packaged therein that comprises complete human PCCA 5'-UTR represented by SEQ ID NO: 30. In certain embodiments, the packaged genome comprises truncated human PCCA 5'-UTR nucleotide sequence. In some embodiments, the truncated nucleotide sequence of human PCCA 5'-UTR comprises a portion of SEQ ID NO: 30. In some embodiments, the truncated nucleotide sequence of human PCCA 5'-UTR comprises a nucleotide sequence of at least 100 continuous nucleotides, which is at least 95% identical to an equal length region of SEQ ID NO: 30. In certain embodiments, the truncated or complete human PCCA 5'-UTR is located between the intron sequence and the partial or complete coding sequence for PCCA when the partial or complete coding sequence in the packaged vector genome is for PCCA.

In certain embodiments, the packaged vector genome comprises complete human PCCA 3'-UTR represented by SEQ ID NO: 31. In certain embodiments, the packaged genome comprises truncated human PCCA 3'-UTR nucleotide sequence. In some embodiments, the truncated nucleotide sequence of human PCCA 3'-UTR comprises a portion of SEQ ID NO: 31. In some embodiments, the truncated nucleotide sequence of human PCCA 3'-UTR comprises a nucleotide sequence of at least 15 continuous nucleotides, which is at least 95% identical to an equal length region of SEQ ID NO: 31. In certain embodiments, the truncated or complete human PCCA 3'-UTR is located between the polyadenylation signal sequence; and the 3'-ITR sequence when the partial or complete coding sequence in the packaged vector genome is for PCCA.

In one embodiment, the partial or complete coding sequence for PCCA is a wild-type coding sequence. In an alternative embodiment, the partial or complete coding sequence for PCCA is a codon-optimized coding sequence. In one exemplary embodiment, the partial or complete coding sequence for PCCA is codon-optimized for expression in humans.

In some embodiments, PCCA is encoded by the wild-type coding sequence shown in SEQ ID NO: 1. In another embodiment, a coding sequence expressing a natural isoform or variant of PCCA may be used, such as those shown in UniProtKB/Swiss-Prot Accession Nos. P05165-1 (SEQ ID NO: 25), P05165-2 (SEQ ID NO: 26), and P05165-3 (SEQ ID NO: 27). In certain embodiments, PCCA is encoded by a codon-optimized coding sequence. In some embodiments, PCCA is encoded by a codon-optimized coding sequence that is less than 80% identical to the wild-type coding sequence shown in SEQ ID NO: 1. In some exemplary embodiments, PCCA is encoded by a codon-optimized coding sequence selected from SEQ ID NOs: 2-6. In some embodiments, PCCA is encoded by a codon-optimized coding sequence which is at least 80% identical to a sequence selected from SEQ ID NOs: 2-6. In some embodiments, PCCA is encoded by a codon-optimized coding sequence which is at least 90% identical to a sequence selected from SEQ ID NOs: 2-6. In some embodiments, PCCA is encoded by a codon-optimized coding sequence which is at least 95% identical to a sequence selected from SEQ ID NOs: 2-6. In some embodiments, the coding sequence for PCCA may further comprise a stop codon (TGA, TAA, or TAG) at the 3' end. In some embodiments, the expressed PCCA comprises or consists of an amino acid sequence of SEQ ID NO: 16.

In another aspect, the present disclosure provides a recombinant adeno-associated virus (rAAV) comprising an AAV capsid, and a vector genome packaged therein, said vector genome comprising in 5' to 3' order: (a) a 5'-ITR sequence; (b) a promoter sequence; (c) a partial or complete coding sequence for PCCB; and (d) a 3'-ITR sequence.

In another aspect, the present disclosure provides an rAAV comprising an AAV capsid, and a vector genome packaged therein, said vector genome comprising as operably linked components in 5' to 3' order: (a) a 5'-ITR sequence; (b) an enhancer sequence; (c) a promoter sequence; (d) an intron sequence; (e) a partial or complete coding sequence for PCCB; (f) a polyadenylation signal sequence; and (g) a 3'-ITR sequence.

In certain embodiments, the present disclosure provides an rAAV comprising an AAV capsid, and a vector genome packaged therein that comprises an AAV 5'-ITR sequence, a promoter sequence, a partial or complete coding sequence for PCCB or an isoform thereof, or a functional fragment or functional variant thereof, and an AAV 3'-ITR sequence.

In certain embodiments, the present disclosure provides an rAAV comprising an AAV capsid, and a vector genome packaged therein that comprises an AAV 5'-ITR, a promoter sequence, a truncated or complete nucleotide sequence of human PCCB 5'-untranslated region (5'-UTR), a partial or complete coding sequence for PCCB or an isoform thereof, or a functional fragment or functional variant thereof, a truncated or complete human PCCB 3'-untranslated region (3'-UTR) nucleotide sequence, and an AAV 3'-ITR.

In certain embodiments, the packaged vector genome comprises complete human PCCB 5'-UTR represented by SEQ ID NO: 32. In certain embodiments, the packaged vector genome comprises truncated human PCCB 5'-UTR nucleotide sequence. In some embodiments, the truncated nucleotide sequence of human PCCB 5'-UTR comprises a portion of SEQ ID NO: 32. In some embodiments, the truncated nucleotide sequence of human PCCB 5'-UTR comprises a nucleotide sequence of at least 100 continuous nucleotides, which is at least 95% identical to an equal length region of SEQ ID NO: 32. In certain embodiments, the truncated or complete human PCCB 5'-UTR is located between the intron sequence and the partial or complete coding sequence for PCCB when the partial or complete coding sequence in the packaged vector genome is for PCCB.

In certain embodiments, the packaged vector genome comprises complete human PCCB 3'-UTR represented by SEQ ID NO: 33. In certain embodiments, the packaged vector genome comprises truncated human PCCB 3'-UTR nucleotide sequence. In some embodiments, the truncated nucleotide sequence of human PCCB 3'-UTR comprises a portion of SEQ ID NO: 33. In some embodiments, the truncated nucleotide sequence of human PCCB 3'-UTR comprises a nucleotide sequence of at least 15 continuous nucleotides, which is at least 95% identical to an equal length region of SEQ ID NO: 33. In certain embodiments, the truncated or complete human PCCB 3'-UTR is located between the polyadenylation signal sequence; and the 3'-ITR sequence when the partial or complete coding sequence in the packaged vector genome is for PCCB.

In one embodiment, the partial or complete coding sequence for PCCB is a wild-type coding sequence. In an alternative embodiment, the partial or complete coding sequence for PCCB is a codon-optimized coding sequence. In one exemplary embodiment, the partial or complete coding sequence for PCCB is codon-optimized for expression in humans.

In some embodiments, PCCB is encoded by the wild-type coding sequence shown in SEQ ID NO: 7. In another embodiment, a coding sequence expressing a natural isoform or variant of PCCB may be used, such as those shown in UniProtKB/Swiss-Prot Accession Nos. P05166-1 (SEQ ID NO: 28) and P05166-2 (SEQ ID NO: 29). In alternative embodiments, PCCB is encoded by a codon-optimized coding sequence. In some embodiments, PCCB is encoded by a codon-optimized coding sequence that is less than 80% identical to the wild-type coding sequence shown in SEQ ID NO: 7. In some exemplary embodiments, PCCB is encoded by a codon-optimized coding sequence selected from SEQ ID NOs: 8-12. In some embodiments, PCCB is encoded by a codon-optimized coding sequence which is at least 80% identical to a sequence selected from SEQ ID NOs: 8-12. In some embodiments, PCCB is encoded by a codon-optimized coding sequence which is at least 90% identical to a sequence selected from SEQ ID NOs: 8-12. In some embodiments, PCCB is encoded by a codon-optimized coding sequence which is at least 95% identical to a sequence selected from SEQ ID NOs: 8-12. In some embodiments, the coding sequence for PCCB may further comprise a stop codon (TGA, TAA, or TAG) at the 3' end. In some embodiments, the expressed PCCB comprises or consists of an amino acid sequence of SEQ ID NO: 17.

In some embodiments, the 5'-ITR sequence is from AAV2. In some embodiments, the 3'-ITR sequence is from AAV2. In some embodiments, the 5'-ITR sequence and the 3'-ITR sequence are from AAV2. In some embodiments, the 5'-ITR sequence and/or the 3'-ITR sequence comprise or consist of SEQ ID NO: 15. In other embodiments, the 5'-ITR sequence and/or the 3'-ITR sequence are from a non-AAV2 source.

In one embodiment, the promoter is selected from a chicken β-actin (CBA) promoter, a cytomegalovirus (CMV) immediate early gene promoter, a transthyretin (TTR) promoter, a thyroxine binding globulin (TBG) promoter, an alpha-1 anti-trypsin (A1AT) promoter, a CAG promoter (constructed using the CMV early enhancer element, the promoter, the first exon, and the first intron of CBA gene, and the splice acceptor of the rabbit beta-globin gene), a PCCA gene-specific endogenous promoter, and a PCCB gene-specific endogenous promoter. In an exemplary embodiment, the promoter is the CBA promoter. In one embodiment, the CBA promoter comprises or consists of SEQ ID NO: 18. In some embodiments, the promoter is a gene-specific endogenous promoter. In one some embodiment, the promoter comprises native gene promoter elements. In an exemplary embodiment, the promoter is the PCCA gene-specific endogenous promoter comprising a nucleotide sequence of at least 15 continuous nucleotides, which is at least 95% identical to an equal length region of SEQ ID NO: 34 when the partial or complete coding sequence in the vector genome is for PCCA. In an exemplary embodiment, the promoter is the PCCB gene-specific endogenous promoter comprising a nucleotide sequence of at least 15 continuous nucleotides, which is at least 95% identical to an equal length region of SEQ ID NO: 36 when the partial or complete coding sequence in the vector genome is for PCCB.

In some embodiments, the packaged vector genome further comprises one or more enhancer sequences. In one embodiment, the enhancer is selected from a cytomegalovirus (CMV) immediate early gene enhancer, a transthyretin enhancer (enTTR), a chicken β-actin (CBA) enhancer, an En34 enhancer, and an apolipoprotein E (ApoE) enhancer. In an exemplary embodiment, the enhancer is the CMV enhancer. In one embodiment, the CMV enhancer comprises or consists of SEQ ID NO: 19. In certain embodiments, the enhancer is located upstream of the promoter sequence.

In some embodiments, packaged vector genome further comprises one or more intron sequences. In one embodiment, the intron is selected from an SV40 Small T intron, a rabbit hemoglobin subunit beta (rHBB) intron, a human beta globin IVS2 intron, a β-globin/IgG chimeric intron (Promega chimeric intron), or an hFIX intron. In one exemplary embodiment, the intron is the SV40 Small T intron. In one embodiment, the SV40 Small T intron sequence comprises or consists of SEQ ID NO: 20. In another exemplary embodiment, the intron is the rHBB intron. In one embodiment, the rHBB intron sequence comprises or consists of SEQ ID NO: 21.

In some embodiments, packaged vector genome further comprises a consensus Kozak sequence. In some embodiments, the consensus Kozak sequence is located downstream of an intron sequence. In one embodiment, the consensus Kozak sequence is GCCGCC (SEQ ID NO: 24). In certain embodiments, the consensus Kozak sequence is located upstream of coding sequence for PCCA. In certain embodiments, the consensus Kozak sequence is located upstream of coding sequence for PCCB.

In some embodiments, packaged vector genome further comprises a polyadenylation signal sequence. In certain embodiments, the polyadenylation signal sequence is selected from a bovine growth hormone (BGH) polyadenylation signal sequence, an SV40 polyadenylation signal sequence, a rabbit beta globin polyadenylation signal sequence, a PCCA gene-specific endogenous polyadenylation signal sequence, a PCCB gene-specific endogenous polyadenylation signal sequence. In an exemplary embodiment, the polyadenylation signal sequence is the bovine growth hormone (BGH) polyadenylation signal sequence. In one embodiment, the BGH polyadenylation signal sequence comprises or consists of SEQ ID NO: 22. In another exemplary embodiment, the polyadenylation signal sequence is the SV40 polyadenylation signal sequence. In one embodiment, the SV40 polyadenylation signal sequence comprises or consists of SEQ ID NO: 23. In another exemplary embodiment, the polyadenylation signal sequence comprises the PCCA gene-specific endogenous polyadenylation signal sequence when the partial or complete coding sequence in the vector genome is for PCCA. In one embodiment, the PCCA gene-specific endogenous polyadenylation signal sequence comprises a nucleotide sequence of at least 15 continuous nucleotides, which is at least 95% identical to an equal length region of SEQ ID NO: 35. In another exemplary embodiment, the polyadenylation signal sequence comprises the PCCB gene-specific endogenous polyadenylation signal sequence when the partial or complete coding sequence in the vector genome is for PCCB. In one embodiment, the PCCB gene-specific endogenous polyadenylation signal sequence comprises a nucleotide sequence of at least 15 continuous nucleotides, which is at least 95% identical to an equal length region of SEQ ID NO: 37.

In certain embodiments, the AAV capsid is from an AAV of serotype 1, 2, 3, 4, 5, 6, 7, 8, 9, 10, 11, 12, rh10, or hu37. In one exemplary embodiment, the AAV capsid is from AAV9. In another exemplary embodiment, the AAV capsid is from AAV8. In another exemplary embodiment, the AAV capsid is an AAV9 variant capsid.

In certain embodiments, the present disclosure provides rAAV in which the coding sequence is for PCCA and not for PCCB, the promoter is a PCCA gene-specific endogenous promoter and not a PCCB gene-specific endogenous promoter, and the polyadenylation signal sequence is a PCCA gene-specific endogenous polyadenylation signal sequence and not a PCCB gene-specific endogenous polyadenylation signal sequence. In certain embodiments, the present disclosure provides rAAV in which the coding sequence is for PCCB and not for PCCA, the promoter is a PCCB gene-specific endogenous promoter and not a PCCA gene-specific endogenous promoter, and the polyadenylation signal sequence is a PCCB gene-specific endogenous polyadenylation signal sequence and not a PCCA gene-specific endogenous polyadenylation signal sequence.

In some aspects, the present disclosure provides novel codon-optimized nucleic acid sequences encoding PCCA. In one embodiment, the codon-optimized nucleic acid sequence encoding PCCA is less than 80% identical to the wild-type coding sequence shown in SEQ ID NO: 1. In some embodiments, the codon-optimized nucleic acid sequence encoding PCCA is at least 80%, 85%, 90%, 91%, 92%, 93%, 94%, 95%, 96%, 97%, 98%, 99% or more identical to SEQ ID NOs: 2-6. In some embodiments, the present disclosure provides nucleic acid sequences which are less than 80% identical to the wild-type coding sequence shown in SEQ ID NO: 1 and are at least 80%, 85%, 90%, 91%, 92%, 93%, 94%, 95%, 96%, 97%, 98%, 99% or more identical to SEQ ID NOs: 2-6. In exemplary embodiments, the present disclosure provides a nucleic acid sequence encoding PCCA selected from SEQ ID NOs: 2-6. Further provided are fragments of the nucleic acid sequences shown in SEQ ID NOs: 2-6 which encode a polypeptide having functional PCCA activity. In some embodiments, the nucleic acid sequence encoding PCCA may further comprise a stop codon (TGA, TAA, or TAG) at the 3' end.

In some aspects, the present disclosure provides novel codon-optimized nucleic acid sequences encoding PCCB. In one embodiment, the codon-optimized nucleic acid sequence encoding PCCB is less than 80% identical to the wild-type coding sequence shown in SEQ ID NO: 7. In some embodiments, the codon-optimized nucleic acid sequence encoding PCCB is at least 80%, 85%, 90%, 91%, 92%, 93%, 94%, 95%, 96%, 97%, 98%, 99% or more identical to SEQ ID NOs: 8-12. In some embodiments, the present disclosure provides nucleic acid sequences which are less than 80% identical to the wild-type coding sequence shown in SEQ ID NO: 7 and are at least 80%, 85%, 90%, 91%, 92%, 93%, 94%, 95%, 96%, 97%, 98%, 99% or more identical to SEQ ID NOs: 8-12. In exemplary embodiments, the present disclosure provides a nucleic acid sequence encoding PCCB selected from SEQ ID NOs: 8-12. Further provided are fragments of the nucleic acid sequences shown in SEQ ID NOs: 8-12, which encode a polypeptide having functional PCCB activity. In some embodiments, the nucleic acid sequence encoding PCCB may further comprise a stop codon (TGA, TAA, or TAG) at the 3' end.

In certain embodiments, the present disclosure provides recombinant adeno-associated virus (rAAV) useful as agents for gene therapy in the treatment of PA, wherein said rAAV comprises an AAV capsid, and a vector genome as described herein packaged therein. In some embodiments, the AAV capsid is from an AAV of serotype 1, 2, 3, 4, 5, 6, 7, 8, 9, 10, 11, 12, rh10, or hu37 (i.e., AAV1, AAV2, AAV3, AAV4, AAV5, AAV6, AAV7, AAV9, AAV10, AAV11, AAV12, AAVrh10, or AAVhu37). In an exemplary embodiment, the AAV vector is an AAV serotype 9 (AAV9) vector, an AAV9 variant vector, an AAV serotype 8 (AAV8) vector, or an AAV serotype 2 (AAV2) vector.

In certain embodiments, the present disclosure provides an rAAV useful for the treatment of propionic acidemia (PA), said rAAV comprising an AAV capsid, and a vector genome packaged therein, said vector genome comprising as operably linked components in 5' to 3' order: (a) a 5'-ITR sequence; (b) an enhancer sequence; (c) a promoter sequence; (d) an intron sequence; (e) a coding sequence for PCCA selected from SEQ ID NOs: 1-6; (f) a polyadenylation signal sequence; and (g) a 3'ITR sequence.

In certain embodiments, the present disclosure provides an rAAV useful for the treatment of propionic acidemia (PA), said rAAV comprising an AAV capsid, and a vector genome packaged therein, said vector genome comprising as operably linked components in 5' to 3' order: (a) a 5'-ITR sequence; (b) an enhancer sequence; (c) a promoter sequence; (d) an intron sequence; (e) a coding sequence for PCCB selected from SEQ ID NOs: 7-12; (f) a polyadenylation signal sequence; and (g) a 3'ITR sequence.

In certain embodiments, the present disclosure provides an rAAV useful for the treatment of propionic acidemia (PA), said rAAV comprising an AAV9 capsid, and a vector genome packaged therein, said vector genome comprising as operably linked components in 5' to 3' order: (a) a 5'-ITR sequence; (b) an enhancer sequence; (c) a promoter sequence; (d) an intron sequence; (e) a coding sequence for PCCA selected from SEQ ID NOs: 1-6; (f) a polyadenylation signal sequence; and (g) a 3'-ITR sequence.

In certain embodiments, the present disclosure provides an rAAV useful for the treatment of propionic acidemia (PA), said rAAV comprising an AAV9 capsid, and a vector genome packaged therein, said vector genome comprising as operably linked components in 5' to 3' order: (a) a 5'-ITR sequence; (b) an enhancer sequence; (c) a promoter sequence; (d) an intron sequence; (e) a coding sequence for PCCB selected from SEQ ID NOs: 7-12; (f) a polyadenylation signal sequence; and (g) a 3'-ITR sequence.

In certain embodiments, the present disclosure provides an rAAV useful for the treatment of propionic acidemia (PA), said rAAV comprising an AAV9 capsid, and a vector genome packaged therein, said vector genome comprising as operably linked components in 5' to 3' order: (a) an AAV2 5'-ITR sequence; (b) a CMV enhancer sequence; (c) a CBA promoter sequence; (d) an rHBB or an SV40 Small T intron sequence; (e) a coding sequence for PCCA selected from SEQ ID NOs: 1-6; (f) a BGH or SV40 polyadenylation signal sequence; and (g) an AAV2 3'-ITR sequence.

In certain embodiments, the present disclosure provides an rAAV useful for the treatment of propionic acidemia (PA), said rAAV comprising an AAV9 capsid, and a vector genome packaged therein, said vector genome comprising as operably linked components in 5' to 3' order: (a) an AAV2 5'-ITR sequence; (b) a CMV enhancer sequence; (c) a CBA promoter sequence; (d) an rHBB or an SV40 Small T intron sequence; (e) a coding sequence for PCCB selected from SEQ ID NOs: 7-12; (f) a BGH or SV40 polyadenylation signal sequence; and (g) an AAV2 3'-ITR sequence.

In certain embodiments, the present disclosure provides a recombinant nucleic acid construct comprising (a) a 5'-ITR sequence; (b) a promoter sequence; (c) a partial or complete coding sequence for PCCA; and (d) a 3'-ITR sequence. In certain embodiments, the present disclosure provides a recombinant nucleic acid construct comprising (a) a 5'-ITR sequence; (b) a promoter sequence; (c) a partial or complete coding sequence for PCCB; and (d) a 3'-ITR sequence.

In some aspects, the present disclosure provides the use of an rAAV disclosed herein for the treatment of PA, wherein the rAAV includes an AAV capsid and a vector genome packaged therein. In some embodiments, the rAAV contains a packaged genome comprising as operably linked components in 5' to 3' order: a 5'-ITR, a promoter sequence, a partial or complete coding sequence for PCCA or an isoform thereof, or a functional fragment or functional variant thereof, and a 3'-ITR. In an exemplary embodiment, the packaged genome also comprises an enhancer sequence upstream of the promoter sequence, an intron downstream of the promoter, and a polyadenylation sequence upstream of the 3'-ITR. In one exemplary embodiment, the rAAV contains a packaged genome comprising as operably linked components in 5' to 3' order: an AAV2 5'-ITR sequence, a CMV enhancer, a CBA promoter, an SV40 Small T intron, a coding sequence for PCCA, a BGH polyadenylation signal sequence, and an AAV2 3'-ITR. In some embodiments, the packaged genome further comprises a consensus Kozak sequence located downstream of the intron sequence. In some embodiments, the coding sequence for PCCA is selected from SEQ ID NOs: 1-6. In some embodiments, the capsid is an AAV9 capsid.

In some aspects, the present disclosure provides the use of an rAAV disclosed herein for the treatment of PA, wherein the rAAV includes an AAV capsid and a vector genome packaged therein. In some embodiments, the packaged genome comprising as operably linked components in 5' to 3' order comprises: a 5'-ITR, a promoter sequence (e.g., PCCA gene-specific endogenous promoter sequence), a truncated or complete nucleotide sequence of human PCCA 5'-UTR, a partial or complete coding sequence for PCCA or an isoform thereof, or a functional fragment or functional variant thereof, a truncated or complete nucleotide sequence of human PCCA 3'-UTR, and a 3'-ITR. In an exemplary embodiment, the packaged genome also comprises an enhancer sequence upstream of the promoter sequence, an intron downstream of the promoter, and a PCCA gene-specific polyadenylation sequence upstream of the 3'-ITR. In some embodiments, the packaged genome further comprises a consensus Kozak sequence located downstream of the truncated or complete nucleotide sequence of human PCCA 5'-UTR and upstream of partial or complete coding sequence for PCCA or an isoform thereof, or a functional fragment or functional variant thereof. In some embodiments, the coding sequence for PCCA is selected from SEQ ID NOs: 1-6. In some embodiments, the capsid is an AAV9 capsid.

In some aspects, the present disclosure provides the use of an rAAV disclosed herein for the treatment of PA, wherein the rAAV includes an AAV capsid and a vector genome packaged therein. In some embodiments, the packaged genome comprising as operably linked components in 5' to 3' order comprises: a 5'-ITR, a promoter sequence, a partial or complete coding sequence for PCCB or an isoform thereof, or a functional fragment or functional variant thereof, and a 3'-ITR. In an exemplary embodiment, the packaged genome also comprises an enhancer sequence upstream of the promoter sequence, an intron downstream of the promoter, and a polyadenylation sequence upstream of the 3'-ITR. In one exemplary embodiment, the packaged genome comprising as operably linked components in 5' to 3' order comprises: an AAV2 5'-ITR sequence, a CMV enhancer, a CBA promoter, an SV40 Small T intron, a coding sequence for PCCB, a BGH polyadenylation signal sequence, and an AAV2 3'-ITR. In some embodiments, the packaged genome further comprises a consensus Kozak sequence located downstream of the intron sequence. In some embodiments, the coding sequence for PCCB is selected from SEQ ID NOs: 7-12. In some embodiments, the capsid is an AAV9 capsid.

In some aspects, the present disclosure provides the use of an rAAV disclosed herein for the treatment of PA, wherein the rAAV includes an AAV capsid and a vector genome packaged therein. In some embodiments, the packaged genome comprising as operably linked components in 5' to 3' order comprises: a 5'-ITR, a promoter sequence (e.g., PCCB gene-specific endogenous promoter sequence), a truncated or complete nucleotide sequence of human PCCB 5'-UTR, a partial or complete coding sequence for PCCB or an isoform thereof, or a functional fragment or functional variant thereof, a truncated or complete nucleotide sequence of human PCCB 3'-UTR, and a 3'-ITR. In an exemplary embodiment, the packaged genome also comprises an enhancer sequence upstream of the promoter sequence, an intron downstream of the promoter, and a PCCB gene-specific polyadenylation sequence upstream of the 3'-ITR. In some embodiments, the packaged genome further comprises a consensus Kozak sequence located downstream of the truncated or complete nucleotide sequence of human PCCB 5'-UTR and upstream of partial or complete coding sequence for PCCB or an isoform thereof, or a functional fragment or functional variant thereof. In some embodiments, the coding sequence for PCCB is selected from SEQ ID NOs: 7-12. In some embodiments, the capsid is an AAV9 capsid.

The present disclosure further relates to pharmaceutical compositions comprising an rAAV disclosed herein. In some embodiments, the pharmaceutical composition comprises a pharmaceutically acceptable carrier or excipient. In some embodiments, the pharmaceutical composition is formulated for subcutaneous, intramuscular, intradermal, intraperitoneal, or intravenous administration. In an exemplary embodiment, the pharmaceutical composition is formulated for intravenous administration.

In yet another aspect, the present disclosure provides methods of treating PA in a human subject comprising administering to the human subject a therapeutically effective amount of at least one rAAV disclosed herein. In one embodiment, the present disclosure provides a method of treating PA comprising administering an rAAV that includes an AAV capsid and a vector genome packaged therein, wherein the vector genome comprises a partial or complete coding sequence for PCCA or an isoform thereof, or a functional fragment or functional variant thereof. In another embodiment, the present disclosure provides a method of treating PA comprising administering an rAAV that includes an AAV capsid and a vector genome packaged therein, wherein the vector genome comprises a partial or complete coding sequence for PCCB or an isoform thereof, or a functional fragment or functional variant thereof.

In certain embodiments, the present disclosure provides a method of treating PA comprising administering (1) an rAAV that includes an AAV capsid and a vector genome packaged therein, wherein the vector genome comprises a partial or complete coding sequence for PCCA or an isoform thereof, or a functional fragment or functional variant thereof; and (2) an rAAV that includes an AAV capsid and a vector genome packaged therein, wherein the vector genome comprises a partial or complete coding sequence for PCCB or an isoform thereof, or a functional fragment or functional variant thereof. In some embodiments, the rAAV of (1) and (2) may administered simultaneously. In some embodiments, the rAAV of (1) and (2) may administered sequentially. In some embodiments, the rAAV of (1) and (2) may administered separately.

In certain embodiments, the present disclosure provides a method of treating PA comprising administering (1) an rAAV that includes an AAV capsid and a vector genome packaged therein in which the coding sequence is for PCCA and not for PCCB, the promoter is a PCCA gene-specific endogenous promoter and not a PCCB gene-specific endogenous promoter, and the polyadenylation signal sequence is a PCCA gene-specific endogenous polyadenylation signal sequence and not a PCCB gene-specific endogenous polyadenylation signal sequence; and/or; and (2) an rAAV that includes an AAV capsid and a vector genome in which the coding sequence is for PCCB and not for PCCA, the promoter is a PCCB gene-specific endogenous promoter and not a PCCA gene-specific endogenous promoter, and the polyadenylation signal sequence is a PCCB gene-specific endogenous polyadenylation signal sequence and not a PCCA gene-specific endogenous polyadenylation signal sequence; and/or. In some embodiments, the rAAV of (1) and (2) may administered simultaneously. In some embodiments, the rAAV of (1) and (2) may administered sequentially. In some embodiments, the rAAV of (1) and (2) may administered separately.

In certain embodiments, the present disclosure provides methods of treating PA in a human subject comprising administering to a human subject diagnosed with at least one mutation in PCCA a therapeutically effective amount of at least one rAAV disclosed herein. In one embodiment, the present disclosure provides a method of treating PA in a human subject diagnosed with at least one mutation in PCCA comprising administering an rAAV that includes an AAV capsid and a vector genome packaged therein, wherein the vector genome comprises a partial or complete coding sequence for PCCA or an isoform thereof, or a functional fragment or functional variant thereof. In certain embodiments, the present disclosure provides a method of treating PA in a human subject diagnosed with at least one mutation in PCCA comprising administering an rAAV that includes an AAV capsid and a vector genome packaged therein in which the coding sequence is for PCCA and not for PCCB, the promoter is a PCCA gene-specific endogenous promoter and not a PCCB gene-specific endogenous promoter, and the polyadenylation signal sequence is a PCCA gene-specific endogenous polyadenylation signal sequence and not a PCCB gene-specific endogenous polyadenylation signal sequence. In certain embodiments, the mutation in PCCA is selected from Table 1. In some embodiments, the coding sequence for PCCA is selected from SEQ ID NOs: 1-6. In some embodiments, the capsid is an AAV9 capsid.

In some aspects, the present disclosure provides methods of treating PA in a human subject comprising administering to a human subject diagnosed with at least one mutation in PCCB a therapeutically effective amount of at least one rAAV disclosed herein. In one embodiment, the present disclosure provides a method of treating PA in a human subject diagnosed with at least one mutation in PCCB comprising administering an rAAV that includes an AAV capsid and a vector genome packaged therein, wherein the vector genome comprises a partial or complete coding sequence for PCCB or an isoform thereof, or a functional fragment or functional variant thereof. In certain embodiments, the present disclosure provides a method of treating PA in a human subject diagnosed with at least one mutation in PCCB comprising administering an rAAV that includes an AAV capsid and a vector genome packaged therein in which the coding sequence is for PCCB and not for PCCA, the promoter is a PCCB gene-specific endogenous promoter and not a PCCA gene-specific endogenous promoter, and the polyadenylation signal sequence is a PCCB gene-specific endogenous polyadenylation signal sequence and not a PCCA gene-specific endogenous polyadenylation signal sequence. In certain embodiments, the mutation in PCCB is selected from Table 2. In some embodiments, the coding sequence for PCCB is selected from SEQ ID NOs: 7-12. In some embodiments, the capsid is an AAV9 capsid.

In some embodiments, the rAAV is administered subcutaneously, intramuscularly, intradermally, intraperitoneally, or intravenously. In an exemplary embodiment, the rAAV is administered intravenously. In some embodiments, the rAAV is administered at a dose of about $1\times10^{11}$ to about $1\times10^{14}$ genome copies (GC)/kg. In further embodiments, the rAAV is administered at a dose of about $1\times10^{12}$ to about $1\times10^{13}$ genome copies (GC)/kg. In some embodiments, a single dose of rAAV is administered. In other embodiments, multiple doses of rAAV are administered.

In some aspects, provided herein are host cells comprising a recombinant nucleic acid molecule, an AAV vector, or an rAAV disclosed herein. In specific embodiments, the host cells may be suitable for the propagation of AAV. In certain embodiments, the host cell is selected from a HeLa, Cos-7, HEK293, A549, BHK, Vero, RD, HT-1080, ARPE-19, or MRC-5 cell.

These and other aspects and features of the invention are described in the following sections of the present disclosure.

BRIEF DESCRIPTION OF THE DRAWINGS

The invention can be more completely understood with reference to the following drawings.

FIG. 16A is a bar graph showing plasma concentrations of C3 (propionylcarnitine) in a hypomorphic PCCA mouse model (A138T mutant) following treatment with rAAV encoding the complete native sequence of human PCCA (DTC346). FIG. 16B is bar graph of plasma C3/C2 concentration ratio (propionylcarnitine/acetylcarnitine) in a hypomorphic PCCA mouse model (A138T mutant) following treatment with rAAV encoding the complete native sequence of human PCCA (DTC346). FIG. 16C is a bar graph showing plasma concentrations of 2-methylcitrate (2MC) in a hypomorphic PCCA mouse model (A138T mutant) following treatment with rAAV encoding the complete native sequence of human PCCA (DTC346). Pre indicates 0 to 14 days before injection of rAAV, 2 W indicates 2 weeks after rAAV injection, 3 W indicates 3 weeks after rAAV injection, 4 W indicates 4 weeks after rAAV injection, and 6 W indicates 6 weeks after rAAV injection. Error bars represent standard deviations.  denotes $p<0.01$ in comparison to PBS-treated group and * denotes $p<0.001$ in comparison to PBS-treated group using Dunnett multiple comparison test.

DETAILED DESCRIPTION OF THE INVENTION

Figure 1:
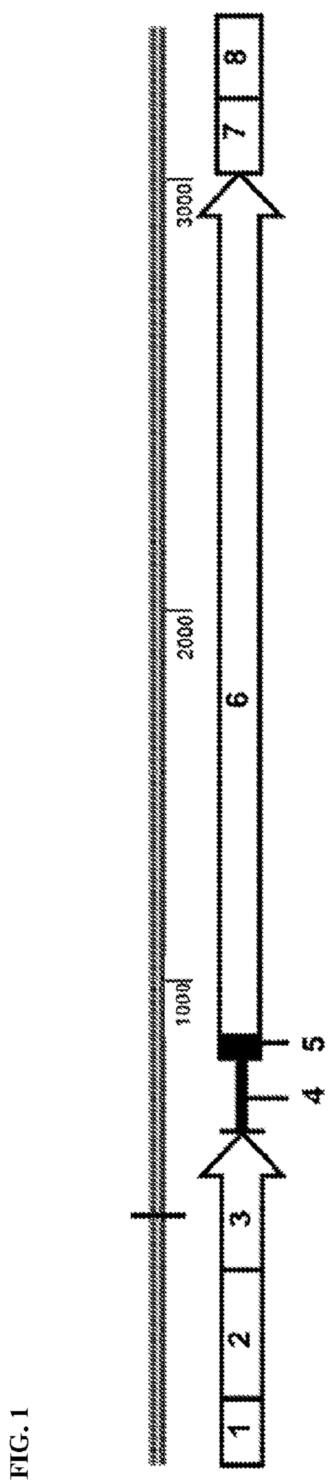
FIG. 1 is an illustrative diagram showing an exemplary packaged vector genome construct comprising PCCA, according to one embodiment. 5'-ITR, CMV enhancer, chicken β-actin promoter, SV40 small T intron, consensus Kozak sequence, PCCA coding sequence, SV40 polyadenylation signal, and 3'-ITR are represented by 1, 2, 3, 4, 5, 6, 7, and 8, respectively in the diagram.

This invention provides a range of novel agents and compositions to be used for therapeutic applications. The nucleic acid sequences, vectors, recombinant viruses, and associated compositions of this invention can be used for ameliorating, preventing, or treating PA as described herein.

Unless otherwise noted, technical terms are used according to conventional usage. Definitions of common terms in molecular biology may be found in Benjamin Lewin, *Genes V*, published by Oxford University Press, 1994 (ISBN 0-19-854287-9); Kendrew et al. (eds.), *The Encyclopedia of Molecular Biology*, published by Blackwell Science Ltd., 1994 (ISBN 0-632-02182-9); and Robert A. Meyers (ed.), *Molecular Biology and Biotechnology: a Comprehensive Desk Reference*, published by VCH Publishers, Inc., 1995 (ISBN 1-56081-569-8).

In order to facilitate review of the various embodiments of the disclosure, the following explanations of specific terms are provided:

Adeno-associated virus (AAV): A small, replication-defective, non-enveloped virus that infects humans and some other primate species. AAV is not known to cause disease and elicits a very mild immune response. Gene therapy vectors that utilize AAV can infect both dividing and quiescent cells and can persist in an extrachromosomal state without integrating into the genome of the host cell. These features make AAV an attractive viral vector for gene therapy. There are currently 12 recognized serotypes of AAV (AAV1-12).

Administration/Administer: To provide or give a subject an agent, such as a therapeutic agent (e.g., a recombinant AAV), by any effective route. Exemplary routes of administration include, but are not limited to, injection (such as subcutaneous, intramuscular, intradermal, intraperitoneal, and intravenous), oral, intraductal, sublingual, rectal, transdermal, intranasal, vaginal and inhalation routes.

Codon-optimized: A "codon-optimized" nucleic acid refers to a nucleic acid sequence that has been altered such that the codons are optimal for expression in a particular system (such as a particular species or group of species). For example, a nucleic acid sequence can be optimized for expression in mammalian cells or in a particular mammalian species (such as human cells). Codon optimization does not alter the amino acid sequence of the encoded protein.

Enhancer: A nucleic acid sequence that increases the rate of transcription by increasing the activity of a promoter.

Intron: A stretch of DNA within a gene that does not contain coding information for a protein. Introns are removed before translation of a messenger RNA.

Inverted terminal repeat (ITR): Symmetrical nucleic acid sequences in the genome of adeno-associated viruses required for efficient replication. ITR sequences are located at each end of the AAV DNA genome. The ITRs serve as the origins of replication for viral DNA synthesis and are essential cis components for generating AAV integrating vectors.

Isolated: An "isolated" biological component (such as a nucleic acid molecule, protein, virus or cell) has been substantially separated or purified away from other biological components in the cell or tissue of the organism, or the organism itself, in which the component naturally occurs, such as other chromosomal and extra-chromosomal DNA and RNA, proteins and cells. Nucleic acid molecules and proteins that have been "isolated" include those purified by standard purification methods. The term also embraces nucleic acid molecules and proteins prepared by recombinant expression in a host cell as well as chemically synthesized nucleic acid molecules and proteins.

Operably linked: A first nucleic acid sequence is operably linked with a second nucleic acid sequence when the first nucleic acid sequence is placed in a functional relationship with the second nucleic acid sequence. For instance, a promoter is operably linked to a coding sequence if the promoter affects the transcription or expression of the coding sequence. Generally, operably linked DNA sequences are contiguous and, where necessary to join two protein-coding regions, in the same reading frame.

Pharmaceutically acceptable carrier: The pharmaceutically acceptable carriers (vehicles) useful in this disclosure are conventional. Remington's Pharmaceutical Sciences, by E. W. Martin, Mack Publishing Co., Easton, Pa., 15th Edition (1975), describes compositions and formulations suitable for pharmaceutical delivery of one or more therapeutic compounds, molecules or agents.

In general, the nature of the carrier will depend on the particular mode of administration being employed. For instance, parenteral formulations usually comprise injectable fluids that include pharmaceutically and physiologically acceptable fluids such as water, physiological saline, balanced salt solutions, aqueous dextrose, glycerol or the like as a vehicle. For solid compositions for example, powder, pill, tablet, or capsule forms), conventional non-toxic solid carriers can include, for example, pharmaceutical grades of mannitol, lactose, starch, or magnesium stearate. In addition to biologically-neutral carriers, pharmaceutical compositions to be administered can contain minor amounts of non-toxic auxiliary substances, such as wetting or emulsifying agents, preservatives, and pH buffering agents and the like, for example sodium acetate or sorbitan monolaurate.

Preventing, treating or ameliorating a disease: "Preventing" a disease (such as PA) refers to inhibiting the full development of a disease. "Treating" refers to a therapeutic intervention that ameliorates a sign or symptom of a disease or pathological condition (such as PA) after it has begun to develop. "Ameliorating" refers to the reduction in the number or severity of signs or symptoms of a disease (such as PA).

Promoter: A region of DNA that directs/initiates transcription of a nucleic acid (e.g., a gene). A promoter includes necessary nucleic acid sequences near the start site of transcription. Many promoter sequences are known to the person skilled in the art and even a combination of different promoter sequences in artificial nucleic acid molecules is possible. As used herein, gene-specific endogenous promoter refers to native promoter element that regulates expression of the endogenous gene of interest. In an exemplary embodiment, a PCCA gene-specific endogenous promoter regulates expression of a PCCA gene. In another exemplary embodiment, a PCCB gene-specific endogenous promoter regulates expression of a PCCB gene.

Purified: The term "purified" does not require absolute purity; rather, it is intended as a relative term. Thus, for example, a purified peptide, protein, virus, or other active compound is one that is isolated in whole or in part from naturally associated proteins and other contaminants. In certain embodiments, the term "substantially purified" refers to a peptide, protein, virus or other active compound that has been isolated from a cell, cell culture medium, or other crude preparation and subjected to fractionation to remove various components of the initial preparation, such as proteins, cellular debris, and other components.

Recombinant: A recombinant nucleic acid molecule is one that has a sequence that is not naturally occurring or has a sequence that is made by an artificial combination of two otherwise separated segments of sequence. This artificial combination can be accomplished by chemical synthesis or by the artificial manipulation of isolated segments of nucleic acid molecules, such as by genetic engineering techniques.

Similarly, a recombinant virus is a virus comprising sequence (such as genomic sequence) that is non-naturally occurring or made by artificial combination of at least two sequences of different origin. The term "recombinant" also includes nucleic acids, proteins and viruses that have been altered solely by addition, substitution, or deletion of a portion of a natural nucleic acid molecule, protein or virus. As used herein, "recombinant AAV" refers to an AAV particle in which a recombinant nucleic acid molecule such as a recombinant nucleic acid molecule encoding PCCA and/or a recombinant nucleic acid molecule encoding PCCB has been packaged.

Sequence identity: The identity or similarity between two or more nucleic acid sequences, or two or more amino acid sequences, is expressed in terms of the identity or similarity between the sequences. Sequence identity can be measured in terms of percentage identity; the higher the percentage, the more identical the sequences are. Sequence similarity can be measured in terms of percentage similarity (which takes into account conservative amino acid substitutions); the higher the percentage, the more similar the sequences are. Homologs or orthologs of nucleic acid or amino acid sequences possess a relatively high degree of sequence identity/similarity when aligned using standard methods. This homology is more significant when the orthologous proteins or cDNAs are derived from species which are more closely related (such as human and mouse sequences), compared to species more distantly related (such as human and *C. elegans* sequences).

Methods of alignment of sequences for comparison are well known in the art. Various programs and alignment algorithms are described in: Smith & Waterman, *Adv. Appl. Math.* 2:482, 1981; Needleman & Wunsch, *J. Mol. Biol.* 48:443, 1970: Pearson & Lipman, *Proc. Natl. Acad. Sci. USA* 85:2444, 1988; Higgins & Sharp, *Gene,* 73:237-44, 1988; Higgins & Sharp, *CABIOS* 5: 151-3, 1989; Corpet et al., *Nuc. Acids Res.* 16:10881-90, 1988; Huang et al. *Computer Appls. in the Biosciences* 8, 155-65, 1992; and Pearson et al., *Meth. Mol. Rio.* 24:307-31, 1994. Altschul et al., *J. Mol. Biol.* 215:403-10, 1990, presents a detailed consideration of sequence alignment methods and homology calculations.

The NCBI Basic Local Alignment Search Tool (BLAST) (Altschul et al., *J. Mol. Biol.* 215:403-10, 1990) is available from several sources, including the National Center for Biological Information (NCBI) and on the internet, for use in connection with the sequence analysis programs blastp, blastn, blastx, tblastn and tblastx. Additional information can be found at the NCBI web site.

Serotype: A group of closely related microorganisms (such as viruses) distinguished by a characteristic set of antigens.

Stuffer sequence: Refers to a sequence of nucleotides contained within a larger nucleic acid molecule (such as a vector) that is typically used to create desired spacing between two nucleic acid features (such as between a promoter and a coding sequence), or to extend a nucleic acid molecule so that it is of a desired length. Stuffer sequences do not contain protein coding information and can be of unknown/synthetic origin and/or unrelated to other nucleic acid sequences within a larger nucleic acid molecule.

Subject: Living multi-cellular vertebrate organisms, a category that includes human and non-human mammals.

Synthetic: Produced by artificial means in a laboratory, for example a synthetic nucleic acid can be chemically synthesized in a laboratory.

Untranslated region (UTR): A typical mRNA contains a 5' untranslated region ("5' UTR") and a 3' untranslated region (3' UTR) upstream and downstream, respectively, of the coding region (see Mignone F. et. al., (2002) *Genome Biol* 3: REVIEWS0004).

Therapeutically effective amount: A quantity of a specified pharmaceutical or therapeutic agent (e.g., a recombinant AAV) sufficient to achieve a desired effect in a subject, or in a cell, being treated with the agent. The effective amount of the agent will be dependent on several factors, including, but not limited to the subject or cells being treated, and the manner of administration of the therapeutic composition.

Vector: A vector is a nucleic acid molecule allowing insertion of foreign nucleic acid without disrupting the ability of the vector to replicate and/or integrate in a host cell. A vector can include nucleic acid sequences that permit it to replicate in a host cell, such as an origin of replication. A vector can also include one or more selectable marker genes and other genetic elements. An expression vector is a vector that contains the necessary regulatory sequences to allow transcription and translation of inserted gene or genes. In some embodiments herein, the vector is an AAV vector.

Unless otherwise explained, all technical and scientific terms used herein have the same meaning as commonly understood by one of ordinary skill in the art to which this disclosure belongs. The singular terms "a," "an," and "the" include plural referents unless context clearly indicates otherwise. "Comprising A or B" means including A, or B, or A and B. It is further to be understood that all base sizes or amino acid sizes, and all molecular weight or molecular mass values, given for nucleic acids or polypeptides are approximate, and are provided for description. Although methods and materials similar or equivalent to those described herein can be used in the practice or testing of the present disclosure, suitable methods and materials are described below. All publications, patent applications, patents, and other references mentioned herein are incorporated by reference in their entirety. In case of conflict, the present specification, including explanations of terms, will control.

In addition, the materials, methods, and examples are illustrative only and not intended to be limiting.

Viral Vectors:

In some aspects, the present disclosure provides adeno-associated virus (AAV) vector that contains a packaged genome that comprises an AAV 5'-ITR, a promoter sequence, a partial or complete coding sequence for PCCA or an isoform thereof, or a functional fragment or functional variant thereof, and an AAV 3'-ITR.

In certain embodiments, the present disclosure provides an AAV vector that contains a packaged genome that comprises an AAV 5'-ITR, a promoter sequence, a truncated or complete nucleotide sequence of human PCCA 5'-UTR, a partial or complete coding sequence for PCCA or an isoform thereof, or a functional fragment or functional variant thereof, a truncated or complete human PCCA 3'-UTR nucleotide sequence, and an AAV 3'-ITR.

In some aspects, the present disclosure provides AAV vector that contains a packaged genome that comprises an AAV 5'-ITR, a promoter sequence, a partial or complete coding sequence for PCCB or an isoform thereof, or a functional fragment or functional variant thereof, and an AAV 3'-ITR.

In certain embodiments, the present disclosure provides an AAV vector that contains a packaged genome that comprises an AAV 5'-ITR, a promoter sequence, a truncated or complete nucleotide sequence of human PCCB 5'-UTR, a partial or complete coding sequence for PCCB or an isoform thereof, or a functional fragment or functional variant thereof, a truncated or complete human PCCB 3'-UTR nucleotide sequence, and an AAV 3'-ITR.

In some embodiments, the packaged genome may further comprise an enhancer, an intron, a consensus Kozak sequence, and/or a polyadenylation signal as described herein. In some embodiments, the recombinant vector can further include one or more stuffer nucleic acid sequences. In one embodiment, a stuffer nucleic acid sequence is situated between the intron and the partial or complete coding sequence for PCCA or PCCB.

In various embodiments described herein, the recombinant virus vector is an AAV vector. The AAV vector can be an AAV vector of serotype 1, 2, 3, 4, 5, 6, 7, 8, 9, 10, 11 or 12 (i.e., AAV1, AAV2, AAV3, AAV4, AAV5, AAV6, AAV7, AAV8, AAV9, AAV10, AAV11 or AAV12), as well as any one of the more than 100 variants isolated from human and nonhuman primate tissues. See, e.g., Choi et al., 2005, *Curr Gene Ther.* 5:299-310, 2005 and Gao et al., 2005, *Curr Gene Ther.* 5:285-297. AAV vectors of any serotype may be used in the present invention, and the selection of AAV serotype will depend in part on the cell type(s) that are targeted for gene therapy. For treatment of PA, the liver is one of the relevant target organs. In some embodiments, the AAV vector is selected from serotype 9 (AAV9), serotype 8 (AAV8), or variant thereof. In an exemplary embodiment, the AAV vector is serotype 9 (AAV9) or a variant thereof.

In some embodiments, the recombinant AAV vector includes an AAV ITR sequence, which functions as both the origin of vector DNA replication and the packaging signal of the vector genome, when AAV and adenovirus helper functions are provided in trans. Additionally, the ITRs serve as the target for single-stranded endonucleatic nicking by the large Rep proteins, resolving individual genomes from replication intermediates.

In some embodiments, the 5'-ITR sequence is from AAV2. In some embodiments, the 3'-ITR sequence is from AAV2. In some embodiments, the 5'-ITR sequence and the 3'-ITR sequence are from AAV2. In some embodiments, the 5'-ITR sequence and/or the 3'-ITR sequence are from AAV2 and comprise or consist of SEQ ID NO: 15. In other embodiments, the 5'-ITR sequence and/or the 3'-ITR sequence are from a non-AAV2 source.

In some exemplary embodiments, the AAV vector is an AAV serotype 9 (AAV9) vector, and the vector includes an enhancer, a promoter, an intron, a coding sequence for PCCA or PCCB, and a polyadenylation signal described herein. In some embodiments, the AAV9 vector further includes two AAV2, AAV8, or AAV9 inverted terminal repeat (ITR) sequences: one 5' of the enhancer and one 3' of the polyadenylation signal. In an exemplary embodiment, the AAV9 vector includes two AAV2 inverted terminal repeat (ITR) sequences: one 5' of the enhancer and one 3' of the polyadenylation signal. In some embodiments, the AAV2 ITR sequences comprise or consist of SEQ ID NO: 15. In another exemplary embodiment, the AAV9 vector includes two AAV9 inverted terminal repeat (ITR) sequences: one 5' of the enhancer and one 3' of the polyadenylation signal.

Promoter:

In various aspects described herein, viral vectors are provided, which contain a packaged genome which comprises a promoter sequence which helps drive and regulate transgene expression, e.g., expression of PCCA or PCCB. In certain embodiments, the promoter is selected from a chicken β-actin (CBA) promoter, a cytomegalovirus (CMV) immediate early gene promoter, a transthyretin (TTR) promoter, a thyroxine binding globulin (TBG) promoter, an alpha-1 anti-trypsin (A1AT) promoter, a CAG promoter, a PCCA gene-specific endogenous promoter, and a PCCB gene-specific endogenous promoter. In exemplary embodiments, the promoter sequence is located between the selected 5'-ITR sequence and the partial or complete coding sequence for PCCA or PCCB. In some embodiments, the promoter sequence is located downstream of an enhancer sequence. In some embodiments, the promoter sequence is located upstream of an intron sequence. In some embodiments, the promoter sequence is located between the selected 5'-ITR sequence and the truncated or complete nucleotide sequence of human PCCA or human PCCB 5'-untranslated region (UTR).

In some illustrative embodiments, a ubiquitous chicken β-actin promoter (CBA), which may optionally be located downstream of a CMV immediate early enhancer (CMV IE), is used. In some certain embodiments, a packaged genome described herein comprises the native PCCA or PCCB promoter element. In some illustrative embodiments, a packaged genome described herein comprises a PCCA gene-specific endogenous promoter comprising a nucleotide sequence of at least 15 continuous nucleotides, which is at least 95% identical to an equal length region of SEQ ID NO: 34 when the partial or complete coding sequence in the packaged genome is for PCCA. In certain embodiments, a packaged genome described herein comprises a PCCA gene-specific endogenous promoter comprising a nucleotide sequence of about 15 continuous nucleotides (for example about 30, about 45, about 60, about 70, about 80, about 90, about 100, about 110, about 120, about 130, about 140, about 150, about 160, about 170, about 180, about 190, about 200, about 210, about 220, about 230, about 240, about 250, about 260, about 270, about 280, about 290, about 300, about 325, about 350, about 375, about 400, about 425, about 450, about 475, about 500, about 525, about 550, about 575, about 600, about 625, about 650, about 675, about 700, about 725, or about 750), which is at least 95% identical to an equal length region of SEQ ID NO: 34. In some illustrative embodiments, a a packaged genome described herein comprises a PCCA gene-specific endogenous promoter comprising a nucleotide sequence of at least 15 continuous nucleotides, which is 100% identical to an equal length region of SEQ ID NO: 34 when the partial or complete coding sequence in the vector genome is for PCCA.

In some illustrative embodiments a packaged genome described herein comprises a PCCB gene-specific endogenous promoter comprising a nucleotide sequence of at least 15 continuous nucleotides, which is at least 95% identical to an equal length region of SEQ ID NO: 36 when the partial or complete coding sequence in the vector genome is for PCCB. In certain embodiments, a packaged genome described herein comprises a PCCB gene-specific endogenous promoter comprising a nucleotide sequence of about 15 continuous nucleotides (for example about 30, about 45, about 60, about 70, about 80, about 90, about 100, about 110, about 120, about 130, about 140, about 150, about 160, about 170, about 180, about 190, about 200, about 210, about 220, about 230, about 240, about 250, about 260, about 270, about 280, about 290, about 300, about 325, about 350, about 375, about 400, about 425, or about 450), which is at least 95% identical to an equal length region of SEQ ID NO: 36. In some illustrative embodiments a packaged genome described herein comprises a PCCB gene-specific endogenous promoter comprising a nucleotide sequence of at least 15 continuous nucleotides, which is 100% identical to an equal length region of SEQ ID NO: 36 when the partial or complete coding sequence in the vector genome is for PCCB.

In some embodiments, the promoter is selected from a chicken β-actin (CBA) promoter, a cytomegalovirus (CMV) immediate early gene promoter, a transthyretin (TTR) promoter, a thyroxine binding globulin (TBG) promoter, an alpha-1 anti-trypsin (A1AT) promoter, and a CAG promoter. In an exemplary embodiment, the promoter is the CBA promoter. In one embodiment, the CBA promoter comprises or consists of SEQ ID NO: 18.

In addition to a promoter, a packaged genome may contain other appropriate transcription initiation, termination, enhancer sequence, and efficient RNA processing signals. As described in further detail below, such sequences include splicing and polyadenylation (poly A) signals, regulatory elements that enhance expression (i.e., WPRE), sequences that stabilize cytoplasmic mRNA, sequences that enhance translation efficiency (i.e., the Kozak consensus sequence), and sequences that enhance protein stability.

In some embodiments, the packaged genome further comprises a consensus Kozak sequence. In some embodiments, the consensus Kozak sequence is located downstream of an intron sequence. In one embodiment, the consensus Kozak sequence is GCCGCC (SEQ ID NO: 24). As will be understood by those skilled in the art, the consensus Kozak sequence is typically located immediately upstream of a coding sequence; in this case, immediately upstream of a partial or complete coding sequence for PCCA or PCCB. As will be appreciated by the skilled artisan, the consensus Kozak sequence can be considered to share an ATG residue corresponding to the start codon of the therapeutic polypeptide, e.g., PCCA or PCCB. For the simplicity of disclosure, the consensus Kozak sequence, as described herein, comprises a six-nucleotide sequence corresponding to the region not shared with the therapeutic polypeptide, e.g., PCCA or PCCB.

Untranslated Region (UTR):

5'-untranslated region (UTR) from endogenous gene-specific mRNA have been known to play an important role in optimizing transgene production by competing with cellular transcripts for translation initiation factors and ribosomes, increasing mRNA half-life by minimizing mRNA decay or post-transcriptional gene silencing, and avoiding deleterious interactions with regulatory proteins or inhibitory RNA secondary structures (see Chiba, Y., and Green, P. (2009). *J. Plant Biol.* 52, 114-124, Moore, M. J., and Proudfoot, N. J. (2009). *Cell* 136, 688-700, Jackson, R. J., et. al. (2010). *Nat. Rev. Mol. Cell Biol.* 11, 113-127). The 3'-untranslated region (3'-UTR), situated downstream of the protein coding sequence, has been found to be involved in numerous regulatory processes including transcript cleavage, stability and polyadenylation, translation and mRNA localisation. They are thus critical in determining the fate of an mRNA (see Barrett, L. W., et. al. (2012). *Cell Mol Life Sci*. November; 69 (21): 3613-3634). In certain embodiments, the present disclosure provides an rAAV that contains a packaged genome that comprises a truncated or complete nucleotide sequence of human PCCA or PCCB 5'-UTR. In certain embodiments, the present disclosure provides an rAAV that contains a packaged genome that comprises a truncated or complete nucleotide sequence of human PCCA or PCCB 3'-UTR.

In certain embodiments, the present disclosure provides an rAAV that contains a packaged genome that comprises an AAV 5'-ITR, a promoter sequence, a truncated or complete nucleotide sequence of human PCCA 5'-UTR, a partial or complete coding sequence for PCCA or an isoform thereof, or a functional fragment or functional variant thereof, a truncated or complete human PCCA 3'-UTR nucleotide sequence, and an AAV 3'-inverted terminal repeat sequence (ITR).

In certain embodiments, the present disclosure provides an rAAV that contains a packaged genome that comprises an AAV 5'-ITR, a promoter sequence, a truncated or complete nucleotide sequence of human PCCB 5'-UTR, a partial or complete coding sequence for PCCB or an isoform thereof, or a functional fragment or functional variant thereof, a truncated or complete human PCCB 3'-UTR nucleotide sequence, and an AAV 3'-ITR.

In certain embodiments, the packaged genome comprises the complete human PCCA 5'-UTR represented by SEQ ID NO: 30. In certain embodiments, the packaged genome comprises complete human PCCB 5'-UTR represented by SEQ ID NO: 32.

In certain embodiments, the packaged genome comprises a truncated native human PCCA 5'-UTR. In certain embodiments, the truncated human PCCA 5'-UTR comprises a nucleotide sequence of about 50 continuous nucleotides to about 1400 continuous nucleotides (e.g., about 75, about 100, about 125, about 150, about 175, about 200, about 250, about 275, about 300, about 325, about 350, about 400, about 425, about 450, about 475, about 500, about 525, about 550, about 575, about 600, about 625, about 650, about 675, about 700, about 725, about 750, about 775, about 800, about 825, about 850, about 900, about 925, about 950, about 975, about 1000, about 1025, about 1050, about 1075, about 1100, about 1125, about 1150, about 1175, about 1200, about 1225, about 1250, about 1275, about 1300, about 1325, or about 1350), which is at least 95% identical to an equal length region of SEQ ID NO: 30.

In certain embodiments, the packaged genome comprises a truncated native human PCCB 5'-UTR. In certain embodiments, the truncated human PCCB 5'-UTR comprises a nucleotide sequence of about 50 continuous nucleotides to about 1400 continuous nucleotides (e.g., about 75, about 100, about 125, about 150, about 175, about 200, about 250, about 275, about 300, about 325, about 350, about 400, about 425, about 450, about 475, about 500, about 525, about 550, about 575, about 600, about 625, about 650, about 675, about 700, about 725, about 750, about 775, about 800, about 825, about 850, about 900, about 925, about 950, about 975, about 1000, about 1025, about 1050, about 1075, about 1100, about 1125, about 1150, about 1175, about 1200, about 1225, about 1250, about 1275, about 1300, about 1325, or about 1350), which is at least 95% identical to an equal length region of SEQ ID NO: 32.

In certain embodiments, the packaged genome comprises complete human PCCA 3'-UTR represented by SEQ ID NO: 31. In certain embodiments, the packaged genome comprises complete human PCCB 3'-UTR represented by SEQ ID NO: 33.

In certain embodiments, the packaged genome comprises a truncated native human PCCA 3'-UTR. In certain embodiments, the truncated human PCCA 3'-UTR comprises a nucleotide sequence of about 15 continuous nucleotides (e.g., about 30, about 45, about 60, about 70, about 80, about 90, about 100, about 110, about 120, about 130, about 140, about 150, about 160, about 170, about 180, about 190, about 200, about 210, about 220, about 230, about 240, about 250, about 260, about 270), which is at least 95% identical to an equal length region of SEQ ID NO: 31.

In certain embodiments, the packaged genome comprises a truncated native human PCCB 3'-UTR. In certain embodiments, the truncated human PCCB 3'-UTR comprises a nucleotide sequence of about 15 continuous nucleotides (e.g., about 30, about 45, about 60, about 70, about 80, about 90, about 100, about 110, about 120, about 130, about 140, or about 150), which is at least 95% identical to an equal length region of SEQ ID NO: 33.

PCCA or PCCB Polypeptides:

As described herein, aspects of the invention provide recombinant vectors that include a packaged genome that comprises an AAV 5'-ITR, a promoter sequence, a partial or complete coding sequence for PCCA or an isoform thereof, or a functional fragment or functional variant thereof, and an AAV 3'-ITR. Further described herein are recombinant vectors that include a packaged genome that comprises an AAV 5'-ITR, a promoter sequence, a partial or complete coding sequence for PCCB or an isoform thereof, or a functional fragment or functional variant thereof, and an AAV 3'-ITR.

In one embodiment, the partial or complete coding sequence for PCCA or PCCB is a wild-type coding sequence. As used herein, the term “wild-type” refers to a biopolymer (e.g., a polypeptide sequence or polynucleotide sequence) that is the same as the biopolymer (e.g., polypeptide sequence or polynucleotide sequence) that exists in nature.

In an alternative embodiment, the partial or complete coding sequence for PCCA or PCCB is a codon-optimized coding sequence. In one embodiment, the partial or complete coding sequence for PCCA or PCCB is codon-optimized for expression in humans.

In various embodiments described herein, vectors are provided that contain a packaged genome that comprise a coding sequence for PCCA or PCCB. The polypeptides delivered with the vectors described herein encompass PCCA and PCCB polypeptides that may be useful in the treatment of mammals, including humans.

In some embodiments, the polypeptide expressed with a vector described herein is PCCA (SEQ ID NO: 16; GenBank Accession No. NP_000273.2; 728 amino acids) or a functional fragment, functional variant, or functional isoform thereof. In some embodiments, the polypeptide expressed with a vector described herein is PCCA and comprises or consists of SEQ ID NO: 16.

In one embodiment, the PCCA polypeptide is encoded by the wild-type coding sequence shown in SEQ ID NO: 1. In another embodiment, a coding sequence expressing a natural isoform or variant of PCCA may be used, such as those shown in UniProtKB/Swiss-Prot Accession Nos. P05165-1 (SEQ ID NO: 25), P05165-2 (SEQ ID NO: 26), and P05165-3 (SEQ ID NO: 27). In alternative embodiments, the PCCA polypeptide is encoded by a codon-optimized coding sequence. In some embodiments, the PCCA polypeptide is encoded by a codon-optimized coding sequence that is less than 80% identical to the wild-type coding sequence shown in SEQ ID NO: 1. In some exemplary embodiments, the PCCA polypeptide is encoded by a codon-optimized coding sequence selected from SEQ ID NOs: 2-6. In some embodiments, the coding sequence for PCCA may further comprise a stop codon (TGA, TAA, or TAG) at the 3' end.

In some embodiments, the polypeptide expressed with a vector described herein is PCCB (SEQ ID NO: 17; GenBank Accession No. NP_000523.2; 539 amino acids) or a functional fragment, functional variant, or functional isoform thereof. In some embodiments, the polypeptide expressed with a vector described herein is PCCB and comprises or consists of SEQ ID NO: 17.

In one embodiment, the PCCB polypeptide is encoded by the wild-type coding sequence shown in SEQ ID NO: 7. In another embodiment, a coding sequence expressing a natural isoform or variant of PCCB may be used, such as those shown in UniProtKB/Swiss-Prot Accession Nos. P05166-1 (SEQ ID NO: 28) and P05166-2 (SEQ ID NO: 29). In alternative embodiments, the PCCB polypeptide is encoded by a codon-optimized coding sequence. In some embodiments, the PCCB polypeptide is encoded by a codon-optimized coding sequence that is less than 80% identical to the wild-type coding sequence shown in SEQ ID NO: 7. In some exemplary embodiments, the PCCB polypeptide is encoded by a codon-optimized coding sequence selected from SEQ ID NOs: 8-12. In some embodiments, the coding sequence for PCCB may further comprise a stop codon (TGA, TAA, or TAG) at the 3' end.

In various aspects, the invention may be used to deliver fragments, variants, isoforms, or fusions of the PCCA or PCCB polypeptides described herein.

In some embodiments, the invention may be used to deliver fragments of the PCCA or PCCB polypeptides, which comprise at least 50, 100, 150, 200, 250, 300, 350, 400, 450, 500, 550, or 600 amino acid residues and retain one or more activities associated with the full-length polypeptide (e.g., catalytic activity in the case of an enzyme). Such fragments may be obtained by recombinant techniques that are routine and well-known in the art. Moreover, such fragments may be tested for catalytic activity by routine in vitro assays known to the skilled artisan. For instance, propionyl-CoA carboxylase (PCC) activity can be assayed by (1) diluting the polypeptide in 10 mM phosphate buffer (pH 7.0) containing 1 mM 2-mercaptoethanol and 0.1 mg/ml of bovine serum albumin, (2) taking the standard reaction mixture containing 50 mM Tris-HCl pH 8.0, 5 mM glutathione, 2 mM ATP, 100 mM KCl, 10 mM $MgCl_2$, 10 mM [$^{14}$C]-bicarbonate (specific activity 12.4 mCi/mmol), 3 mM propionyl-CoA, and incubating enzyme at 37 degrees C. for 15 min, (3) stopping the reaction by addition of 10% trichloroacetic acid, (4) centrifuging at 200×g, (5) drying an aliquot under a heat lamp, (6) dissolving in water, and (7) counting in Aquasol, wherein one unit of enzyme activity is defined as that amount of enzyme catalyzing the fixation of 1 pmol of bicarbonate/min at 37 degrees C. See Kalousek et al., 1980, *J Biol Chem* 255 (1): 60-65 and Hsia et al., 1973 *J. Pediatr.* 83:625-628 for a description of PCC activity assays. The invention further includes nucleic acid molecules which encode the above-described polypeptide fragments.

In some embodiments, the invention may be used to deliver variants of the PCCA or PCCB polypeptides. In some embodiments, the variant polypeptides may be at least 80% (e.g., 80%, 81%, 82%, 83%, 84%, 85%, 86%, 87%, 88%, 89%, 90%, 91%, 92%, 93%, 94%, 95%, 96%, 97%, 98%, 99%, 99.5%, 99.6%, 99.7%, 99.8%, 99.9%, or 100%) identical to the wild-type therapeutic polypeptide, e.g., a wild-type PCCA polypeptide of SEQ ID NO: 16 or a wild-type PCCB polypeptide of SEQ ID NO: 17. In some embodiments, the variant therapeutic polypeptides may have at least 1, 2, 3, 4, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, or 40 different residues as compared to the respective wild-type polypeptide. Such variants may be obtained by recombinant techniques that are routine and well-known in the art. Moreover, such variants may be tested for catalytic activity by routine in vitro assays known to the skilled artisan. See, e.g., Kalousek et al., 1980, *J Biol Chem* 255 (1): 60-65 and Hsia et al., 1973 *J. Pediatr.* 83:625-628 for a description of propionyl-CoA carboxylase activity assays. The invention further includes nucleic acid molecules which encode the above described therapeutic polypeptide variants.

Novel Codon-Optimized Sequences:

In some aspects, the present disclosure provides novel codon-optimized nucleic acid sequences encoding PCCA. In one embodiment, the codon-optimized nucleic acid sequence encoding PCCA is less than 80% identical to the wild-type coding sequence shown in SEQ ID NO: 1. In some embodiments, the codon-optimized nucleic acid sequence encoding PCCA is at least 80% (e.g., 80%, 81%, 82%, 83%, 84%, 85%, 86%, 87%, 88%, 89%, 90%, 91%, 92%, 93%, 94%, 95%, 96%, 97%, 98%, 99%, 99.5%, 99.6%, 99.7%, 99.8%, 99.9%, or 100%) identical to SEQ ID NOs: 2-6. In some embodiments, the codon-optimized nucleic acid sequence encoding PCCA is 100% identical to a sequence selected from SEQ ID NOs: 2-6. In some embodiments, the present disclosure provides nucleic acid sequences which are less than 80% identical to the wild-type coding sequence shown in SEQ ID NO: 1 and are at least 80%, 85%, 90%, 91%, 92%, 93%, 94%, 95%, 96%, 97%, 98%, 99% or more identical to SEQ ID NOs: 2-6. In exemplary embodiments, the present disclosure provides a nucleic acid sequence encoding PCCA selected from SEQ ID NOs: 2-6. Further provided are fragments of the nucleic acid sequences shown in SEQ ID NOs: 2-6 which encode a polypeptide having functional PCCA activity. In some embodiments, the nucleic acid sequence encoding PCCA may further comprise a stop codon (TGA, TAA, or TAG) at the 3' end.

In some aspects, the present disclosure provides novel codon-optimized nucleic acid sequences encoding PCCB. In one embodiment, the codon-optimized nucleic acid sequence encoding PCCB is less than 80% identical to the wild-type coding sequence shown in SEQ ID NO: 7. In some embodiments, the codon-optimized nucleic acid sequence encoding PCCB is at least 80% (e.g., 80%, 81%, 82%, 83%, 84%, 85%, 86%, 87%, 88%, 89%, 90%, 91%, 92%, 93%, 94%, 95%, 96%, 97%, 98%, 99%, 99.5%, 99.6%, 99.7%, 99.8%, 99.9%, or 100%) identical to SEQ ID NOs: 8-12. In some embodiments, the codon-optimized nucleic acid sequence encoding PCCB is 100% identical to a sequence selected from SEQ ID NOs: 8-12. In some embodiments, the present disclosure provides nucleic acid sequences which are less than 80% identical to the wild-type coding sequence shown in SEQ ID NO: 7 and are at least 80%, 85%, 90%, 91%, 92%, 93%, 94%, 95%, 96%, 97%, 98%, 99% or more identical to SEQ ID NOs: 8-12. In exemplary embodiments, the present disclosure provides a nucleic acid sequence encoding PCCB selected from SEQ ID NOs: 8-12. Further provided are fragments of the nucleic acid sequences shown in SEQ ID NOs: 8-12 which encode a polypeptide having functional PCCB activity. In some embodiments, the nucleic acid sequence encoding PCCB may further comprise a stop codon (TGA, TAA, or TAG) at the 3' end.

Vector Genome Elements:

In some embodiments, the rAAV contains a packaged vector genome that further comprises one or more enhancer sequences. In one embodiment, the enhancer is selected from a cytomegalovirus immediate early gene (CMV) enhancer, a transthyretin enhancer (enTTR), a chicken β-actin (CBA) enhancer, an En34 enhancer, and an ApoE enhancer. In an exemplary embodiment, the enhancer is the CMV enhancer. In one embodiment, the CMV enhancer comprises or consists of SEQ ID NO: 19.

In some embodiments, the rAAV contains a packaged vector genome that further comprises one or more intron sequences. In one embodiment, the intron is selected from an SV40 Small T intron, a rabbit hemoglobin subunit beta (rHBB) intron, a human beta globin IVS2 intron, a Promega chimeric intron, or an hFIX intron. In one exemplary embodiment, the intron is the SV40 Small T intron. In one embodiment, the SV40 Small T intron sequence comprises or consists of SEQ ID NO: 20. In another exemplary embodiment, the intron is the rHBB intron. In one embodiment, the rHBB intron sequence comprises or consists of SEQ ID NO: 21.

In some embodiments, the rAAV contains a packaged vector genome that further comprises a polyadenylation signal sequence. In one embodiment, the polyadenylation signal sequence is selected from a bovine growth hormone (BGH) polyadenylation signal sequence, an SV40 polyadenylation signal sequence, a rabbit beta globin polyadenylation signal sequence, a PCCA gene-specific endogenous polyadenylation signal sequence, a PCCB gene-specific endogenous polyadenylation signal sequence. In an exemplary embodiment, the polyadenylation signal sequence is the bovine growth hormone (BGH) polyadenylation signal sequence. In one embodiment, the BGH polyadenylation signal sequence comprises or consists of SEQ ID NO: 22. In another exemplary embodiment, the polyadenylation signal sequence is the SV40 polyadenylation signal sequence. In one embodiment, the SV40 polyadenylation signal sequence comprises or consists of SEQ ID NO: 23. In one embodiment, the polyadenylation signal sequence is a gene-specific endogeneous polyadenylation sequence. In an exemplary embodiment, the polyadenylation signal sequence is a PCCA gene-specific endogenous polyadenylation signal sequence when the partial or complete coding sequence in the vector genome is for PCCA. In certain embodiments, the PCCA gene-specific endogenous polyadenylation signal sequence comprises a nucleotide sequence of at least 15 continuous nucleotides, which is at least 95% identical to an equal length region of SEQ ID NO: 35. In certain embodiments, the PCCA gene-specific endogenous polyadenylation signal sequence comprises a nucleotide sequence of about 15 continuous nucleotides (e.g., about 20, about 30, about 40, about 50, about 60, about 70, about 80, about 90, about 100, about 110, about 120, about 130, about 140, about 150, or about 160), which is at least 95% identical to an equal length region of SEQ ID NO: 35. In another exemplary embodiment, the polyadenylation signal sequence is a PCCB gene-specific endogenous polyadenylation signal sequence when the partial or complete coding sequence in the vector genome is for PCCB. In certain embodiments, the PCCB gene-specific endogenous polyadenylation signal sequence comprises a nucleotide sequence of at least 15 continuous nucleotides, which is at least 95% identical to an equal length region of SEQ ID NO: 37. In certain embodiments, the PCCA gene-specific endogenous polyadenylation signal sequence comprises a nucleotide sequence of about 15 continuous nucleotides (e.g., about 20, about 30, about 40, about 50, about 60, about 70, about 80, about 90, or about 100), which is at least 95% identical to an equal length region of SEQ ID NO: 37.

AAV Capsids:

In another aspect, the present disclosure provides rAAV useful as agents for gene therapy in the treatment of PA, wherein said rAAV comprises an AAV capsid, and a vector genome as described herein packaged therein. In some embodiments, the AAV capsid is from an AAV of serotype 1, 2, 3, 4, 5, 6, 7, 8, 9, 10, 11, 12, rh10, or hu37 (i.e., AAV1, AAV2, AAV3, AAV4, AAV5, AAV6, AAV7, AAV9, AAV10, AAV11, AAV12, AAVrh10, or AAVhu37). In an exemplary embodiment, the AAV vector is an AAV serotype 9 (AAV9) vector, an AAV9 variant vector, an AAV serotype 8 (AAV8) vector, or an AAV serotype 2 (AAV2) vector.

The AAV9 capsid is a self-assembled AAV capsid composed of multiple AAV9 vp proteins. The AAV9 vp proteins are typically expressed as alternative splice variants encoded by a nucleic acid sequence of SEQ ID NO: 13 or a sequence that is at least 70%, at least 75%, at least 80%, at least 85%, at least 90%, at least 95%, at least 97%, at least 99% thereto, which encodes the vp1 amino acid sequence of SEQ ID NO: 14 (GenBank Accession: AAS99264). These splice variants result in proteins of different length of SEQ ID NO: 14. In certain embodiments, an AAV9 capsid includes an AAV having an amino acid sequence which is 99% identical to AAS99264 or 99% identical to SEQ ID NO: 14. See also U.S. Pat. No. 7,906,111, and WO/2005/033321. As used herein, an AAV9 variant includes those described in, e.g., WO/2016/049230, U.S. Pat. No. 8,927,514, US Patent Publication No. 2015/0344911, and U.S. Pat. No. 8,734,809.

As indicated herein, the AAV9 sequences and proteins are useful in the production of rAAV. However, in other embodiments, another AAV capsid is selected. Tissue specificity is determined by the capsid type. AAV serotypes which transduce a suitable target (e.g., liver, muscle, lung, or CNS) may be selected as sources for capsids of AAV viral vectors including, e.g., AAV1, AAV2, AAV3, AAV4, AAV5, AAV6, AAV6.2, AAV7, AAV8, AAV9, AAVrh10, AAVrh64R1, AAVrh64R2, AAVrh8. See, e.g., US Patent Publication No. 2007/0036760; US Patent Publication No. 2009/0197338; and EP1310571. See also WO 2003/042397 (AAV7 and other simian AAV), U.S. Pat. Nos. 7,282,199 and 7,790,449 (AAV8). In addition, AAV yet to be discovered, or a recombinant AAV based thereon, may be used as a source for the AAV capsid. These documents also describe other AAV which may be selected for generating AAV and are incorporated by reference. In some embodiments, an AAV capsid for use in the viral vector can be generated by mutagenesis (i.e., by insertions, deletions, or substitutions) of one of the aforementioned AAV capsids or its encoding nucleic acid. In some embodiments, the AAV capsid is chimeric, comprising domains from two or three or four or more of the aforementioned AAV capsid proteins. In some embodiments, the AAV capsid is a mosaic of Vp1, Vp2, and Vp3 monomers from two or three different AAVs or recombinant AAVs. In some embodiments, an rAAV composition comprises more than one of the aforementioned capsids.

Host Cells Comprising a Recombinant Nucleic Acid Molecule:

In some aspects, provided herein are host cells comprising a recombinant nucleic acid molecule, viral vector, e.g., an AAV vector, or an rAAV disclosed herein. In specific embodiments, the host cells may be suitable for the propagation of AAV.

A vast range of host cells can be used, such as bacteria, yeast, insect, mammalian cells, etc. In some embodiments, the host cell can be a cell (or a cell line) appropriate for production of recombinant AAV (rAAV), for example, a HeLa, Cos-7, HEK293, A549, BHK, Vero, RD, HT-1080, ARPE-19, or MRC-5 cell.

The recombinant nucleic acid molecules or vectors can be delivered into the host cell culture using any suitable method known in the art. In some embodiments, a stable host cell line that has the recombinant nucleic acid molecule or vector inserted into its genome is generated. In some embodiments, a stable host cell line is generated, which contains an rAAV vector described herein. After transfection of the rAAV vector to the host culture, integration of the rAAV into the host genome can be assayed by various methods, such as antibiotic selection, fluorescence-activated cell sorting, southern blot, PCR based detection, fluorescence in situ hybridization as described by Nakai et al, Nature Genetics (2003) 34, 297-302; Philpott et al, Journal of Virology (2002) 76 (11): 5411-5421, and Howden et al, J Gene Med 2008; 10:42-50. Furthermore, a stable cell line can be established according to protocols well known in the art, such as those described in Clark, Kidney International Vol 61 (2002): S9-S15, and Yuan et al, Human Gene Therapy 2011 May; 22 (5): 613-24.

Recombinant AAV for Gene Therapy:

AAV belongs to the family Parvoviridae and the genus Dependovirus. AAV is a small, non-enveloped virus that packages a linear, single-stranded DNA genome. Both sense and antisense strands of AAV DNA are packaged into AAV capsids with equal frequency.

The AAV genome is characterized by two inverted terminal repeats (ITRs) that flank two open reading frames (ORB). In the AAV2 genome, for example, the first 125 nucleotides of the ITR are a palindrome, which folds upon itself to maximize base pairing and forms a T-shaped hairpin structure. The other 20 bases of the ITR, called the D sequence, remain unpaired. The ITRs are cis-acting sequences important for AAV DNA replication; the ITR is the origin of replication and serves as a primer for second-strand synthesis by DNA polymerase. The double-stranded DNA formed during this synthesis, which is called replicating-form monomer, is used for a second round of self-priming replication and forms a replicating-form dimer. These double-stranded intermediates are processed via a strand displacement mechanism, resulting in single-stranded DNA used for packaging and double-stranded DNA used for transcription. Located within the ITR are the Rep binding elements and a terminal resolution site (TRS). These features are used by the viral regulatory protein Rep during AAV replication to process the double-stranded intermediates. In addition to their role in AAV replication, the ITR is also essential for AAV genome packaging, transcription, negative regulation under non-permissive conditions, and site-specific integration (Days and Berns, *Clin Microbiol Rev* 21 (4): 583-593, 2008).

The left ORF of AAV contains the Rep gene, which encodes four proteins—Rep78, Rep68, Rep52 and Rep40. The right ORF contains the Cap gene, which produces three viral capsid proteins (VP1, VP2 and VP3). The AAV capsid contains 60 viral capsid proteins arranged into an icosahedral symmetry. VP1, VP2 and VP3 are present in a 1:1:10 molar ratio (Daya and Berns, *Clin Microbiol Rev* 21 (4): 583-593, 2008).

AAV is currently one of the most frequently used viruses for gene therapy. Although AAV infects humans and some other primate species, it is not known to cause disease and elicits a very mild immune response. Gene therapy vectors that utilize AAV can infect both dividing and quiescent cells and persist in an extrachromosomal state without integrating into the genome of the host cell. Because of the advantageous features of AAV, the present disclosure contemplates the use of AAV for the recombinant nucleic acid molecules and methods disclosed herein.

AAV possesses several desirable features for a gene therapy vector, including the ability to bind and enter target cells, enter the nucleus, the ability to be expressed in the nucleus for a prolonged period of time, and low toxicity. However, the small size of the AAV genome limits the size of heterologous DNA that can be incorporated. To minimize this problem, AAV vectors have been constructed that do not encode Rep and the integration efficiency element (IEE). The ITRs are retained as they are cis signals required for packaging (Daya and Berns, *Clin Microbiol Rev,* 21 (4): 583-593, 2008).

Methods for producing rAAV suitable for gene therapy are well known in the art (see, for example, U.S. Patent Application Nos. 2012/0100606; 2012/0135515; 2011/0229971; and 2013/0072548; and Ghosh et al., *Gene Ther* 13 (4): 321-329, 2006), and can be utilized with the recombinant nucleic acid molecules and methods disclosed herein.

In some aspects, the present disclosure provides the use of an rAAV disclosed herein for the treatment of propionic acidemia (PA), wherein the rAAV includes an AAV capsid and a vector genome packaged therein. In some embodiments, the rAAV contains a packaged genome comprising as operably linked components in 5' to 3' order: a 5'-ITR, a promoter sequence, a partial or complete coding sequence for PCCA or an isoform thereof, or a functional fragment or functional variant thereof, and a 3'-ITR. In some embodiments, the rAAV contains a packaged genome comprising as operably linked components in 5' to 3' order: a 5'-ITR, a promoter sequence, a truncated or complete nucleotide sequence of human PCCA 5'-UTR, a partial or complete coding sequence for PCCA or an isoform thereof, or a functional fragment or functional variant thereof, a truncated or complete nucleotide sequence of human PCCA 3'-UTR, and a 3'-ITR. In an exemplary embodiment, the packaged genome also comprises an enhancer sequence upstream of the promoter sequence, an intron downstream of the promoter, and a polyadenylation sequence upstream of the 3'-ITR. Thus, in another exemplary embodiment, the rAAV contains a packaged genome comprising as operably linked components in 5' to 3' order: a 5'-ITR, an enhancer sequence, a promoter sequence, an intron sequence, a partial or complete coding sequence for PCCA or an isoform thereof, or a functional fragment or functional variant thereof, a polyadenylation signal sequence, and a 3'-ITR. In another exemplary embodiment, the rAAV contains a packaged genome comprising as operably linked components in 5' to 3' order: a 5'-ITR, an enhancer sequence, a promoter sequence, an intron sequence, a truncated or complete nucleotide sequence of human PCCA 5'-UTR, a partial or complete coding sequence for PCCA or an isoform thereof, or a functional fragment or functional variant thereof, a polyadenylation signal sequence, a truncated or complete nucleotide sequence of human PCCA 3'-UTR, and a 3'-ITR. In a further exemplary embodiment, the rAAV contains a packaged genome comprising as operably linked components in 5' to 3' order: an AAV2 5'-ITR sequence, a CMV enhancer, a CBA promoter, an SV40 Small T intron, a coding sequence for PCCA, a BGH polyadenylation signal sequence, and an AAV2 3'-ITR. In a further exemplary embodiment, the rAAV contains a packaged genome comprising as operably linked components in 5' to 3' order: an AAV2 5'-ITR sequence, a CMV enhancer, a native PCCA promoter, an SV40 Small T intron, a nucleotide sequence of PCCA 5'-UTR, a coding sequence for PCCA, a native PCCA polyadenylation signal sequence, a nucleotide sequence of PCCA 3'-UTR, and an AAV2 3'-ITR. In some embodiments, the packaged genome further comprises a consensus Kozak sequence located downstream of the intron sequence. In some embodiments, the packaged genome further comprises a consensus Kozak sequence located downstream of the native PCCA 5'-UTR sequence. In some embodiments, the coding sequence for PCCA is selected from SEQ ID NOs: 1-6. In some embodiments, the capsid is an AAV9 capsid.

An illustrative diagram showing an exemplary packaged vector genome construct for the expression of PCCA is provided in FIG. 1, which shows in 5' to 3' order: a 5'-ITR, a CMV enhancer, a CBA promoter, an SV40 Small T intron, a consensus Kozak sequence, a PCCA coding sequence, an SV40 polyadenylation signal sequence, and a 3'-ITR.

In some aspects, the present disclosure provides the use of an rAAV disclosed herein for the treatment of propionic acidemia (PA), wherein the rAAV includes an AAV capsid and vector genome packaged therein, wherein the packaged genome comprises as operably linked components in 5' to 3' order: a 5'-ITR, a promoter sequence, a partial or complete coding sequence for PCCB or an isoform thereof, or a functional fragment or functional variant thereof, and a 3'-ITR. In some embodiments, the rAAV contains a packaged genome comprising as operably linked components in 5' to 3' order: a 5'-ITR, a promoter sequence, a truncated or complete nucleotide sequence of human PCCB 5'-UTR, a partial or complete coding sequence for PCCB or an isoform thereof, or a functional fragment or functional variant thereof, a truncated or complete nucleotide sequence of human PCCB 3'-UTR, and a 3'-ITR. In an exemplary embodiment, the packaged genome also comprises an enhancer sequence upstream of the promoter sequence, an intron downstream of the promoter, and a polyadenylation sequence upstream of the 3'-ITR. Thus, in another exemplary embodiment, the rAAV contains a packaged genome comprising as operably linked components in 5' to 3' order: a 5'-ITR, an enhancer sequence, a promoter sequence, an intron sequence, a partial or complete coding sequence for PCCB or an isoform thereof, or a functional fragment or functional variant thereof, a polyadenylation signal sequence, and a 3'-ITR. In another exemplary embodiment, the rAAV contains a packaged genome comprising as operably linked components in 5' to 3' order: a 5'-ITR, an enhancer sequence, a promoter sequence, an intron sequence, a truncated or complete nucleotide sequence of human PCCB 5'-UTR, a partial or complete coding sequence for PCCB or an isoform thereof, or a functional fragment or functional variant thereof, a polyadenylation signal sequence, a truncated or complete nucleotide sequence of human PCCB 3'-UTR, and a 3'-ITR. In a further exemplary embodiment, the rAAV contains a packaged genome comprising as operably linked components in 5' to 3' order: an AAV2 5'-ITR sequence, a CMV enhancer, a CBA promoter, an SV40 Small T intron, a coding sequence for PCCB, a BGH polyadenylation signal sequence, and an AAV2 3'-ITR. In a further exemplary embodiment, the rAAV contains a packaged genome comprising as operably linked components in 5' to 3' order: an AAV2 5'-ITR sequence, a CMV enhancer, a native PCCB promoter, an SV40 Small T intron, a nucleotide sequence of PCCB 5'-UTR, a coding sequence for PCCB, a native PCCB polyadenylation signal sequence, a nucleotide sequence of PCCB 3'-UTR, and an AAV2 3'-ITR. In some embodiments, the packaged genome further comprises a consensus Kozak sequence located downstream of the intron sequence. In some embodiments, the packaged genome further comprises a consensus Kozak sequence located downstream of the native PCCB 5'-UTR sequence. In some embodiments, the coding sequence for PCCB is selected from SEQ ID NOs: 7-12. In some embodiments, the capsid is an AAV9 capsid.

Figure 2:
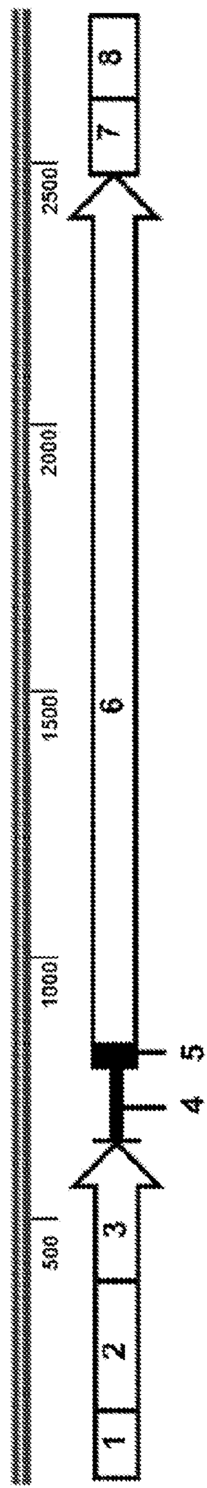
FIG. 2 is an illustrative diagram showing an exemplary packaged vector genome construct comprising PCCB, according to one embodiment. 5'-ITR, CMV enhancer, chicken β-actin promoter, SV40 small T intron, consensus Kozak sequence, PCCB coding sequence, SV40 polyadenylation signal, and 3'-ITR are represented by 1, 2, 3, 4, 5, 6, 7, and 8, respectively in the diagram.

An illustrative diagram showing an exemplary packaged vector genome construct for the expression of PCCB is provided in FIG. 2, which shows in 5' to 3' order: a 5'-ITR, a CMV enhancer, a CBA promoter, an SV40 Small T intron, a consensus Kozak sequence, a PCCA coding sequence, an SV40 polyadenylation signal sequence, and a 3'-ITR.

Protein Localization:

Propionyl-CoA carboxylase is a mutimeric protein that is localized to the mitochondrial matrix (see Browner et al., (1989). *Journal of Biological Chemistry.* 264:12680-5). Therefore, it is imperative that the gene therapy vectors delivering PCCA and/or PCCB gene(s) are capable of encoding for proteins that are functional and localized in mitochondria. In one aspect, one or more viral vectors disclosed herein drive and regulate the expression of genes (e.g., expression of PCCA or PCCB) that encode for PCCA and/or PCCB protein(s) that localize in the mitochondria.

Pharmaceutical Compositions:

Compositions comprising the rAAV disclosed herein and a pharmaceutically acceptable carrier are provided by the present disclosure. Suitable pharmaceutical formulations for administration of rAAV can be found, for example, in U.S. Patent Application Publication No. 2012/0219528. The pharmaceutically acceptable carriers (vehicles) useful in this disclosure are conventional. *Remington's Pharmaceutical Sciences*, by E. W. Martin, Mack Publishing Co., Easton, Pa., 15th Edition (1975), describes compositions and formulations suitable for pharmaceutical delivery of one or more therapeutic compounds, molecules or agents As highlighted in the preceding paragraph, the present disclosure relates in some aspects to pharmaceutical compositions comprising an rAAV of the invention. In some embodiments, the pharmaceutical composition comprises a pharmaceutically acceptable carrier or excipient. In some embodiments, the pharmaceutical composition is formulated for subcutaneous, intramuscular, intradermal, intraperitoneal, or intravenous administration. In an exemplary embodiment, the pharmaceutical composition is formulated for intravenous administration.

In some embodiments, the rAAV is formulated in a buffer/carrier suitable for infusion in human subjects. The buffer/carrier should include a component that prevents the rAAV from sticking to the infusion tubing but does not interfere with the rAAV binding activity in vivo. Various suitable solutions may include one or more of: a buffering saline, a surfactant, and a physiologically compatible salt or mixture of salts adjusted to an ionic strength equivalent to about 100 mM sodium chloride (NaCl) to about 250 mM sodium chloride, or a physiologically compatible salt adjusted to an equivalent ionic concentration. The pH may be in the range of 6.5 to 8.5, or 7 to 8.5, or 7.5 to 8. A suitable surfactant, or combination of surfactants, may be selected from among Poloxamers, i.e., nonionic triblock copolymers composed of a central hydrophobic chain of polyoxypropylene 10 (poly(propylene oxide)) flanked by two hydrophilic chains of polyoxyethylene (poly(ethylene oxide)), SOLUTOL HS 15 (Macrogol-15 Hydroxystearate), LABRASOL (Polyoxy caprylic glyceride), polyoxy 10 oleyl ether, TWEEN (polyoxyethylene sorbitan fatty acid esters), ethanol and polyethylene glycol.

Methods of Treating Propionic Acidemia:

In yet another aspect, the present disclosure provides methods of treating PA in a human subject comprising administering to the human subject a therapeutically effective amount of at least one rAAV disclosed herein.

In one embodiment, the present disclosure provides a method of treating PA comprising administering an rAAV that includes an AAV capsid and a vector genome packaged therein, wherein the vector genome comprises a partial or complete coding sequence for PCCA or an isoform thereof, or a functional fragment or functional variant thereof.

In another embodiment, the present disclosure provides a method of treating PA comprising administering an rAAV that includes an AAV capsid and a vector genome packaged therein, wherein the vector genome comprises a partial or complete coding sequence for PCCB or an isoform thereof, or a functional fragment or functional variant thereof.

In yet another embodiment, the present disclosure provides a method of treating PA comprising administering (1) an rAAV that includes an AAV capsid and a vector genome packaged therein, wherein the vector genome comprises a partial or complete coding sequence for PCCA or an isoform thereof, or a functional fragment or functional variant thereof; and (2) an rAAV that includes an AAV capsid and a vector genome packaged therein, wherein the vector genome comprises a partial or complete coding sequence for PCCB or an isoform thereof, or a functional fragment or functional variant thereof. In some embodiments, the rAAV of (1) and (2) may administered simultaneously. In some embodiments, the rAAV of (1) and (2) may administered sequentially. In some embodiments, the rAAV of (1) and (2) may administered separately.

In certain embodiments, the present disclosure provides a method of treating PA comprising administering (1) an rAAV that includes an AAV capsid and a vector genome packaged therein in which the coding sequence is for PCCA and not for PCCB, the promoter is a PCCA gene-specific endogenous promoter and not a PCCB gene-specific endogenous promoter, and the polyadenylation signal sequence is a PCCA gene-specific endogenous polyadenylation signal sequence and not a PCCB gene-specific endogenous polyadenylation signal sequence; and/or; and (2) an rAAV that includes an AAV capsid and a vector genome in which the coding sequence is for PCCB and not for PCCA, the promoter is a PCCB gene-specific endogenous promoter and not a PCCA gene-specific endogenous promoter, and the polyadenylation signal sequence is a PCCB gene-specific endogenous polyadenylation signal sequence and not a PCCA gene-specific endogenous polyadenylation signal sequence; and/or. In some embodiments, the rAAV of (1) and (2) may administered simultaneously. In some embodiments, the rAAV of (1) and (2) may administered sequentially. In some embodiments, the rAAV of (1) and (2) may administered separately.

In certain embodiments, the present disclosure provides methods of treating PA in a human subject comprising administering to a human subject diagnosed with at least one mutation in PCCA a therapeutically effective amount of at least one rAAV disclosed herein. In one embodiment, the present disclosure provides a method of treating PA in a human subject diagnosed with at least one mutation in PCCA comprising administering an rAAV that includes an AAV capsid and a vector genome packaged therein, wherein the vector genome comprises a partial or complete coding sequence for PCCA or an isoform thereof, or a functional fragment or functional variant thereof. In certain embodiments, the present disclosure provides a method of treating PA in a human subject diagnosed with at least one mutation in PCCA comprising administering an rAAV that includes an AAV capsid and a vector genome packaged therein in which the coding sequence is for PCCA and not for PCCB, the promoter is a PCCA gene-specific endogenous promoter and not a PCCB gene-specific endogenous promoter, and the polyadenylation signal sequence is a PCCA gene-specific endogenous polyadenylation signal sequence and not a PCCB gene-specific endogenous polyadenylation signal sequence. In certain embodiments, the mutation in PCCA is selected from Table 1. In some embodiments, the coding sequence for PCCA is selected from SEQ ID NOs: 1-6. In some embodiments, the capsid is an AAV9 capsid.

In some aspects, the present disclosure provides methods of treating PA in a human subject comprising administering to a human subject diagnosed with at least one mutation in PCCB a therapeutically effective amount of at least one rAAV disclosed herein. In one embodiment, the present disclosure provides a method of treating PA in a human subject diagnosed with at least one mutation in PCCB comprising administering an rAAV that includes an AAV capsid and a vector genome packaged therein, wherein the vector genome comprises a partial or complete coding sequence for PCCB or an isoform thereof, or a functional fragment or functional variant thereof. In certain embodiments, the present disclosure provides a method of treating PA in a human subject diagnosed with at least one mutation in PCCB comprising administering an rAAV that includes an AAV capsid and a vector genome packaged therein in which the coding sequence is for PCCB and not for PCCA, the promoter is a PCCB gene-specific endogenous promoter and not a PCCA gene-specific endogenous promoter, and the polyadenylation signal sequence is a PCCB gene-specific endogenous polyadenylation signal sequence and not a PCCA gene-specific endogenous polyadenylation signal sequence. In certain embodiments, the mutation in PCCB is selected from Table 2. In some embodiments, the coding sequence for PCCB is selected from SEQ ID NOs: 7-12. In some embodiments, the capsid is an AAV9 capsid.

A review article describing PA-causing mutations in PCCA and PCCB is provided in Ugarte et al., 1999, *Hum. Mutat.* 14 (4): 275-282.

In PA caused by a mutated PCCA gene, the following mutations and polymorphisms in the PCCA gene have been identified:

TABLE 1

| PCCA Gene Mutations and Polymorphisms: | |
|---|---|
| Missense Mutations: | 148 G→C, 154 C→T, 337 G→A, 416 T→C, 611 T→C, 815 A→G, 1028 A→G, 1043 T→A, 1061 G→T 1121 G→A, 1193 C→T, 1601 G→T, 1816 G→C, 1927 G→T |
| Nonsense Mutations: | 862 C→T, 1610 C→G |
| Small Deletions: | 700 del5, 1115del4, 2058del3 |
| Splicing Mutations: | 1645IVS + 1G→A, 1671IVS + 5G→C, 1771IV2-2del9, 1824IVS + 3del4, 1824IVS + 3insCT |
| Polymorphisms: | 552A→G, 1348A→G |

In PA caused by a mutated PCCB gene, the following mutations and polymorphisms in the PCCB gene have been identified:

TABLE 2

| PCCB Gene Mutations and Polymorphisms: | |
|---|---|
| Missense Mutations: | 49 C→A, 131 G→C, 318 C→ A, 391 G→C, 493 C→T, 502 G→A, 593 G→A, 605 T→ A, 683 C→T 1228 C→T, 1283 C→T, 1325 T→C, 1490 C→T, 1534 C→ T, 1556 T→C, 1606 A→G, |
| Nonsense Mutations: | 1495 C→T, 1593 G→ A |
| Insertions and Deletions: | 418ins12, 790insG, 1170insT, 1218del14ins12, 1222del3, 1298insA |
| Splicing Mutations: | IVS1 + 3G→C, IVS4 + 3del4, IVS10-11del6, IVS12 + 3del8, IVS13 + 1G→T |

In some embodiments, the present disclosure provides methods of treating PA in a human subject diagnosed with at least one mutation in PCCA selected from Table 1, comprising administering to said human subject a therapeutically effective amount of at least one rAAV disclosed herein. In one embodiment, the present disclosure provides a method of treating PA in a human subject diagnosed with at least one mutation in PCCA selected from Table 1 comprising administering an rAAV that includes an AAV capsid and a vector genome packaged therein, wherein the vector genome comprises a partial or complete coding sequence for PCCA or an isoform thereof, or a functional fragment or functional variant thereof. In some embodiments, the coding sequence for PCCA is selected from SEQ ID NOs: 1-6. In some embodiments, the capsid is an AAV9 capsid.

In some embodiments, the present disclosure provides methods of treating PA in a human subject diagnosed with at least one mutation in PCCB selected from Table 2, comprising administering to said human subject a therapeutically effective amount of at least one rAAV disclosed herein. In one embodiment, the present disclosure provides a method of treating PA in a human subject diagnosed with at least one mutation in PCCB selected from Table 2 comprising administering an rAAV that includes an AAV capsid and a vector genome packaged therein, wherein the vector genome comprises a partial or complete coding sequence for PCCB or an isoform thereof, or a functional fragment or functional variant thereof. In some embodiments, the coding sequence for PCCB is selected from SEQ ID NOs: 7-12. In some embodiments, the capsid is an AAV9 capsid.

Any suitable method or route can be used to administer an rAAV or an rAAV-containing composition described herein. Routes of administration include, for example, systemic, oral, inhalation, intranasal, intratracheal, intraarterial, intraocular, intravenous, intramuscular, subcutaneous, intradermal, and other parental routes of administration. In some embodiments, the rAAV, a composition comprising an rAAV, or a composition comprising multiple rAAVs (e.g., one rAAV expressing PCCA and a second rAAV expressing PCCB) are administered intravenously.

The specific dose administered can be a uniform dose for each patient, for example, $1.0\times10^{11}$-$1.0\times10^{14}$ genome copies (GC) of virus per patient. Alternatively, a patient's dose can be tailored to the approximate body weight or surface area of the patient. Other factors in determining the appropriate dosage can include the disease or condition to be treated or prevented, the severity of the disease, the route of administration, and the age, sex and medical condition of the patient. Further refinement of the calculations necessary to determine the appropriate dosage for treatment is routinely made by those skilled in the art, especially in light of the dosage information and assays disclosed herein. The dosage can also be determined through the use of known assays for determining dosages used in conjunction with appropriate dose-response data. An individual patient's dosage can also be adjusted as the progress of the disease is monitored In some embodiments, the rAAV is administered at a dose of, e.g., about $1.0\times10^{11}$ genome copies per kilogram of patient body weight (GC/kg) to about $1\times10^{14}$ GC/kg, about $5\times10^{11}$ genome copies per kilogram of patient body weight (GC/kg) to about $5\times10^{13}$ GC/kg, or about $1\times10^{12}$ to about $1\times10^{13}$ GC/kg, as measured by qPCR or digital droplet PCR (ddPCR). In some embodiments, the rAAV is administered at a dose of about $1\times10^{12}$ to about $1\times10^{13}$ genome copies (GC)/kg. In some embodiments, the rAAV is administered at a dose of about $1.1\times10^{11}$, about $1.3\times10^{11}$, about $1.6\times10^{11}$, about $1.9\times10^{11}$, about $2\times10^{11}$, about $2.5\times10^{11}$, about $3.0\times10^{11}$, about $3.5\times10^{11}$, about $4.0\times10^{11}$, about $4.5\times10^{11}$, about $5.0\times10^{11}$, about $5.5\times10^{11}$, about $6.0\times10^{11}$, about $6.5\times10^{11}$, about $7.0\times10^{11}$, about $7.5\times10^{11}$, about $8.0\times10^{11}$, about $8.5\times10^{11}$, about $9.0\times10^{11}$, about $9.5\times10^{11}$, about $1.0\times10^{12}$, about $1.5\times10^{12}$, about $2.0\times10^{12}$, about $2.5\times10^{12}$, about $3.0\times10^{12}$, about $3.5\times10^{12}$, about $4.0\times10^{12}$, about $4.5\times10^{12}$, about $5.0\times10^{12}$, about $5.5\times10^{12}$, about $6.0\times10^{12}$, about $6.5\times10^{12}$, about $7.0\times10^{12}$, about $7.5\times10^{12}$, about $8.0\times10^{12}$, about $8.5\times10^{12}$, about $9.0\times10^{12}$, about $9.5\times10^{12}$, about $1.0\times10^{13}$, about $1.5\times10^{13}$, about $2.0\times10^{13}$, about $2.5\times10^{13}$, about $3.0\times10^{13}$, about $3.5\times10^{13}$, about $4.0\times10^{13}$, about $4.5\times10^{13}$, about $5.0\times10^{13}$, about $5.5\times10^{13}$, about $6.0\times10^{13}$, about $6.5\times10^{13}$, about $7.0\times10^{13}$, about $7.5\times10^{13}$, about $8.0\times10^{13}$, about $8.5\times10^{13}$, about $9.0\times10^{13}$, about $9.5\times10^{13}$ genome copies (GC)/kg. The rAAV can be administered in a single dose, or in multiple doses (such as 2, 3, 4, 5, 6, 7, 8, 9, 10 or more doses) as needed for the desired therapeutic results.

Doses may be given once or more times weekly, monthly or yearly, or even once every 2 to 20 years. For example, each dose may be given at minimum of 1 week apart, 2 weeks apart, 3 weeks apart, a months apart, 3 months apart, 6 months apart, or 1 year apart. Persons of ordinary skill in the art can easily estimate repetition rates for dosing based on measured residence times and concentrations of the targetable construct or complex in bodily fluids or tissues.

Throughout the description, where compositions are described as having, including, or comprising specific components, or where processes and methods are described as having, including, or comprising specific steps, it is contemplated that, additionally, there are compositions of the present invention that consist essentially of, or consist of, the recited components, and that there are processes and methods according to the present invention that consist essentially of, or consist of, the recited processing steps.

In the present disclosure, where an element or component is said to be included in and/or selected from a list of recited elements or components, it should be understood that the element or component can be any one of the recited elements or components, or the element or component can be selected from a group consisting of two or more of the recited elements or components.

Further, it should be understood that elements and/or features of a composition or a method described herein can be combined in a variety of ways without departing from the spirit and scope of the present invention, whether explicit or implicit herein. For example, where reference is made to a particular compound, that compound can be used in various embodiments of compositions of the present invention and/or in methods of the present invention, unless otherwise understood from the context. In other words, within the present disclosure, embodiments have been described and depicted in a way that enables a clear and concise disclosure to be written and drawn, but it is intended and will be appreciated that embodiments may be variously combined or separated without parting from the present teachings and invention(s). For example, it will be appreciated that all features described and depicted herein can be applicable to all aspects of the invention(s) described and depicted herein.

It should be understood that the expression "at least one of" includes individually each of the recited objects after the expression and the various combinations of two or more of the recited objects unless otherwise understood from the context and use. The expression "and/or" in connection with three or more recited objects should be understood to have the same meaning unless otherwise understood from the context.

The use of the term "include," "includes," "including," "have," "has," "having," "contain," "contains," or "containing," including grammatical equivalents thereof, should be understood generally as open-ended and non-limiting, for example, not excluding additional unrecited elements or steps, unless otherwise specifically stated or understood from the context.

Where the use of the term "about" is before a quantitative value, the present invention also includes the specific quantitative value itself, unless specifically stated otherwise. As used herein, the term "about" refers to a ±10% variation from the nominal value unless otherwise indicated or inferred.

It should be understood that the order of steps or order for performing certain actions is immaterial so long as the present invention remain operable. Moreover, two or more steps or actions may be conducted simultaneously.

The use of any and all examples, or exemplary language herein, for example, "such as" or "including" is intended merely to illustrate better the present invention and does not pose a limitation on the scope of the invention unless claimed. No language in the specification should be construed as indicating any non-claimed element as essential to the practice of the present invention.

EXAMPLES

The disclosure now being generally described, will be more readily understood by reference to the following examples, which are included merely for purposes of illustration of certain aspects and embodiments of the present disclosure, and are not intended to limit the scope of the disclosure in any way.

Example 1: RNA and Protein Expression of PCCA

RNA Expression

Figure 3:
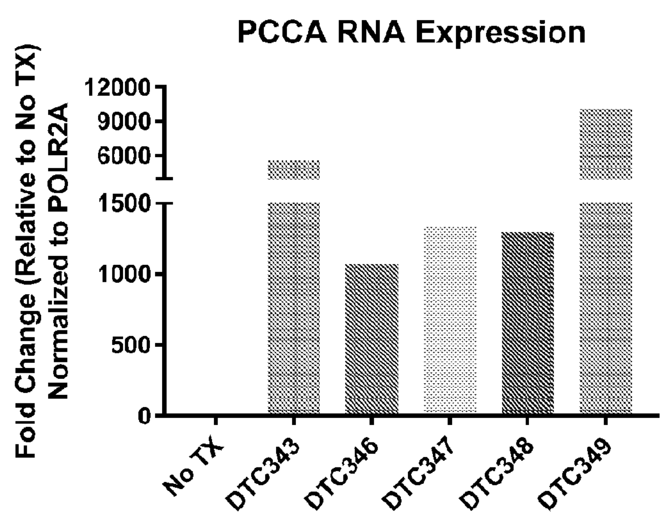
FIG. 3 is a bar graph showing fold-change in PCCA RNA expression as determined by RT-qPCR following transfection of a continuous hepatocyte cell line (HepG2) with a control plasmid (plasmid with an empty vector, no TX), an rAAV vector plasmid carrying a nucleotide sequence encoding enhanced green fluorescent protein, eGFP (DTC343), an rAAV vector plasmid carrying a nucleotide sequence encoding the complete native sequence of human PCCA (DTC346), or an rAAV vector plasmid carrying a nucleotide sequence encoding a codon-optimized sequence of human PCCA (DTC347, DTC348, or DTC349).

This example relates to RNA expression of PCCA following transfection of continuous hepatocyte cell line (HepG2) as determined by RT-qPCR. Briefly, HepG2 cells were transfected with a control plasmid (plasmid with an empty vector, No TX), an rAAV vector plasmid carrying a nucleotide sequence encoding enhanced green fluorescent protein, eGFP (DTC343), an rAAV vector plasmid carrying a nucleotide sequence encoding the complete native sequence of human PCCA (DTC346), or an rAAV vector plasmid carrying a nucleotide sequence encoding a codon-optimized sequence of human PCCA (DTC347, DTC348, or DTC349) using Lipofectamine 2000 (Invitrogen) according to manufacturer's instructions. HepG2 cells were harvested 72 hours post-transfection and lysed. RNA was extracted from the lysed HepG2 cells using TRIzol reagent (Invitrogen) according to the manufacturer's instructions. The quality and quantity of RNA were measured using NanoDrop ND-1000 (Thermo Scientific) through OD260/280 and OD260/230 ratios. Total RNA was reversed transcribed to cDNA using a High-Capacity cDNA reverse transcription kit (ThermoFisher Scientific) according to the manufacturer's instructions. Real-time RT-qPCR was performed using Power SYBR Green PCR Master Mix (Applied Biosystems) according to the manufacturer's instructions using the Applied Biosystems 7500 Real-Time PCR System. Fold-change in PCCA expression was calculated by the delta-delta Ct ($2^{-\Delta\Delta Ct}$) method utilizing RNA polymerase II polypeptide A (POLR2A) as an internal control for each sample and normalizing the calculated fold-change (see Livak K J, Schmittgen T D (2001) Analysis of relative gene expression data using real-time quantitative PCR and the 2 (−delta delta C(T)) method. Methods 25(4): 402-408) relative to the "no Tx" control. FIG. 3 is a bar graph showing fold-change in PCCA RNA expression as determined by RT-qPCR following transfection of a continuous hepatocyte cell line (HepG2) with a control plasmid (plasmid with an empty vector, no TX), an rAAV vector plasmid carrying a nucleotide sequence encoding enhanced green fluorescent protein, eGFP (DTC343), an rAAV vector plasmid carrying a nucleotide sequence encoding the complete native sequence of human PCCA (DTC346), or an rAAV vector plasmid carrying a nucleotide sequence encoding a codon-optimized sequence of human PCCA (DTC347, DTC348, or DTC349).

The plotted data shows that the RNA expression of complete native human PCCA post-transfection with DTC346 was comparable to expression of two codon-optimized human PCCA versions post-transfection with DTC347 and DTC348. Cells transfected with DTC349 demonstrated higher RNA expression.

Protein Expression

This example also relates to protein expression of PCCA following transfection of continuous hepatocyte cell lines, HepG2 and Huh7. Briefly, HepG2 and Huh7 cell lines were transfected with a control plasmid (plasmid with an empty vector, No TX), an rAAV vector plasmid carrying a nucleotide sequence encoding the complete native sequence of human PCCA (DTC346), an rAAV vector plasmid carrying a nucleotide sequence encoding a codon-optimized sequence of human PCCA (DTC347, DTC348, or DTC349), an rAAV vector plasmid carrying a nucleotide sequence encoding the complete native sequence of human PCCA and a nucleotide sequence encoding the complete native sequence of human PCCB (DTC365), or an rAAV vector plasmid carrying a nucleotide sequence encoding enhanced green fluorescent protein, eGFP (DTC343) using Lipofectamine 2000 (Invitrogen) according to manufacturer's instructions. Cells were harvested 72 hours post-transfection and lysed with NP-40 lysis buffer (50 mM Tris. HCl pH 8.0, 150 mM NaCl, 1.0% NP-40) supplemented with protease inhibitor mix (Sigma) and phosphatase inhibitor cocktail 2+3 (Sigma P5726 and P0044). Proteins were resolved on 10% sodium dodecyl sulfate polyacrylamide electrophoresis (SDS-PAGE) gels and transferred onto IMMUN-BLOT® polyvinylidene fluoride (PVDF) membrane (Bio-Rad). Western blot analysis was performed using anti-PCCA (Abcam, Cambridge, UK) antibody at 1:1000 dilution followed by a secondary antibody conjugated to far red fluorophores (Licor IRDye Secondary Antibodies).

Figure 4A:
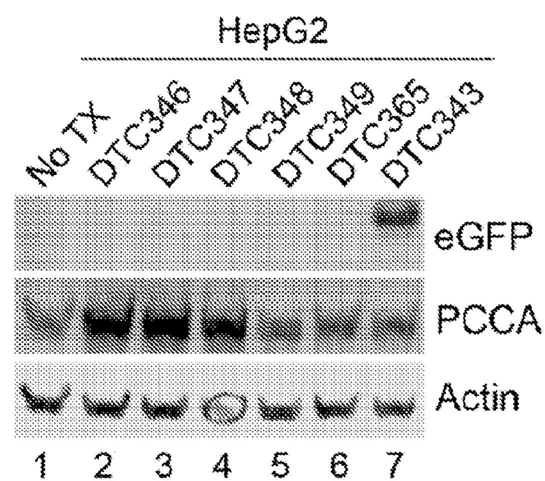
FIG. 4A is an image showing protein expression levels, detected by Western blot, in continuous hepatocyte cell line (HepG2) transfected with a control plasmid (plasmid with an empty vector, no TX), an rAAV vector plasmid carrying a nucleotide sequence encoding the complete native sequence of human PCCA (DTC346), an rAAV vector plasmid carrying a nucleotide sequence encoding a codon-optimized sequence of human PCCA (DTC347, DTC348, or DTC349), an rAAV vector plasmid carrying a nucleotide sequence encoding the complete native sequence of human PCCA and a nucleotide sequence encoding the complete native sequence of human PCCB (DTC365), or an rAAV vector plasmid carrying a nucleotide sequence encoding enhanced green fluorescent protein, eGFP (DTC343), from lane 1 to lane 7, respectively. β-actin ("Actin") was used as a loading control.

FIG. 4A is an image showing protein expression levels, detected by Western blot, in continuous hepatocyte cell line (HepG2) transfected with a control plasmid (plasmid with an empty vector, no TX), an rAAV vector plasmid carrying a nucleotide sequence encoding the complete native sequence of human PCCA (DTC346), an rAAV vector plasmid carrying a nucleotide sequence encoding a codon-optimized sequence of human PCCA (DTC347, DTC348, or DTC349), an rAAV vector plasmid carrying a nucleotide sequence encoding the complete native sequence of human PCCA and a nucleotide sequence encoding the complete native sequence of human PCCB (DTC365), or an rAAV vector plasmid carrying a nucleotide sequence encoding enhanced green fluorescent protein, eGFP (DTC343), from lane 1 to lane 7, respectively. β-actin ("Actin") was used as a loading control.

As shown in FIG. 4A, there was an expected basal level of PCCA protein expression in the "no TX" control (lane 1) and overexpression of PCCA protein in cells transfected with DTC346 (lane 2) and in cells transfected with DTC347 (lane 3) or DTC348 (lane 4) when compared to the "no TX" control (lane 1). Cells transfected with DTC349 (lane 5) did not demonstrate overexpression of PCCA protein even though this version was observed to express high amounts of RNA. Cells transfected with DTC343 (lane 7) demonstrated eGFP expression as expected.

Figure 4B:
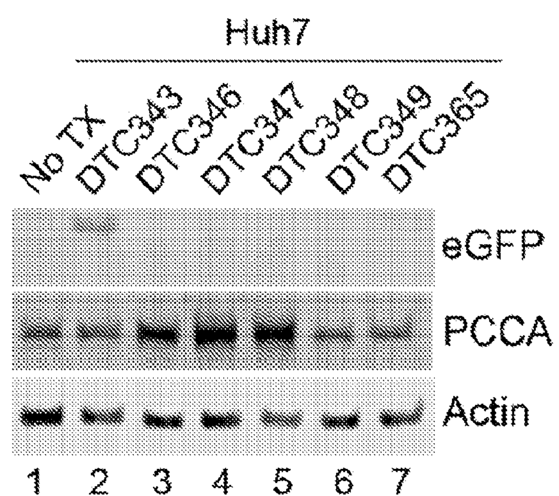
FIG. 4B is an image showing protein expression levels, detected by Western blot, in continuous hepatocyte cell line (Huh7) transfected with a control plasmid (plasmid with an empty vector, no TX), an rAAV vector plasmid carrying a nucleotide sequence encoding enhanced green fluorescent protein, eGFP (DTC343), an rAAV vector plasmid carrying a nucleotide sequence encoding the complete native sequence of human PCCA (DTC346), an rAAV vector plasmid carrying a nucleotide sequence encoding a codon-optimized sequence of human PCCA (DTC347, DTC348, or DTC349), or an rAAV vector plasmid carrying a nucleotide sequence encoding the complete native sequence of human PCCA and a nucleotide sequence encoding the complete native sequence of human PCCB (DTC365), from lane 1 to lane 7, respectively. β-actin ("Actin") was used as a loading control.

FIG. 4B is an image showing protein expression levels, detected by Western blot, in continuous hepatocyte cell line (Huh7) transfected with a control plasmid (plasmid with an empty vector, no TX), an rAAV vector plasmid carrying a nucleotide sequence encoding enhanced green fluorescent protein, eGFP (DTC343), an rAAV vector plasmid carrying a nucleotide sequence encoding the complete native sequence of human PCCA (DTC346), an rAAV vector plasmid carrying a nucleotide sequence encoding a codon-optimized sequence of human PCCA (DTC347, DTC348, or DTC349), or an rAAV vector plasmid carrying a nucleotide sequence encoding the complete native sequence of human PCCA and a nucleotide sequence encoding the complete native sequence of human PCCB (DTC365), from lane 1 to lane 7, respectively. β-actin ("Actin") was used as a loading control.

As shown in FIG. 4B, there was an expected basal level of PCCA protein expression in the "no TX" control (lane 1) and overexpression of PCCA protein in cells transfected with DTC346 (lane 3) and in cells transfected with DTC347 (lane 4) or DTC348 (lane 5) when compared to the "no TX" control (lane 1). Cells transfected with DTC349 (lane 6) did not demonstrate overexpression of PCCA protein even though this version was observed to express high amounts of RNA. Cells transfected with DTC343 (lane 2) demonstrated eGFP expression as expected.

Example 2: Overexpressed Human PCCA Protein Localizes to Mitochondria

Figure 5:
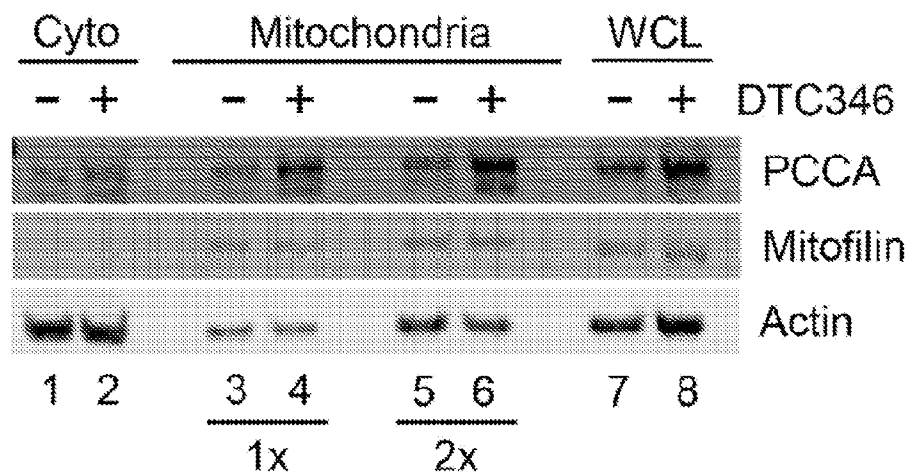
FIG. 5 is an image showing PCCA protein expression levels, detected by Western blot, in whole cell lysates (WCL); subcellular fractions (cytoplasmic fractions (cyto); and mitochondrial fractions (mitochondria)), isolated from a continuous hepatocyte cell line (HepG2) transfected with or without an rAAV vector plasmid carrying a nucleotide sequence encoding the complete native sequence of human PCCA (DTC346). 1× and 2× denote relative volumes of loaded mitochondrial fractions. β-actin ("Actin") was used as a loading control.

This example shows that human PCCA overexpressed in continuous hepatocyte cell line (HepG2) localizes to mitochondria. Briefly, continuous hepatocyte cell line (HepG2) was transfected with an rAAV vector plasmid carrying a nucleotide sequence encoding the complete native sequence of human PCCA (DTC346). Following transfection, cells were subjected to subcellular fractionation where cytoplasmic and mitochondrial fractions were isolated. Whole cell lysates were also processed. Proteins were resolved on 10% sodium dodecyl sulfate polyacrylamide electrophoresis (SDS-PAGE) gels and transferred onto IMMUN-BLOT® polyvinylidene fluoride (PVDF) membrane (Bio-Rad). Western blot analysis was performed using anti-PCCA (Abcam, Cambridge, UK) antibody at 1:1000 dilution followed by a secondary antibody conjugated to far red fluorophores (Licor IRDye Secondary Antibodies). FIG. 5 is an image showing PCCA protein expression levels, detected by Western blot, in whole cell lysates (WCL); subcellular fractions (cytoplasmic fractions (cyto); and mitochondrial fractions (mitochondria)), isolated from a continuous hepatocyte cell line (HepG2) transfected with or without an rAAV vector plasmid carrying a nucleotide sequence encoding the complete native sequence of human PCCA (DTC346). 1× and 2× denote relative volumes of loaded mitochondrial fractions. β-actin ("Actin") was used as a loading control.

As shown in FIG. 5, and consistent with results shown in FIGS. 4A-B, cells transfected with rAAV vector plasmid carrying a nucleotide sequence encoding the complete native sequence of human PCCA (DTC346) demonstrated PCCA overexpression when compared to untransfected control cells (lane 7 versus lane 8 in FIG. 5) in whole cell lysates. Levels of mitofilin, a protein known to be localized to mitochondria, were interrogated to determine the relative purity of isolated cellular fractions. As shown in FIG. 5, cytoplasmic fractions for untransfected and DTC346-transfected cells did not demonstrate detectable levels of mitofilin (lane 1 versus lane 2 in FIG. 5), whereas mitofilin was readily detected in the mitochondrial fractions and whole cell lysates as expected (lanes 3-8 in FIG. 5). Overexpressed PCCA localized predominantly to mitochondria (lane 2 versus lanes 4 and 6 in FIG. 5).

Example 3: Comparison of PCCA AAV9 Titer Yield

Figure 6:
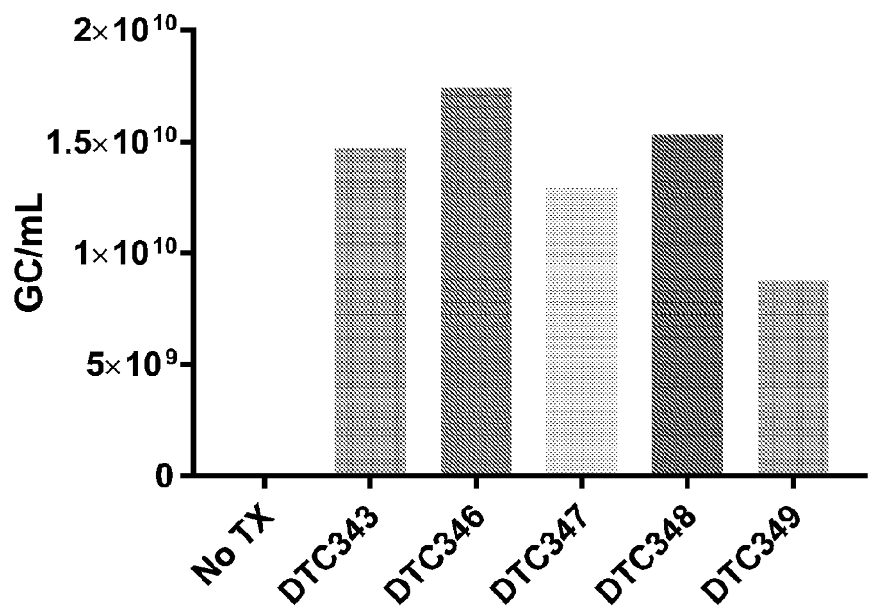
FIG. 6 is a bar graph showing, from left-to-right, fold-change of PCCA AAV9 titer (in genome copies (GC)/mL) as determined by qPCR following triple transfection of a continuous kidney cell line (HEK293) with an rAAV vector plasmid carrying a nucleotide sequence encoding enhanced green fluorescent protein, eGFP (DTC343); an rAAV vector plasmid carrying a nucleotide sequence encoding the complete native sequence of human PCCA (DTC346); or an rAAV vector plasmid carrying a nucleotide sequence encoding a codon-optimized sequence of human PCCA (DTC347, DTC348, or DTC349); each are expressed in a cell co-transfected with an AAV9 capsid-expressing plasmid (pAAV2/9) and a plasmid supplying adenovirus helper functions (pAdHelper). Untransfected cells were used as control and are represented as "no TX".

This example relates to comparison of PCCA AAV9 titer yield from rAAV vector plasmid carrying a nucleotide sequence encoding the complete native sequence of human PCCA (DTC346) or an rAAV vector plasmid carrying a nucleotide sequence encoding a codon-optimized sequence of human PCCA (DTC347, DTC348, or DTC349). A continuous kidney cell line (HEK293) was triple transfected with an rAAV vector plasmid carrying a nucleotide sequence encoding the complete native sequence of human PCCA (DTC346), an rAAV vector plasmid carrying a nucleotide sequence encoding a codon-optimized sequence of human PCCA (DTC347, DTC348, or DTC349), or an rAAV vector plasmid carrying a nucleotide sequence encoding enhanced green fluorescent protein, eGFP (DTC343); each were expressed in a cell co-transfected with an AAV9 capsid expressing plasmid (pAAV2/9) and a plasmid supplying adenovirus helper functions (pAdHelper). Untransfected cells were used as control and are represented as "no TX" in FIG. 6. Cell supernatant was harvested and treated with DNase I, or equivalent, to eliminate non-encapsidated DNA and facilitate quantification of DNase-resistant particle (DRP) titer utilizing a primer/probe set specific to the polyadenylation signal included in the design of these constructs. FIG. 6 is a bar graph showing, from left-to-right, fold-change of PCCA AAV9 titer (in genome copies (GC)/mL) as determined by qPCR following triple transfection of a continuous kidney cell line (HEK293) with an rAAV vector plasmid carrying a nucleotide sequence encoding enhanced green fluorescent protein, eGFP (DTC343); an rAAV vector plasmid carrying a nucleotide sequence encoding the complete native sequence of human PCCA (DTC346); or an rAAV vector plasmid carrying a nucleotide sequence encoding a codon-optimized sequence of human PCCA (DTC347, DTC348, or DTC349); each are expressed in a cell co-transfected with an AAV9 capsid-expressing plasmid (pAAV2/9) and a plasmid supplying adenovirus helper functions (pAdHelper). Untransfected cells were used as control and are represented as "no TX". FIG. 6 shows fold-change in PCCA AAV9 titer (in genome copies (GC)/ml) relative to untransfected cells as determined by qPCR. The data shown in FIG. 6 demonstrates comparable rAAV titers between the native complete human PCCA expressing construct (DTC346) and all codon-optimized versions (DTC347, DTC348, and DTC349).

Example 4: Testing PCCA DNA Integrity

Figure 7:
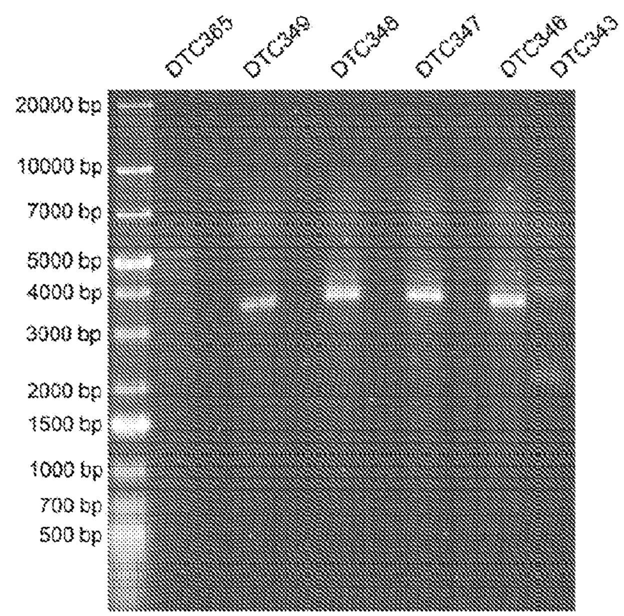
FIG. 7 is an image of a DNA alkaline agarose gel of affinity purified AAV9 particles containing PCCA and PCCB-expressing recombinant AAV (rAAV) vector cassette (DTC365), PCCA-expressing recombinant AAV (rAAV) vector cassettes (DTC349, DTC348, DTC347, or DTC346), or eGFP-expressing recombinant AAV (rAAV) vector cassette (DTC343), from left to right, respectively.

Following generation of AAV9 rAAV viral particles via triple transfection in HEK293 cells, cellular supernatant was harvested and incubated with AAVX resin (Thermo Fisher), or equivalent. AAV9 rAAV viral particles were purified and then concentrated using Amicon centrifugal filters (Millipore Sigma). Purified virus was incubated in an alkaline lysis buffer, loaded into a DNA agarose gel and run overnight in the presence of an alkaline running buffer. FIG. 7 is an image of a DNA alkaline agarose gel of affinity purified AAV9 particles containing PCCA and PCCB-expressing recombinant AAV (rAAV) vector cassette (DTC365), PCCA-expressing recombinant AAV (rAAV) vector cassettes (DTC349, DTC348, DTC347, or DTC346), or eGFP-expressing recombinant AAV (rAAV) vector cassette (DTC343), from left to right, respectively.

As shown in FIG. 7, the gel image shows clear single bands at the expected size for native and codon-optimized PCCA vector cassettes suggesting appropriate packaging of vector genome (DTC346, DTC347, DTC348, and DTC349). The eGFP control (DTC343) demonstrated packaging of two bands, consistent with known limitations of packaging small vector genomes.

Example 5: RNA and Protein Expression of PCCB

RNA Expression

Figure 8:
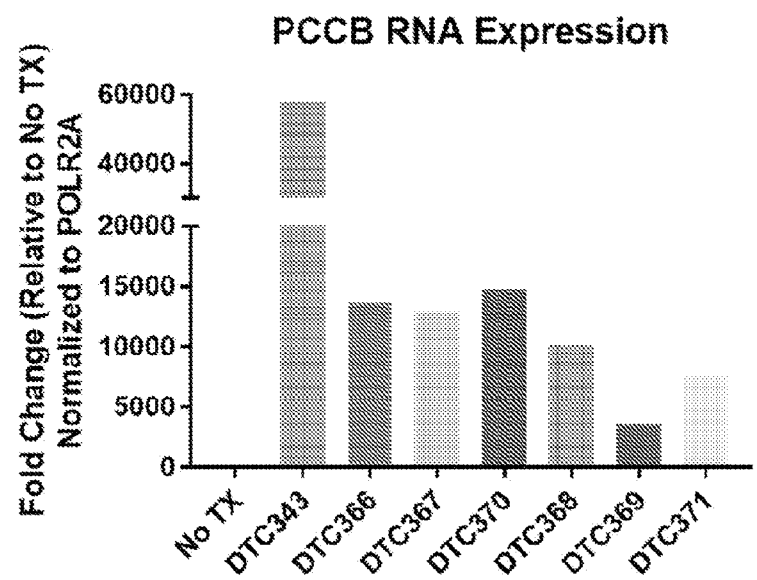
FIG. 8 is a bar graph showing fold-change in PCCB RNA expression as determined by RT-qPCR following transfection of a continuous hepatocyte cell line (HepG2) with a control plasmid (plasmid with an empty vector, no TX), an rAAV vector plasmid carrying a nucleotide sequence encoding enhanced green fluorescent protein, eGFP (DTC343), an rAAV vector plasmid carrying a nucleotide sequence encoding the complete native sequence of human PCCB (DTC366), or an rAAV vector plasmid carrying a nucleotide sequence encoding a codon-optimized sequence of human PCCB (DTC367, DTC370, DTC368, DTC369, or DTC371).

This example relates to RNA expression of PCCB following transfection of continuous hepatocyte cell line (HepG2) as determined by RT-qPCR. Briefly, HepG2 cells were transfected with a control plasmid (plasmid with an empty vector, No TX), an rAAV vector plasmid carrying a nucleotide sequence encoding enhanced green fluorescent protein, eGFP (DTC343), an rAAV vector plasmid carrying a nucleotide sequence encoding the complete native sequence of human PCCB (DTC366), or an rAAV vector plasmid carrying a nucleotide sequence encoding a codon-optimized sequence of human PCCB (DTC367, DTC370, DTC368, DTC369, or DTC371) using Lipofectamine 2000 (Invitrogen) according to manufacturer's instructions. HepG2 cells were harvested 72 hours post-transfection and lysed. RNA was extracted from the lysed HepG2 cells using TRIzol reagent (Invitrogen) according to the manufacturer's instructions. The quality and quantity of RNA were measured using NanoDrop ND-1000 (Thermo Scientific) through OD260/280 and OD260/230 ratios. Total RNA was reversed transcribed to cDNA using a High-Capacity cDNA reverse transcription kit (ThermoFisher Scientific) according to the manufacturer's instructions. Real-time RT-qPCR was performed using Power SYBR Green PCR Master Mix (Applied Biosystems) according to the manufacturer's instructions using the Applied Biosystems 7500 Real-Time PCR System. Fold-change in PCCB expression was calculated by the delta-delta Ct ($2^{-\Delta\Delta Ct}$) method utilizing RNA polymerase II polypeptide A (POLR2A) as an internal control for each sample and normalizing the calculated fold-change (see Livak K J, Schmittgen T D (2001) Analysis of relative gene expression data using real-time quantitative PCR and the 2 (−delta delta C (T)) method. Methods 25(4): 402-408) relative to the "No Tx" control. FIG. 8 is a bar graph showing fold-change in PCCB RNA expression as determined by RT-qPCR following transfection of a continuous hepatocyte cell line (HepG2) with a control plasmid (plasmid with an empty vector, no TX), an rAAV vector plasmid carrying a nucleotide sequence encoding enhanced green fluorescent protein, eGFP (DTC343), an rAAV vector plasmid carrying a nucleotide sequence encoding the complete native sequence of human PCCB (DTC366), or an rAAV vector plasmid carrying a nucleotide sequence encoding a codon-optimized sequence of human PCCB (DTC367, DTC370, DTC368, DTC369, or DTC371).

The plotted data shows that the RNA expression of complete native sequence of human PCCB post-transfection with DTC366 was comparable to expression of four codon-optimized human PCCB versions post-transfection with DTC367, DTC368, DTC370, or DTC371. Cells transfected with DTC369 demonstrated lower RNA expression.

Protein Expression

This example also relates to protein expression of PCCB following transfection of continuous hepatocyte cell lines, HepG2 and Huh7. Briefly, HepG2 and Huh7 cell lines were transfected with a control plasmid (plasmid with an empty vector, no TX), an rAAV vector plasmid carrying a nucleotide sequence encoding enhanced green fluorescent protein, eGFP (DTC343), an rAAV vector plasmid carrying a nucleotide sequence encoding the complete native sequence of human PCCB (DTC366), or an rAAV vector plasmid carrying a nucleotide sequence encoding a codon-optimized sequence of human PCCB (DTC367, DTC368, DTC369, DTC370, or DTC371) using Lipofectamine 2000 (Invitrogen) according to manufacturer's instructions. Cells were harvested 72 hours post-transfection and lysed with NP-40 lysis buffer (50 mM Tris· HCl pH 8.0, 150 mM NaCl, 1.0% NP-40) supplemented with protease inhibitor mix (Sigma) and phosphatase inhibitor cocktail 2+3 (Sigma P5726 and P0044). Proteins were resolved on 10% sodium dodecyl sulfate polyacrylamide electrophoresis (SDS-PAGE) gels and transferred onto IMMUN-BLOT® polyvinylidene fluoride (PVDF) membrane (Bio-Rad). Western blot analysis was performed using an anti-PCCB (Abcam, Cambridge, UK) antibody at 1:1000 dilution followed by a secondary antibody conjugated to far red fluorophores (Licor IRDye Secondary Antibodies).

Figure 9A:
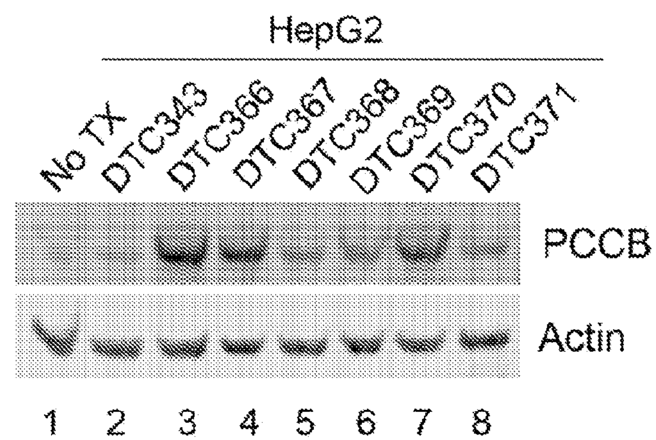
FIG. 9A is an image showing protein expression levels, detected by Western blot, in continuous hepatocyte cell line (HepG2) transfected with a control plasmid (plasmid with an empty vector, no TX), an rAAV vector plasmid carrying a nucleotide sequence encoding enhanced green fluorescent protein, eGFP (DTC343), an rAAV vector plasmid carrying a nucleotide sequence encoding the complete native sequence of human PCCB (DTC366), or an rAAV vector plasmid carrying a nucleotide sequence encoding a codon-optimized sequence of human PCCB (DTC367, DTC368, DTC369, DTC370, or DTC371), from lane 1 to lane 8, respectively. β-actin ("Actin") was used as a loading control.

FIG. 9A is an image showing protein expression levels, detected by Western blot, in continuous hepatocyte cell line (HepG2) transfected with a control plasmid (plasmid with an empty vector, no TX), an rAAV vector plasmid carrying a nucleotide sequence encoding enhanced green fluorescent protein, eGFP (DTC343), an rAAV vector plasmid carrying a nucleotide sequence encoding the complete native sequence of human PCCB (DTC366), or an rAAV vector plasmid carrying a nucleotide sequence encoding a codon-optimized sequence of human PCCB (DTC367, DTC368, DTC369, DTC370, or DTC371), from lane 1 to lane 8, respectively. β-actin ("Actin") was used as a loading control.

As shown in FIG. 9A, there was an expected basal level of PCCB protein expression in the "no TX" control (lane 1) and overexpression of PCCB protein in cells transfected with DTC366 (lane 3) and in cells transfected with DTC367 (lane 4) or DTC370, (lane 7) when compared to the "no TX" control (lane 1). Cells transfected with DTC368 (lane 5), DTC369 (lane 6), or DTC371 (lane 8) did not demonstrate overexpression of PCCB protein. Cells transfected with DTC343 (lane 2) demonstrated eGFP expression as expected.

Figure 9B:
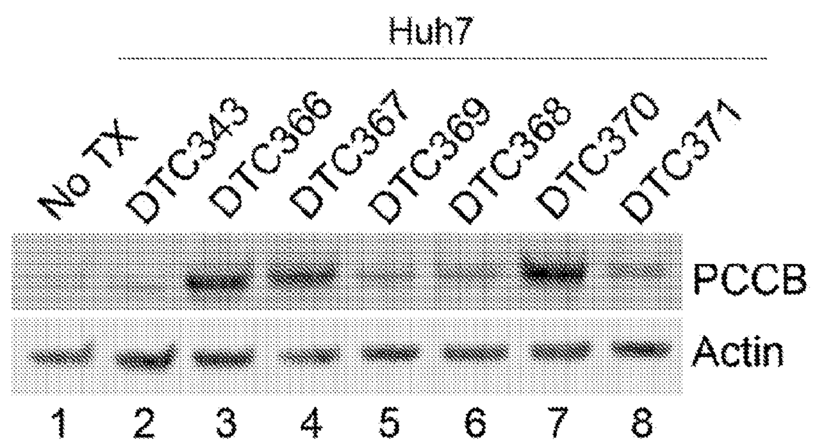
FIG. 9B is an image showing protein expression levels, detected by Western blot, in continuous hepatocyte cell line (Huh7) transfected with a control plasmid (plasmid with an empty vector, no TX), an rAAV vector plasmid carrying a nucleotide sequence encoding enhanced green fluorescent protein, eGFP (DTC343), an rAAV vector plasmid carrying a nucleotide sequence encoding the complete native sequence of human PCCB (DTC366), or an rAAV vector plasmid carrying a nucleotide sequence encoding a codon-optimized sequence of human PCCB (DTC367, DTC369, DTC368, DTC370, or DTC371), from lane 1 to lane 8, respectively. β-actin ("Actin") was used as a loading control.

FIG. 9B is an image showing protein expression levels, detected by Western blot, in continuous hepatocyte cell line (Huh7) transfected with a control plasmid (plasmid with an empty vector, no TX), an rAAV vector plasmid carrying a nucleotide sequence encoding enhanced green fluorescent protein, eGFP (DTC343), an rAAV vector plasmid carrying a nucleotide sequence encoding the complete native sequence of human PCCB (DTC366), or an rAAV vector plasmid carrying a nucleotide sequence encoding a codon-optimized sequence of human PCCB (DTC367, DTC369, DTC368, DTC370, or DTC371), from lane 1 to lane 8, respectively. β-actin ("Actin") was used as a loading control.

As shown in FIG. 9B, there was an expected basal level of PCCB protein expression in the "no TX" control (lane 1) and overexpression of PCCB protein in cells transfected with DTC366 (lane 3) and in cells transfected with DTC367 (lane 4) or DTC370 (lane 7) when compared to the "no TX" control (lane 1). Cells transfected with DTC368 (lane 6), DTC369 (lane 5), or DTC371 (lane 8) did not demonstrate overexpression of PCCB protein. Cells transfected with DTC343 (lane 2) demonstrated eGFP expression as expected.

Example 6: Overexpressed Human PCCB Protein Localizes to Mitochondria

This example shows that human PCCB overexpressed in continuous hepatocyte cell line (HepG2) localizes to mitochondria. Briefly, continuous hepatocyte cell line (HepG2) was transfected with an rAAV vector plasmid carrying a nucleotide sequence encoding the complete native sequence of human PCCB (DTC366). Following transfection, cells were subjected to subcellular fractionation where cytoplasmic and mitochondrial fractions were isolated. Whole cell lysates were also processed. Proteins were resolved on 10% sodium dodecyl sulfate polyacrylamide electrophoresis (SDS-PAGE) gels and transferred onto IMMUN-BLOT® polyvinylidene fluoride (PVDF) membrane (Bio-Rad). Western blot analysis was performed using anti-PCCB (Abcam, Cambridge, UK) antibody at 1:1000 dilution followed by a secondary antibody conjugated to far red fluorophores (Licor IRDye Secondary Antibodies).

Figure 10:
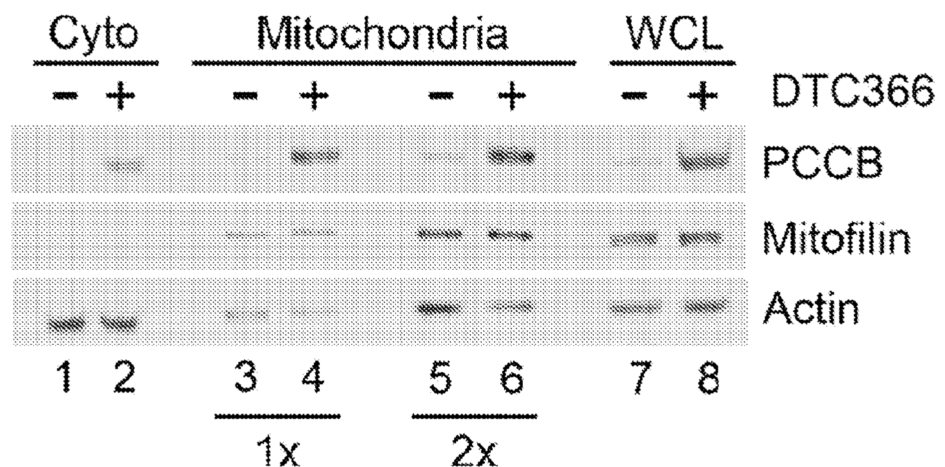
FIG. 10 is an image showing PCCB protein expression levels, detected by Western blot, in whole cell lysates (WCL); subcellular fractions (cytoplasmic fractions (cyto); and mitochondrial fractions (mitochondria)), isolated from a continuous hepatocyte cell line (HepG2) transfected with or without an rAAV vector plasmid carrying a nucleotide sequence encoding the complete native sequence of human PCCB (DTC366). 1× and 2× denote relative volumes of loaded mitochondrial fractions. β-actin ("Actin") was used as a loading control.

FIG. 10 is an image showing PCCB protein expression levels, detected by Western blot, in whole cell lysates (WCL); subcellular fractions (cytoplasmic fractions (cyto); and mitochondrial fractions (mitochondria)), isolated from a continuous hepatocyte cell line (HepG2) transfected with or without an rAAV vector plasmid carrying a nucleotide sequence encoding the complete native sequence of human PCCB (DTC366). 1× and 2× denote relative volumes of loaded mitochondrial fractions. β-actin ("Actin") was used as a loading control.

As shown in FIG. 10, and consistent with previous results, cells transfected with rAAV vector plasmid carrying a nucleotide sequence for encoding the complete native sequence of human PCCB (DTC366) demonstrated PCCB protein overexpression when compared to untransfected control cells (lane 7 versus lane 8) in whole cell lysates. Levels of mitofilin, a protein known to be localized to mitochondria, were interrogated to determine the relative purity of isolated cellular fractions. As shown in FIG. 10, cytoplasmic fractions for untransfected and DTC366-transfected cells did not demonstrate detectable levels of mitofilin (lane 1 versus lane 2), whereas mitofilin was readily detected in the mitochondrial fractions and whole cell lysates as expected (lanes 3-8). Overexpressed PCCB localized predominantly to mitochondria (lane 2 versus lanes 4 and 6).

Example 7: Comparison of PCCB AAV9 Titer Yield

Figure 11:
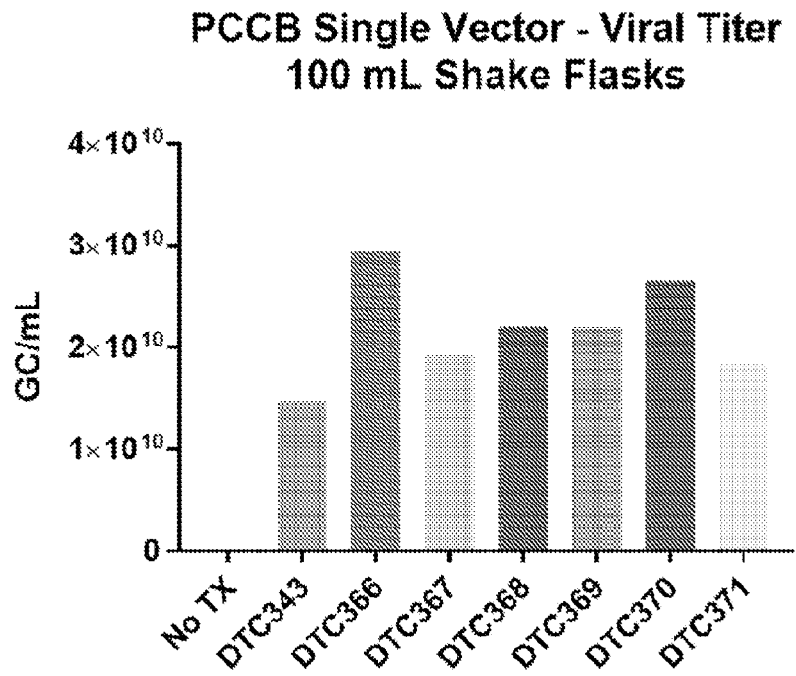
FIG. 11 is a bar graph showing, from left-to-right, fold-change of PCCB AAV9 titer (in genome copies (GC)/mL) as determined by qPCR following triple transfection of a continuous kidney cell line (HEK293) with an rAAV vector plasmid carrying nucleotide sequence encoding enhanced green fluorescent protein, eGFP (DTC343); an rAAV vector plasmid carrying nucleotide sequence encoding the complete native sequence of human PCCB (DTC366); or an rAAV vector plasmid carrying a nucleotide sequence encoding a codon-optimized sequence of human PCCA (DTC367, DTC368, DTC369, DTC370, or DTC371); each are expressed in a cell co-transfected with an AAV9 capsid expressing plasmid (pAAV2/9) and a plasmid supplying adenovirus helper functions (pAdHelper). Untransfected cells were used as control and are represented as "no TX".

This example relates to comparison of PCCB AAV9 titer yield from rAAV vector plasmid carrying a nucleotide sequence encoding the complete native sequence of human PCCB (DTC366) or an rAAV vector plasmid carrying a nucleotide sequence encoding a codon-optimized sequence of human PCCB (DTC367, DTC368, DTC369, DTC370, or DTC371). A continuous kidney cell line (HEK293) was triple transfected with an rAAV vector plasmid carrying a nucleotide sequence encoding enhanced green fluorescent protein, eGFP (DTC343); an rAAV vector plasmid carrying a nucleotide sequence encoding the complete native sequence of human PCCB (DTC366); or an rAAV vector plasmid carrying a nucleotide sequence encoding a codon-optimized sequence of human PCCA (DTC367, DTC368, DTC369, DTC370, or DTC371); each were expressed in a cell co-transfected with an AAV9 capsid expressing plasmid (pAAV2/9) and a plasmid supplying adenovirus helper functions (pAdHelper). Untransfected cells were used as control and are represented as "no TX" in FIG. 11. Cell supernatant was harvested and treated with DNase I, or equivalent, to eliminate non-encapsidated DNA and facilitate quantification of DNase-resistant particle (DRP) titer utilizing a primer/probe set specific to the polyadenylation signal included in the design of these constructs. FIG. 11 is a bar graph showing, from left-to-right, fold-change of PCCB AAV9 titer (in genome copies (GC)/mL) as determined by qPCR following triple transfection of a continuous kidney cell line (HEK293) with an rAAV vector plasmid carrying nucleotide sequence encoding enhanced green fluorescent protein, eGFP (DTC343); an rAAV vector plasmid carrying nucleotide sequence encoding the complete native sequence of human PCCB (DTC366); or an rAAV vector plasmid carrying a nucleotide sequence encoding a codon-optimized sequence of human PCCA (DTC367, DTC368, DTC369, DTC370, or DTC371); each are expressed in a cell co-transfected with an AAV9 capsid expressing plasmid (pAAV2/9) and a plasmid supplying adenovirus helper functions (pAdHelper). Untransfected cells were used as control and are represented as "no TX". FIG. 11 shows fold-change in PCCB AAV9 titer (in genome copies (GC)/mL) relative to untransfected cells as determined by qPCR. The data shown in FIG. 11 demonstrates comparable rAAV titers between the native complete human PCCB expressing construct (DTC366) and all codon-optimized versions (DTC367, DTC368, DTC369, DTC370, and DTC371).

Example 8: Testing PCCB DNA Integrity

Figure 12:
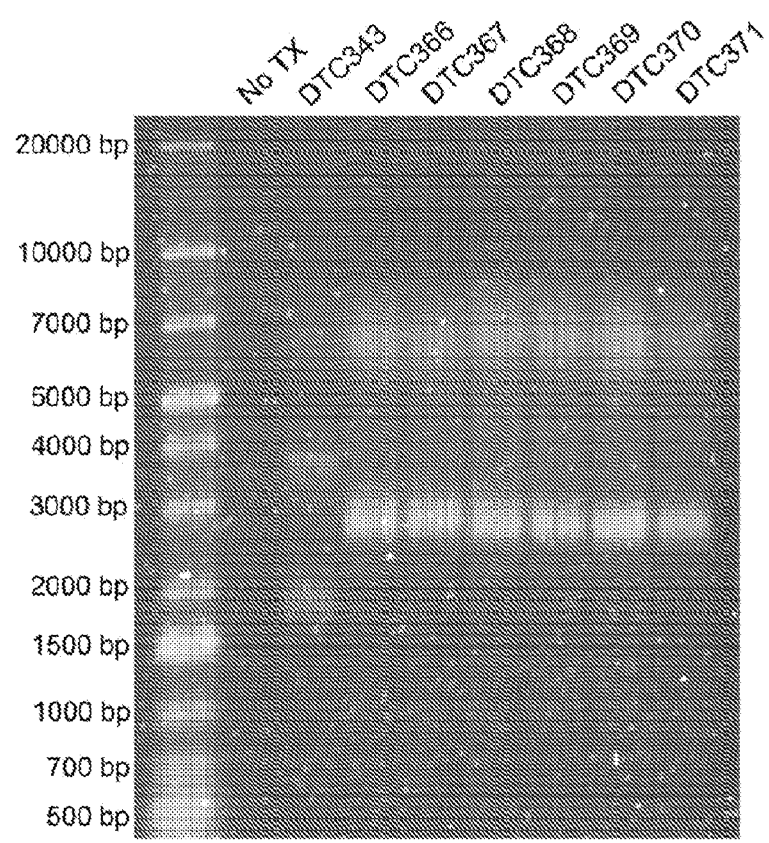
FIG. 12 is an image of a DNA alkaline agarose gel of affinity purified AAV9 particles containing control plasmid (plasmid with an empty vector, no TX), an eGFP-expressing recombinant AAV (rAAV) vector cassette (DTC343), or a PCCB-expressing recombinant AAV (rAAV) vector cassette (DTC366, DTC367, DTC368, DTC369, DTC370, or DTC371), from left to right, respectively.

Following generation of AAV9 rAAV viral particles via triple transfection in HEK293 cells, cellular supernatant was harvested and incubated with AAVX resin (Thermo Fisher), or equivalent. AAV9 rAAV viral particles were purified and then concentrated using Amicon centrifugal filters (Millipore Sigma). Purified virus was incubated in an alkaline lysis buffer, loaded into a DNA agarose gel and run overnight in the presence of an alkaline running buffer. FIG. 12 is an image of a DNA alkaline agarose gel of affinity purified AAV9 particles containing control plasmid (plasmid with an empty vector, no TX), an eGFP-expressing recombinant AAV (rAAV) vector cassette (DTC343), or a PCCB-expressing recombinant AAV (rAAV) vector cassette (DTC366, DTC367, DTC368, DTC369, DTC370, or DTC371), from left to right, respectively.

As shown in FIG. 12, the gel image shows clear single bands at the expected size for native and codon-optimized PCCB vector cassettes suggesting appropriate packaging of vector genome (DTC366, DTC367, DTC368, DTC369, DTC370, and DTC371). The eGFP control (DTC343) demonstrated packaging of two bands, consistent with known limitations of packaging small vector genomes.

Example 9: Administration of PCCA Viral Vectors to Wild-type Mice

Figure 13:
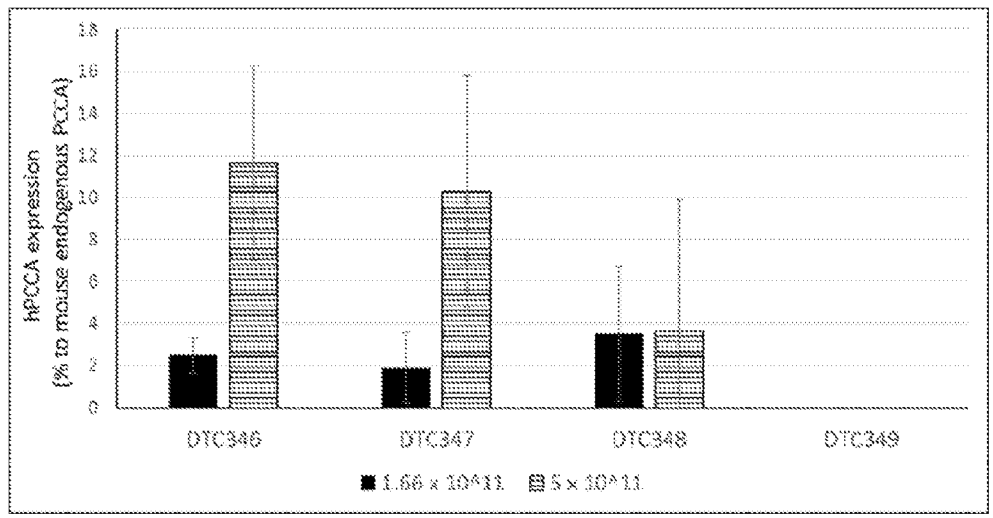
FIG. 13 is a bar graph showing the percentage of human PCCA protein expression relative to mouse endogenous PCCA expression in wild-type FVB mice following treatment with rAAV encoding the complete native sequence of human PCCA (DTC346), or a codon-optimized sequence of human PCCA (DTC347, DTC348, or DTC349). Error bars represent standard deviations.

This example relates to human PCCA protein expression in wild-type FVB mice following treatment with rAAV expressing the complete native human PCCA (DTC346) or a codon-optimized (DTC347, DTC348, and DTC349) human PCCA. Briefly, mice (n=2 or 3) were intravenously injected with $1.66\times10^{11}$ viral genomes (VGs) or $5\times10^{11}$ VGs of an rAAV expressing the complete native human PCCA (DTC346) represented by SEQ ID NO: 38 or an rAAV expressing a codon-optimized human PCCA (DTC347, DTC348, and DTC349). Human PCCA protein and endogenous mouse PCCA protein were detected by LC-MS. FIG. 13 is a bar graph showing the percentage of human PCCA protein expression relative to mouse endogenous PCCA expression in wild-type FVB mice following treatment with rAAV encoding the complete native sequence of human PCCA (DTC346), or a codon-optimized sequence of human PCCA (DTC347, DTC348, or DTC349). Error bars represent standard deviations. Data presented in FIG. 13 shows that human PCCA expressed from administration of $1.66\times10^{11}$ VGs of native PCCA (DTC346) was 2.5% to endogenous mouse PCCA levels and human PCCA expressed from administration of $5\times10^{11}$ VGs of native PCCA viral vector (DTC346) was 11.6% to endogenous mouse PCCA levels.

Example 10: Human PCCA Activity in Hypomorphic PCCA Mouse Model

This example relates to testing human PCCA activity in a hypomorphic PCCA mouse model. Deletion of the PCCA gene in mice mimics the most severe forms of the human disease. Mice with PCCA gene deletion die within 36 hours of birth, making it difficult to test intravenous systemic therapies in them (see Guenzel et al., Mol Ther. 2013 July; 21 (7): 1316-1323). Hypomorphic PCCA mice have reduced PCCA activity due to an introduction of the transgene coding human PCCA with pathogenic A138T mutation on the background of mouse PCCA knockout. This mutant PCCA gene results in elevated levels of propionylcarnitine, methylcitrate, glycine, alanine, lysine, ammonia, and markers associated with cardiomyopathy, similar to levels of these compounds in patients with propionic acidemia (PA). Briefly, mice (n=5) were intravenously injected with $1.66\times10^{11}$ viral genomes (VGs) or $5\times10^{11}$ VGs of an rAAV encoding the complete native sequence of human PCCA (DTC346) represented by SEQ ID NO: 38. PBS-treated mice were used as control mice.

PCCA Expression Level and Enzymatic Activity Assay

Figure 14:
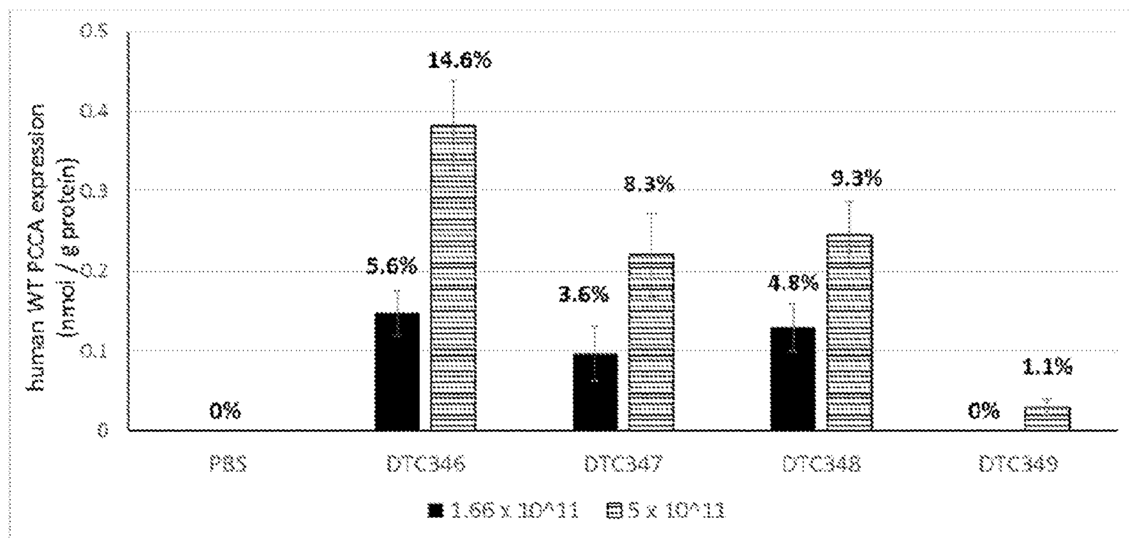
FIG. 14 is a bar graph showing the concentration (in nmol/g protein) of human wild-type PCCA protein expressed in a hypomorphic PCCA mouse model (A138T mutant) following treatment with rAAV encoding the complete native sequence of human PCCA (DTC346) or a codon-optimized sequence of human PCCA (DTC347, DTC348, or DTC349). The listed percentage number denotes human wildtype PCCA expression calculated as a percentage to endogenous PCCA protein level of wildtype FVB mice. Error bars represent standard deviations.
Figure 15:
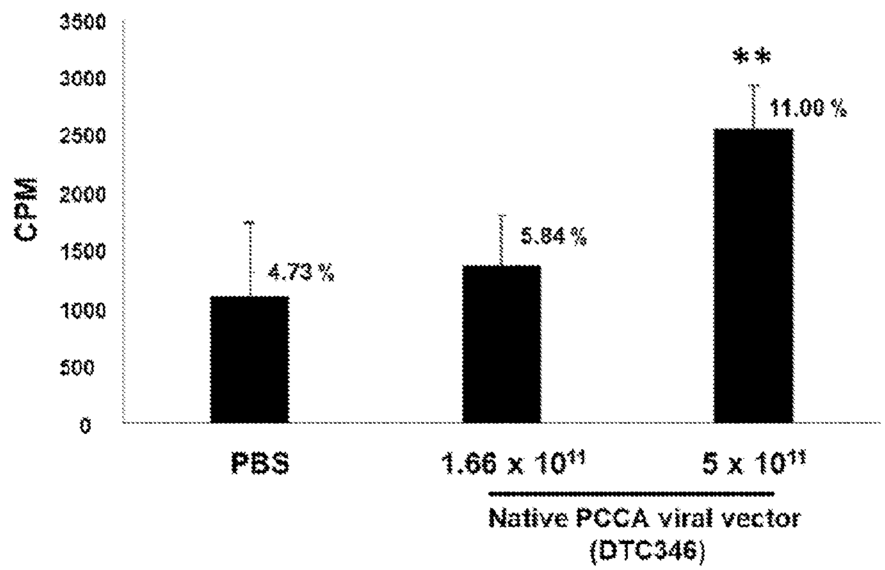
FIG. 15 is a bar graph of human PCCA activity in a hypomorphic PCCA mouse model (A138T mutant) following treatment with rAAV encoding the complete native sequence of human PCCA (DTC346), as measured by mean counts per minute (CPM) data. Error bars represent standard deviations. The listed percentage numbers describe the CPM data relative to those observed in wild-type FVB mice. ** denotes $p<0.01$ in comparison to PBS-treated group using Dunnett multiple comparison test.

Six weeks after injection, mouse livers were homogenized and human wild-type PCCA protein was measured by LC-MS. FIG. 14 is a bar graph showing the concentration (in nmol/g protein) of human wild-type PCCA protein expressed in a hypomorphic PCCA mouse model (A138T mutant) following treatment with rAAV encoding the complete native sequence of human PCCA (DTC346) or a codon-optimized sequence of human PCCA (DTC347, DTC348, or DTC349). The listed percentage number denotes human wildtype PCCA expression calculated as a percentage to endogenous PCCA protein level of wildtype FVB mice. Error bars represent standard deviations. The listed percentage number denotes human wild-type PCCA expression calculated as a percentage to endogenous PCCA protein level of wild-type FVB mice. Consistent with previous results, human PCCA protein expressed from rAAV encoding a codon-optimized human PCCA demonstrated lower expression levels when compared to native human PCCA protein expressed from rAAV encoding the complete native human PCCA. PCCA enzyme activity of the liver homogenates was measured as incorporation of sodium bicarbonate [C14] using a scintillation counter. FIG. 15 is a bar graph of human PCCA activity in a hypomorphic PCCA mouse model (A138T mutant) following treatment with rAAV encoding the complete native sequence of human PCCA (DTC346), as measured by mean counts per minute (CPM) data. Error bars represent standard deviations. The listed percentage numbers describe the CPM data relative to those observed in wild-type FVB mice. ** denotes $p<0.01$ in comparison to PBS-treated group using Dunnett multiple comparison test.

As shown in FIG. 15, mice injected with the higher dose ($5\times10^{11}$ VGs) of an rAAV encoding the complete native human PCCA demonstrated a statistically significant improvement in PCCA activity (11%) compared to PBS-treated mice.

Effect of Administering Native PCCA Viral Vector to Hypomorphic PCCA Mice on Concentration of Known Biomarkers of Propionic Acidemia (PA)

Figure 16A:
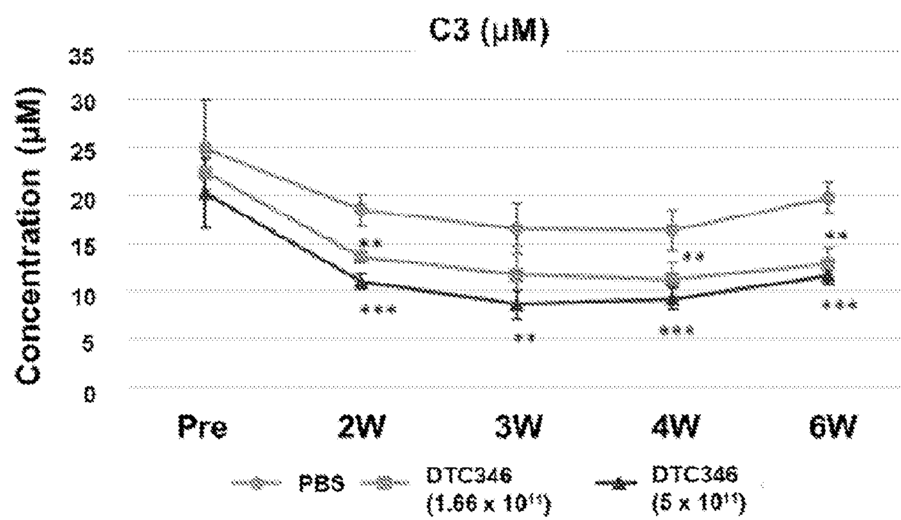
FIGS. 16A-C are bar graphs showing concentrations of known biomarkers of propionic acidemia in a hypomorphic PCCA mouse model (A138T mutant) following treatment with rAAV encoding the complete native sequence of human PCCA (DTC346).
Figure 16B:
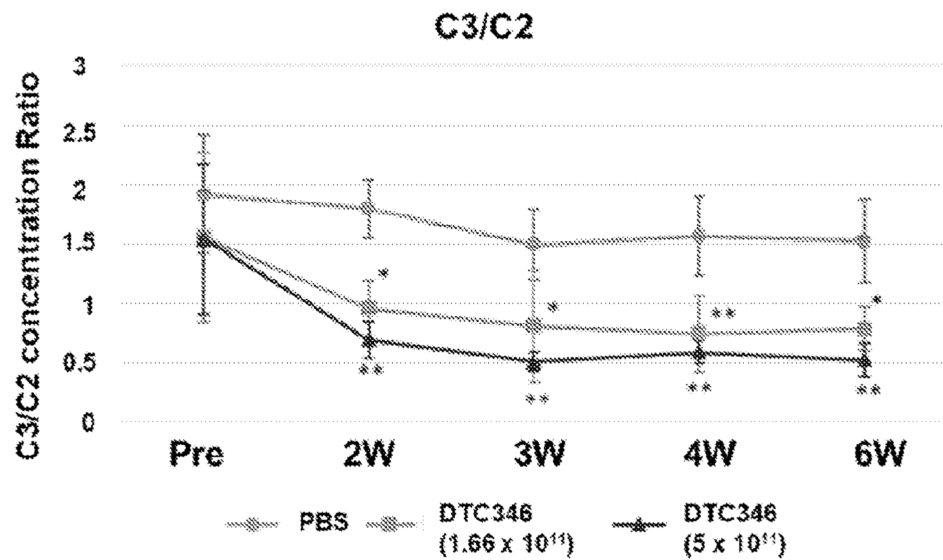
Figure 16C:
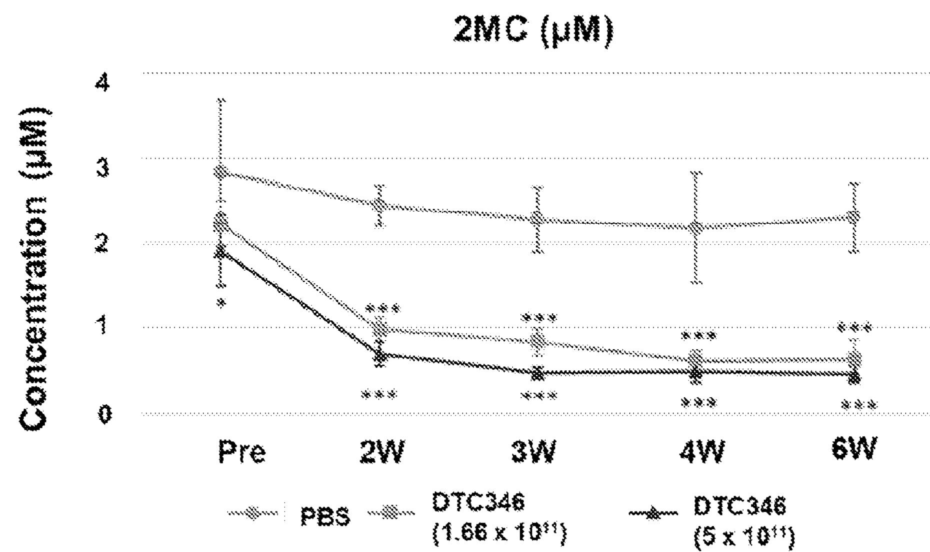

This example also relates to testing the effect of administering rAAV encoding the complete native sequence of human PCCA (DTC346) to hypomorphic PCCA mice on plasma concentration of known biomarkers of PA. Briefly, mice (n=5) were intravenously injected with $1.66\times10^{11}$ VGs or $5\times10^{11}$ VGs of an rAAV encoding the complete native sequence of human PCCA (DTC346) represented by SEQ ID NO: 38. Plasma concentrations of known biomarkers of PA (propionylcarnitine (C3), acetylcarnitine (C2), and 2-methylcitrate (2MC)) were determined by liquid chromatography-mass spectrometry (LC-MS). FIGS. 16A-C are bar graphs showing plasma concentrations of known biomarkers of propionic acidemia in a hypomorphic PCCA mouse model (A138T mutant) before (Pre) and 2, 3, 4, and 6 weeks (2 W, 3 W, 4 W, and 6 W, respectively) after treatment with rAAV encoding the complete native sequence of human PCCA (DTC346). Error bars represent standard deviations.  denotes $p<0.01$ in comparison to PBS-treated group and * denotes $p<0.001$ in comparison to PBS-treated group using Dunnett multiple comparison test. FIG. 16A is a bar graph showing plasma concentrations of C3 (propionylcarnitine) in a hypomorphic PCCA mouse model (A138T mutant) following treatment with rAAV encoding the complete native sequence of human PCCA (DTC346). FIG. 16B is bar graph of plasma C3/C2 concentration ratio (propionylcarnitine/acetylcarnitine) in a hypomorphic PCCA mouse model (A138T mutant) following treatment with rAAV encoding the complete native sequence of human PCCA (DTC346). FIG. 16C is a bar graph showing plasma concentrations of 2-methylcitrate (2MC) in a hypomorphic PCCA mouse model (A138T mutant) following treatment with rAAV encoding the complete native sequence of human PCCA (DTC346).

Mice treated with either doses ($1.66\times10^{11}$ VGs or $5\times10^{11}$ VGs) of rAAV encoding the complete native sequence of human PCCA (DTC346) demonstrated statistically significant reductions in plasma C3, C3/C2 and 2-MC levels compared to PBS-treated mice.

NUMBERED EMBODIMENTS

Embodiments disclosed herein include embodiments P1 to P136 as provided in the numbered embodiments of the disclosure.

Embodiment P1: A recombinant adeno-associated virus (rAAV), said rAAV comprising an AAV capsid, and a vector genome packaged therein, said vector genome comprising in 5' to 3' order:

(a) a 5' ITR sequence;

(b) a promoter sequence;

(c) a partial or complete coding sequence for PCCA; and (d) a 3' ITR sequence.

Embodiment P2: The rAAV according to embodiment P1, wherein the AAV capsid is from an AAV of serotype 1, 2, 3, 4, 5, 6, 7, 8, 9, 10, 11, 12, rh10, or hu37.

Embodiment P3: The rAAV according to embodiment P2, wherein the AAV capsid is from AAV9.

Embodiment P4: The rAAV according to embodiment P2, wherein the AAV capsid is from AAV8.

Embodiment P5: The rAAV according to embodiment P1, wherein the AAV capsid is an AAV9 variant capsid.

Embodiment P6: The rAAV according to any of embodiments P1 to P5, wherein the promoter is selected from a chicken β-actin (CBA) promoter, a cytomegalovirus immediate early gene (CMV) promoter, a transthyretin (TTR) promoter, a thyroxine binding globulin (TBG) promoter, an alpha-1 anti-trypsin (A1AT) promoter, and a CAG promoter.

Embodiment P7: The rAAV according to embodiment P6, wherein the promoter is the CBA promoter.

Embodiment P8: The rAAV according to any of embodiments P1 to P7, wherein the partial or complete coding sequence for PCCA is a wild-type coding sequence.

Embodiment P9: The rAAV according to embodiment P8, wherein the coding sequence for PCCA comprises SEQ ID NO: 1.

Embodiment P10: The rAAV according to any of embodiments P1 to P7, wherein the partial or complete coding sequence for PCCA is a codon-optimized coding sequence.

Embodiment P11: The rAAV according to embodiment P10, wherein the coding sequence for PCCA comprises a coding sequence selected from SEQ ID NOs: 2-6.

Embodiment P12: The rAAV according to any of embodiments P1 to P11, wherein the 5' ITR sequence is from AAV2.

Embodiment P13: The rAAV according to any of embodiments P1 to P11, wherein the 3' ITR sequence is from AAV2.

Embodiment P14: The rAAV according to any of embodiments P1 to P11, wherein the 5' ITR sequence and the 3' ITR sequence are from AAV2.

Embodiment P15: The rAAV according to any of embodiments P12 to P14, wherein the 5' ITR sequence and the 3' ITR sequence comprises or consists of SEQ ID NO: 15.

Embodiment P16: The rAAV according to any of embodiments P1 to P11, wherein the 5' ITR sequence and/or the 3' ITR sequence are from a non-AAV2 source.

Embodiment P17: The rAAV according to any of embodiments P1 to P16, wherein the packaged genome further comprises one or more enhancer sequences.

Embodiment P18: The rAAV according to embodiment P17, wherein the enhancer is selected from a cytomegalovirus immediate early gene (CMV) enhancer, a transthyretin enhancer (enTTR), a chicken β-actin (CBA) enhancer, an En34 enhancer, and an ApoE enhancer.

Embodiment P19: The rAAV according to embodiment P18, wherein the enhancer is the CMV enhancer.

Embodiment P20: The rAAV according to embodiment P19, wherein the enhancer comprises or consists of SEQ ID NO: 19.

Embodiment P21: The rAAV according to embodiments P18 to P20, wherein the enhancer is located upstream of the promoter sequence.

Embodiment P22: The rAAV according to any of embodiments P1 to P21, wherein the packaged genome further comprises one or more intron sequences.

Embodiment P23: The rAAV according to embodiment P22, wherein the intron is selected from an SV40 Small T intron, a rabbit hemoglobin subunit beta (rHBB) intron, a human beta globin IVS2 intron, a Promega chimeric intron, or an hFIX intron.

Embodiment P24: The rAAV according to embodiment P23, wherein the intron is the SV40 Small T intron.

Embodiment P25: The rAAV according to embodiment P24, wherein the intron comprises or consists of SEQ ID NO: 20.

Embodiment P26: The rAAV according to embodiment P23, wherein the intron is the rHBB intron.

Embodiment P27: The rAAV according to embodiment P26, wherein the intron comprises or consists of SEQ ID NO: 21.

Embodiment P28: The rAAV according to any of embodiments P1 to P27, wherein the packaged genome further comprises a polyadenylation signal sequence.

Embodiment P29: The rAAV according to embodiment P28, wherein the polyadenylation signal sequence is selected from a bovine growth hormone (BGH) polyadenylation signal sequence, an SV40 polyadenylation signal sequence, and a rabbit beta globin polyadenylation signal sequence.

Embodiment P30: The rAAV according to embodiment P29, wherein the polyadenylation signal sequence is the bovine growth hormone (BGH) polyadenylation signal sequence.

Embodiment P31: The rAAV according to embodiment P30, wherein the polyadenylation signal sequence comprises or consists of SEQ ID NO: 22.

Embodiment P32: The rAAV according to embodiment P29, wherein the polyadenylation signal sequence is the SV40 polyadenylation signal sequence.

Embodiment P33: The rAAV according to embodiment P32, wherein the polyadenylation signal sequence comprises or consists of SEQ ID NO: 23.

Embodiment P34: A recombinant adeno-associated virus (rAAV), said rAAV comprising an AAV capsid, and a vector genome packaged therein, said vector genome comprising in 5' to 3' order:

(a) a 5' ITR sequence;

(b) a promoter sequence;

(c) a partial or complete coding sequence for PCCB; and (d) a 3' ITR sequence.

Embodiment P35: The rAAV according to embodiment P34, wherein the AAV capsid is from an AAV of serotype 1, 2, 3, 4, 5, 6, 7, 8, 9, 10, 11, 12, rh10, or hu37.

Embodiment P36: The rAAV according to embodiment P35, wherein the AAV capsid is from AAV9.

Embodiment P37: The rAAV according to embodiment P35, wherein the AAV capsid is from AAV8.

Embodiment P38: The rAAV according to embodiment P34, wherein the AAV capsid is an AAV9 variant capsid.

Embodiment P39: The rAAV according to any of embodiments P34 to P38, wherein the promoter is selected from a chicken β-actin (CBA) promoter, a cytomegalovirus immediate early gene (CMV) promoter, a transthyretin (TTR) promoter, a thyroxine binding globulin (TBG) promoter, an alpha-1 anti-trypsin (A1AT) promoter, and a CAG promoter.

Embodiment P40: The rAAV according to embodiment P39, wherein the promoter is the CBA promoter.

Embodiment P41: The rAAV according to any of embodiments P34 to P40, wherein the partial or complete coding sequence for PCCB is a wild-type coding sequence.

Embodiment P42: The rAAV according to embodiment P41, wherein the coding sequence for PCCB comprises SEQ ID NO: 7.

Embodiment P43: The rAAV according to any of embodiments P34 to P40, wherein the partial or complete coding sequence for PCCB is a codon-optimized coding sequence.

Embodiment P44: The rAAV according to embodiment P43, wherein the coding sequence for PCCB comprises a coding sequence selected from SEQ ID NOs: 8-12.

Embodiment P45: The rAAV according to any of embodiments P34 to P44, wherein the 5' ITR sequence is from AAV2.

Embodiment P46: The rAAV according to any of embodiments P34 to P44, wherein the 3' ITR sequence is from AAV2.

Embodiment P47: The rAAV according to any of embodiments P34 to P44, wherein the 5' ITR sequence and the 3' ITR sequence are from AAV2.

Embodiment P48: The rAAV according to any of embodiments P45 to P47, wherein the 5' ITR sequence and the 3' ITR sequence comprises or consists of SEQ ID NO: 15.

Embodiment P49: The rAAV according to any of embodiments P34 to P44, wherein the 5' ITR sequence and/or the 3' ITR sequence are from a non-AAV2 source.

Embodiment P50: The rAAV according to any of embodiments P34 to P49, wherein the packaged genome further comprises one or more enhancer sequences.

Embodiment P51: The rAAV according to embodiment P50, wherein the enhancer is selected from a cytomegalovirus immediate early gene (CMV) enhancer, a transthyretin enhancer (enTTR), a chicken-actin (CBA) enhancer, an En34 enhancer, and an ApoE enhancer.

Embodiment P52: The rAAV according to embodiment P51, wherein the enhancer is the CMV enhancer.

Embodiment P53: The rAAV according to embodiment P52, wherein the enhancer comprises or consists of SEQ ID NO: 19.

Embodiment P54: The rAAV according to embodiments P51 to P53, wherein the enhancer is located upstream of the promoter sequence.

Embodiment P55: The rAAV according to any of embodiments P34 to P54, wherein the packaged genome further comprises one or more intron sequences.

Embodiment P56: The rAAV according to embodiment P55, wherein the intron is selected from an SV40 Small T intron, a rabbit hemoglobin subunit beta (rHBB) intron, a human beta globin IVS2 intron, a Promega chimeric intron, or an hFIX intron.

Embodiment P57: The rAAV according to embodiment P56, wherein the intron is the SV40 Small T intron.

Embodiment P58: The rAAV according to embodiment P57, wherein the intron comprises or consists of SEQ ID NO: 20.

Embodiment P59: The rAAV according to embodiment P56, wherein the intron is the rHBB intron.

Embodiment P60: The rAAV according to embodiment P59, wherein the intron comprises or consists of SEQ ID NO: 21.

Embodiment P61: The rAAV according to any of embodiments P34 to P60, wherein the packaged genome further comprises a polyadenylation signal sequence.

Embodiment P62: The rAAV according to embodiment P61, wherein the polyadenylation signal sequence is selected from a bovine growth hormone (BGH) polyadenylation signal sequence, an SV40 polyadenylation signal sequence, and a rabbit beta globin polyadenylation signal sequence.

Embodiment P63: The rAAV according to embodiment P62, wherein the polyadenylation signal sequence is the bovine growth hormone (BGH) polyadenylation signal sequence.

Embodiment P64: The rAAV according to embodiment P63, wherein the polyadenylation signal sequence comprises or consists of SEQ ID NO: 22.

Embodiment P65: The rAAV according to embodiment P62, wherein the polyadenylation signal sequence is the SV40 polyadenylation signal sequence.

Embodiment P66: The rAAV according to embodiment P65, wherein the polyadenylation signal sequence comprises or consists of SEQ ID NO: 23.

Embodiment P67: A recombinant adeno-associated virus (rAAV), said rAAV comprising an AAV capsid, and a vector genome packaged therein, said vector genome comprising as operably linked components in 5' to 3' order:

(a) a 5' ITR sequence;
(b) an enhancer sequence;
(c) a promoter sequence;
(d) an intron sequence;
(e) a partial or complete coding sequence for PCCA;
(f) a polyadenylation signal sequence; and
(g) a 3' ITR sequence.

Embodiment P68: A recombinant adeno-associated virus (rAAV), said rAAV comprising an AAV capsid, and a vector genome packaged therein, said vector genome comprising as operably linked components in 5' to 3' order:

(a) a 5' ITR sequence;
(b) an enhancer sequence;
(c) a promoter sequence;
(d) an intron sequence;
(e) a partial or complete coding sequence for PCCB;
(f) a polyadenylation signal sequence; and
(g) a 3' ITR sequence.

Embodiment P69: The rAAV according to embodiment P67 or embodiment P68, wherein the AAV capsid is from an AAV of serotype 1, 2, 3, 4, 5, 6, 7, 8, 9, 10, 11, 12, rh10, or hu37.

Embodiment P70: The rAAV according to embodiment P69, wherein the AAV capsid is from AAV9.

Embodiment P71: The rAAV according to embodiment P69, wherein the AAV capsid is from AAV8.

Embodiment P72: The rAAV according to embodiment P67 or embodiment P68, wherein the AAV capsid is an AAV9 variant capsid.

Embodiment P73: The rAAV according to any of embodiments P67 to P72, wherein the promoter is selected from a chicken β-actin (CBA) promoter, a cytomegalovirus immediate early gene (CMV) promoter, a transthyretin (TTR) promoter, a thyroxine binding globulin (TBG) promoter, an alpha-1 anti-trypsin (A1AT) promoter, and a CAG promoter.

Embodiment P74: The rAAV according to embodiment P73, wherein the promoter is the CBA promoter.

Embodiment P75: The rAAV according to embodiment P67, wherein the partial or complete coding sequence for PCCA is a wild-type coding sequence.

Embodiment P76: The rAAV according to embodiment P75, wherein the coding sequence for PCCA comprises SEQ ID NO: 1.

Embodiment P77: The rAAV according to embodiment P67, wherein the partial or complete coding sequence for PCCA is a codon-optimized coding sequence.

Embodiment P78: The rAAV according to embodiment P77, wherein the coding sequence for PCCA comprises a coding sequence selected from SEQ ID NOs: 2-6.

Embodiment P79: The rAAV according to embodiment P68, wherein the partial or complete coding sequence for PCCB is a wild-type coding sequence.

Embodiment P80: The rAAV according to embodiment P79, wherein the coding sequence for PCCB comprises SEQ ID NO: 7.

Embodiment P81: The rAAV according to embodiment P68, wherein the partial or complete coding sequence for PCCB is a codon-optimized coding sequence.

Embodiment P82: The rAAV according to embodiment P81, wherein the coding sequence for PCCB comprises a coding sequence selected from SEQ ID NOs: 8-12.

Embodiment P83: The rAAV according to any of embodiments P67 to P82, wherein the enhancer is selected from a cytomegalovirus immediate early gene (CMV) enhancer, a transthyretin enhancer (enTTR), a chicken β-actin (CBA) enhancer, an En34 enhancer, and an ApoE enhancer.

Embodiment P84: The rAAV according to embodiment P83, wherein the enhancer is the CMV enhancer.

Embodiment P85: The rAAV according to any of embodiments P67 to P84, wherein the intron is selected from an SV40 Small T intron, a rabbit hemoglobin subunit beta (rHBB) intron, a human beta globin IVS2 intron, a Promega chimeric intron, or an hFIX intron.

Embodiment P86: The rAAV according to embodiment P85, wherein the intron is the SV40 Small T intron.

Embodiment P87: The rAAV according to embodiment P85, wherein the intron is the rHBB intron.

Embodiment P88: The rAAV according to any of embodiments P67 to P87, wherein the polyadenylation signal sequence is selected from a bovine growth hormone (BGH) polyadenylation signal sequence, an SV40 polyadenylation signal sequence, and a rabbit beta globin polyadenylation signal sequence.

Embodiment P89: The rAAV according to embodiment P88, wherein the polyadenylation signal sequence is the bovine growth hormone (BGH) polyadenylation signal sequence.

Embodiment P90: The rAAV according to embodiment P88, wherein the polyadenylation signal sequence is the SV40 polyadenylation signal sequence.

Embodiment P91: A recombinant adeno-associated virus (rAAV) useful for the treatment of propionic acidemia (PA), said rAAV comprising an AAV capsid, and a vector genome packaged therein, said vector genome comprising as operably linked components in 5' to 3' order:

(a) a 5' ITR sequence;
(b) an enhancer sequence;
(c) a promoter sequence;
(d) an intron sequence;
(e) a coding sequence for PCCA selected from SEQ ID NOs: 1-6;
(f) a polyadenylation signal sequence; and
(g) a 3' ITR sequence.

Embodiment P92: A recombinant adeno-associated virus (rAAV) useful for the treatment of propionic acidemia (PA), said rAAV comprising an AAV capsid, and a vector genome packaged therein, said vector genome comprising as operably linked components in 5' to 3' order:

(a) a 5' ITR sequence;
(b) an enhancer sequence;
(c) a promoter sequence;
(d) an intron sequence;
(e) a coding sequence for PCCB selected from SEQ ID NOs: 7-12;
(f) a polyadenylation signal sequence; and
(g) a 3' ITR sequence.

Embodiment P93: The rAAV according to embodiment P91 or P92, wherein the AAV capsid is from AAV9.

Embodiment P94: A recombinant adeno-associated virus (rAAV) useful for the treatment of propionic acidemia (PA), said rAAV comprising an AAV9 capsid, and a vector genome packaged therein, said vector genome comprising as operably linked components in 5' to 3' order:

(a) a 5' ITR sequence;
(b) an enhancer sequence;
(c) a promoter sequence;
(d) an intron sequence;
(e) a coding sequence for PCCA selected from SEQ ID NOs: 1-6;
(f) a polyadenylation signal sequence; and
(g) a 3' ITR sequence.

Embodiment P95: A recombinant adeno-associated virus (rAAV) useful for the treatment of propionic acidemia (PA), said rAAV comprising an AAV9 capsid, and a vector genome packaged therein, said vector genome comprising as operably linked components in 5' to 3' order:

(a) a 5' ITR sequence;
(b) an enhancer sequence;
(c) a promoter sequence;
(d) an intron sequence;
(e) a coding sequence for PCCB selected from SEQ ID NOs: 7-12;
(f) a polyadenylation signal sequence; and
(g) a 3' ITR sequence.

Embodiment P96: A recombinant adeno-associated virus (rAAV) useful for the treatment of propionic acidemia (PA), said rAAV comprising an AAV9 capsid, and a vector genome packaged therein, said vector genome comprising as operably linked components in 5' to 3' order:

(a) an AAV2 5' ITR sequence;
(b) a CMV enhancer sequence;
(c) a CBA promoter sequence;
(d) an rHBB or an SV40 Small T intron sequence;
(e) a coding sequence for PCCA selected from SEQ ID NOs: 1-6;
(f) a BGH or SV40 polyadenylation signal sequence; and
(g) an AAV2 3' ITR sequence.

Embodiment P97: A recombinant adeno-associated virus (rAAV) useful for the treatment of propionic acidemia (PA), said rAAV comprising an AAV9 capsid, and a vector genome packaged therein, said vector genome comprising as operably linked components in 5' to 3' order:

(a) an AAV2 5' ITR sequence;
(b) a CMV enhancer sequence;
(c) a CBA promoter sequence;
(d) an rHBB or an SV40 Small T intron sequence;
(e) a coding sequence for PCCB selected from SEQ ID NOs: 7-12;
(f) a BGH or SV40 polyadenylation signal sequence; and
(g) an AAV2 3' ITR sequence.

Embodiment P98: The rAAV according to any of embodiments P67 to P97, wherein the vector genome comprises a consensus Kozak sequence located between vector genome elements (d) and (e).

Embodiment P99: The rAAV according to embodiment P98, wherein the consensus Kozak sequence comprises SEQ ID NO: 24.

Embodiment P100: A composition comprising the rAAV of any of the preceding embodiments and a pharmaceutically acceptable carrier.

Embodiment P101: A method of treating propionic acidemia (PA) in a human subject comprising administering to the human subject a therapeutically effective amount of an rAAV of any of embodiments P1 to P99 or a composition of embodiment P100.

Embodiment P102: A method of treating propionic acidemia (PA) in a human subject comprising administering to the human subject (1) a therapeutically effective amount of composition comprising an rAAV of any of embodiments P1 to P33; and
(2) a therapeutically effective amount of composition comprising an rAAV of any of embodiments P34 to P66.

Embodiment P103: The method of embodiment P102, wherein the compositions of (1) and (2) are administered simultaneously.

Embodiment P104: The method of embodiment P102, wherein the compositions of (1) and (2) are administered sequentially.

Embodiment P105: The method of embodiment P102, wherein the compositions of (1) and (2) are administered separately.

Embodiment P106: A method of treating propionic acidemia (PA) in a human subject diagnosed with at least one mutation in PCCA, said method comprising administering to the human subject a therapeutically effective amount of composition comprising an rAAV of any of embodiments P1 to P33.

Embodiment P107: The method of embodiment P106, wherein said mutation in PCCA is selected from Table 1.

Embodiment P108: A method of treating propionic acidemia (PA) in a human subject diagnosed with at least one mutation in PCCB, said method comprising administering to the human subject a therapeutically effective amount of composition comprising an rAAV of any of embodiments P34 to P66.

Embodiment P109: The method of embodiment P108, wherein said mutation in PCCB is selected from Table 2.

Embodiment P110: The method of any of embodiments P101 to P109, wherein the recombinant virus, the rAAV, or the composition is administered subcutaneously, intramuscularly, intradermally, intraperitoneally, or intravenously.

Embodiment P111: The method of embodiment P110, wherein the rAAV or the composition is administered intravenously.

Embodiment P112: The method of any of embodiments P101 to P111, wherein the rAAV is administered at a dose of about $1\times10^{11}$ to about $1\times10^{14}$ genome copies (GC)/kg.

Embodiment P113: The method of embodiment P112, wherein the rAAV is administered at a dose of about $1\times10^{12}$ to about $1\times10^{13}$ genome copies (GC)/kg.

Embodiment P114: The method according to any of embodiments P110 to P113, wherein administering the rAAV comprises administration of a single dose of rAAV.

Embodiment P115: The method according to any of embodiments P110 to P113, wherein administering the rAAV comprises administration of multiple doses of rAAV.

Embodiment P116: A recombinant nucleic acid encoding a PCCA polypeptide of SEQ ID NO: 16, wherein the nucleic acid sequence is less than 80% identical to the wild-type coding sequence of SEQ ID NO: 1.

Embodiment P117: The recombinant nucleic acid of embodiment P116, wherein the nucleic acid sequence comprises a sequence which is at least 80% identical to a sequence selected from SEQ ID NOs: 2-6.

Embodiment P118: The recombinant nucleic acid of embodiment P117, wherein the nucleic acid sequence comprises a sequence selected from SEQ ID NOs: 2-6.

Embodiment P119: The recombinant nucleic acid of any of embodiments P116 to P118, wherein the nucleic acid sequence further comprises one or more stop codons selected from TGA, TAA, and TAG at the 3' end.

Embodiment P120: A recombinant nucleic acid encoding a PCCB polypeptide of SEQ ID NO: 17, wherein the nucleic acid sequence is less than 80% identical to the wild-type coding sequence of SEQ ID NO: 7.

Embodiment P121: The recombinant nucleic acid of embodiment P120, wherein the nucleic acid sequence comprises a sequence which is at least 80% identical to a sequence selected from SEQ ID NOs: 8-12.

Embodiment P122: The recombinant nucleic acid of embodiment P121, wherein the nucleic acid sequence comprises a sequence selected from SEQ ID NOs: 8-12.

Embodiment P123: The recombinant nucleic acid of any of embodiments P120 to P122, wherein the nucleic acid sequence further comprises one or more stop codons selected from TGA, TAA, and TAG at the 3' end.

Embodiment P124: A recombinant nucleic acid which comprises a sequence which is at least 80% identical to a sequence selected from SEQ ID NOs: 2-6.

Embodiment P125: The recombinant nucleic acid of embodiment P124, wherein the recombinant nucleic acid comprises a sequence which is at least 90% identical to a sequence selected from SEQ ID NOs: 2-6.

Embodiment P126: The recombinant nucleic acid of embodiment P125, wherein the recombinant nucleic acid comprises a sequence which is at least 95% identical to a sequence selected from SEQ ID NOs: 2-6.

Embodiment P127: A recombinant nucleic acid which comprises a sequence selected from SEQ ID NOs: 2-6.

Embodiment P128: The recombinant nucleic acid of any of embodiments P124 to P127, wherein the nucleic acid sequence further comprises one or more stop codons selected from TGA, TAA, and TAG at the 3' end.

Embodiment P129: A recombinant nucleic acid which comprises a sequence which is at least 80% identical to a sequence selected from SEQ ID NOs: 7-12.

Embodiment P130: The recombinant nucleic acid of embodiment P129, wherein the recombinant nucleic acid comprises a sequence which is at least 90% identical to a sequence selected from SEQ ID NOs: 7-12.

Embodiment P131: The recombinant nucleic acid of embodiment P130, wherein the recombinant nucleic acid comprises a sequence which is at least 95% identical to a sequence selected from SEQ ID NOs: 2-6.

Embodiment P132: A recombinant nucleic acid which comprises a sequence selected from SEQ ID NOs: 7-12.

Embodiment P133: The recombinant nucleic acid of any of embodiments P129 to P132, wherein the nucleic acid sequence further comprises one or more stop codons selected from TGA, TAA, and TAG at the 3' end.

Embodiment P134: An rAAV comprising a recombinant nucleic acid according to any of embodiments P116 to P133.

Embodiment P135: A host cell comprising a recombinant nucleic acid according to any of embodiments P116 to P133 or an rAAV of embodiment P134.

Embodiment P136: The host cell of embodiment P135, wherein said host cell is selected from a HeLa, Cos-7, HEK293, A549, BHK, Vero, RD, HT-1080, ARPE-19, or MRC-5 cell.

INCORPORATION BY REFERENCE

The entire disclosure of each of the patent documents and scientific articles referred to herein is incorporated by reference for all purposes.

EQUIVALENTS

The disclosure may be embodied in other specific forms without departing from the spirit or essential characteristics thereof. The foregoing embodiments are therefore to be considered in all respects illustrative rather than limiting the disclosure described herein. Various structural elements of the different embodiments and various disclosed method steps may be utilized in various combinations and permutations, and all such variants are to be considered forms of the disclosure. Scope of the disclosure is thus indicated by the appended claims rather than by the foregoing description, and all changes that come within the meaning and range of equivalency of the claims are intended to be embraced therein.

What is claimed is:

1. A recombinant adeno-associated virus (rAAV), said rAAV comprising an AAV capsid, and a vector genome packaged therein, said vector genome comprising in 5' to 3' order:
   (a) a 5'-inverted terminal repeat sequence (5'-ITR) sequence;
   (b) a promoter sequence;
   (c) a human beta globin IVS2 intron sequence;
   (d) a wild type coding sequence for propionyl-CoA carboxylase B (PCCB) according to SEQ ID NO: 7; and
   (e) a 3'-inverted terminal repeat sequence (3'-ITR) sequence.

2. The rAAV according to claim 1, wherein the AAV capsid is from an AAV of serotype 9, 1, 2, 3, 4, 5, 6, 7, 8, 10, 11, 12, rh10, or hu37.

3. The rAAV according to claim 1, wherein the promoter sequence is selected from a chicken β-actin (CBA) promoter sequence, a cytomegalovirus (CMV) immediate early gene promoter sequence, a transthyretin (TTR) promoter sequence, a thyroxine binding globulin (TBG) promoter sequence, an alpha-1 anti-trypsin (A1AT) promoter sequence, a CAG promoter sequence, and a PCCB gene-specific endogenous promoter sequence.

4. The rAAV according to claim 3, wherein the promoter sequence is:
   a) the PCCB gene-specific endogenous promoter sequence comprising a nucleotide sequence of at least 15 continuous nucleotides, which is at least 95% identical to an equal length region of SEQ ID NO: 36; or
   b) the CBA promoter sequence.

5. The rAAV according to claim 1, wherein:
   a) the 5'-ITR sequence and/or the 3'-ITR sequence are from AAV2; and/or
   b) the 5'-ITR sequence and the 3'-ITR sequence comprises or consists of SEQ ID NO: 15.

6. The rAAV according to claim 1, wherein the 5'-ITR sequence and/or the 3'-ITR sequence are from a non-AAV2 source.

7. The rAAV according to claim 1, wherein the vector genome further comprises a truncated or complete nucleotide sequence of a human PCCB 5'-untranslated region (UTR) and/or a 3'-UTR.

8. The rAAV according to claim 7, wherein:
   a) the complete nucleotide sequence of the human PCCB 5'-UTR comprises SEQ ID NO: 32; and/or
   b) the truncated nucleotide sequence of the human PCCB 5'-UTR comprises a nucleotide sequence of at least 100 continuous nucleotides, which is at least 95% identical to an equal length region of SEQ ID NO: 32.

9. The rAAV according to claim 1, wherein the vector genome further comprises:
   a) a polyadenylation signal sequence; and/or
   b) one or more enhancer sequences.

10. The rAAV according to claim 9, wherein:
   a) the polyadenylation signal sequence:
      i. is selected from an SV40 polyadenylation signal sequence, a bovine growth hormone (BGH) polyadenylation signal sequence, a rabbit beta globin polyadenylation signal sequence, and a PCCB gene-specific endogenous polyadenylation signal sequence;
      ii. is a bovine growth hormone (BGH) polyadenylation signal sequence comprising SEQ ID NO: 22;
      iii. is an SV40 polyadenylation signal sequence comprising SEQ ID NO: 23; or
      iv. comprises the PCCB gene-specific endogenous polyadenylation signal sequence; and/or
   b) the one or more enhancer sequences:
      i. is selected from a cytomegalovirus (CMV) immediate early gene enhancer sequence, a transthyretin enhancer (enTTR) sequence, a chicken β-actin (CBA) enhancer sequence, an En34 enhancer sequence, and an apolipoprotein E (ApoE) enhancer sequence;
      ii. comprises or consists of SEQ ID NO: 19; and/or
      iii. is located upstream of the promoter sequence.

11. The rAAV according to claim 10, wherein the PCCB gene-specific endogenous polyadenylation signal sequence comprises a nucleotide sequence of at least 15 continuous nucleotides, which is at least 95% identical to an equal length region of SEQ ID NO: 37.

12. A recombinant adeno-associated virus (rAAV), said rAAV comprising an AAV capsid, and a vector genome packaged therein, said vector genome comprising in 5' to 3' order:

(a) a 5'-ITR sequence;
(b) an enhancer sequence;
(c) a promoter sequence;
(d) a human beta globin IVS2 intron sequence;
(e) wild type coding sequence for propionyl-CoA carboxylase B (PCCB) according to SEQ ID NO: 7;
(f) a polyadenylation signal sequence; and
(g) a 3'-ITR sequence.

13. The rAAV according to claim 12, wherein the AAV capsid is from an AAV of serotype 9, 1, 2, 3, 4, 5, 6, 7, 8, 10, 11, 12, rh10, or hu37.

14. The rAAV according to claim 12, wherein:
a) the promoter sequence is selected from a chicken β-actin (CBA) promoter sequence, a cytomegalovirus (CMV) immediate early gene promoter sequence, a transthyretin (TTR) promoter sequence, a thyroxine binding globulin (TBG) promoter sequence, an alpha-1 anti-trypsin (A1AT) promoter sequence, a CAG promoter sequence, and a PCCB gene-specific endogenous promoter sequence;
b) the polyadenylation signal sequence is selected from a bovine growth hormone (BGH) polyadenylation signal sequence, an SV40 polyadenylation signal sequence, a rabbit beta globin polyadenylation signal sequence, and a PCCB gene-specific endogenous polyadenylation signal sequence;
c) the enhancer sequence is selected from a cytomegalovirus (CMV) immediate early gene enhancer sequence, a transthyretin enhancer (enTTR) sequence, a chicken β-actin (CBA) enhancer sequence, an En34 enhancer sequence, and an ApoE enhancer sequence;
d) the 5'-ITR sequence and/or the 3'-ITR sequence are from AAV2 or from a non-AAV2 source; and/or
e) the 5'-ITR sequence and the 3'-ITR sequence comprises or consists of SEQ ID NO: 15.

15. The rAAV according to claim 14, wherein the promoter sequence is:
a) the PCCB gene-specific endogenous promoter sequence comprising a nucleotide sequence of at least 15 continuous nucleotides, which is at least 95% identical to an equal length region of SEQ ID NO: 36; or
b) the CBA promoter sequence.

16. The rAAV according to claim 14, wherein:
a) the polyadenylation signal sequence:
  i. is a bovine growth hormone (BGH) polyadenylation signal sequence comprising SEQ ID NO: 22;
  ii. is an SV40 polyadenylation signal sequence comprising SEQ ID NO: 23; or
  iii. comprises the PCCB gene-specific endogenous polyadenylation signal sequence; and/or
b) the enhancer sequence is the CMV immediate early gene enhancer sequence.

17. The rAAV according to claim 16, wherein the PCCB gene-specific endogenous polyadenylation signal sequence comprises a nucleotide sequence of at least 15 continuous nucleotides, which is at least 95% identical to an equal length region of SEQ ID NO: 37.

18. The rAAV according to claim 12, wherein the vector genome further comprises a truncated or complete nucleotide sequence of a human PCCB 5'-untranslated region (UTR), located between vector genome elements (d) and (e).

19. The rAAV according to claim 18, wherein:
a) the complete nucleotide sequence of the human PCCB 5'-UTR comprises SEQ ID NO: 32; and/or
b) the truncated nucleotide sequence of the human PCCB 5'-UTR comprises a nucleotide sequence of at least 100 continuous nucleotides, which is at least 95% identical to an equal length region of SEQ ID NO: 32.

20. The rAAV according to claim 12, wherein the vector genome further comprises a truncated or complete nucleotide sequence of a human PCCB 3'-untranslated region (UTR), located between vector genome elements (f) and (g).

21. The rAAV according to claim 20, wherein:
a) the complete nucleotide sequence of the human PCCB 3'-UTR comprises SEQ ID NO: 33; and/or
b) the truncated nucleotide sequence of the human PCCB 3'-UTR comprises a nucleotide sequence of at least 15 continuous nucleotides, which is at least 95% identical to an equal length region of SEQ ID NO: 33.

22. The rAAV according to claim 12, wherein the vector genome comprises a consensus Kozak sequence upstream of genome element (e).

23. A recombinant adeno-associated virus (rAAV), said rAAV comprising an AAV capsid, and a vector genome packaged therein, said vector genome comprising in 5' to 3' order:
(a) an AAV2 5'-inverted terminal repeat sequence (ITR) sequence;
(b) a cytomegalovirus (CMV) immediate early gene enhancer sequence;
(c) a chicken β-actin (CBA) promoter sequence;
(d) a human beta globin IVS2 intron sequence;
(e) a wild type coding sequence for propionyl-CoA carboxylase B (PCCB) according to SEQ ID NO: 7;
(f) a BGH or an SV40 polyadenylation signal sequence; and
(g) an AAV2 3'-inverted terminal repeat sequence (ITR) sequence.

24. The rAAV according to claim 23, wherein the AAV capsid is from an AAV of serotype 9, 1, 2, 3, 4, 5, 6, 7, 8, 10, 11, 12, rh10, or hu37.

25. A recombinant adeno-associated virus (rAAV), said rAAV comprising an AAV9 capsid, and a vector genome packaged therein, said vector genome comprising in 5' to 3' order:
(a) a 5'-inverted terminal repeat sequence (ITR) sequence;
(b) an enhancer sequence;
(c) a promoter sequence;
(d) a human beta globin IVS2 intron sequence;
(e) a wild type coding sequence for propionyl-CoA carboxylase B (PCCB) according to SEQ ID NO: 7;
(f) a polyadenylation signal sequence; and
(g) a 3'-inverted terminal repeat sequence (ITR) sequence.

26. A recombinant adeno-associated virus (rAAV), said rAAV comprising an AAV9 capsid, and a vector genome packaged therein, said vector genome comprising in 5' to 3' order:
(a) an AAV2 5'-inverted terminal repeat sequence (ITR) sequence;
(b) a cytomegalovirus (CMV) immediate early gene enhancer sequence;
(c) a chicken β-actin (CBA) promoter sequence;
(d) a human beta globin IVS2 intron sequence;
(e) a wild type coding sequence for propionyl-CoA carboxylase B (PCCB) according to SEQ ID NO: 7;
(f) a BGH or an SV40 polyadenylation signal sequence; and
(g) an AAV2 3'-inverted terminal repeat sequence (ITR) sequence.

27. The rAAV according to claim 23, wherein the vector genome further comprises:

a) a truncated or complete nucleotide sequence of a human PCCB 5'-UTR located between vector genome elements (d) and (e); and/or b) a consensus Kozak sequence comprising SEQ ID NO: 24 upstream of genome element (e).

28. A composition comprising the rAAV of claim 1 and a pharmaceutically acceptable carrier.

* * * * *